United States Patent
Mizoguchi

(10) Patent No.: US 7,970,284 B2
(45) Date of Patent: Jun. 28, 2011

(54) OPTICAL AND ELECTRIC SIGNALS TRANSMISSION APPARATUS, OPTICAL AND ELECTRIC SIGNALS TRANSMISSION SYSTEM, AND ELECTRONIC EQUIPMENT USING SUCH A SYSTEM

(75) Inventor: Takatoshi Mizoguchi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 647 days.

(21) Appl. No.: 12/116,378

(22) Filed: May 7, 2008

(65) Prior Publication Data
US 2010/0028017 A1    Feb. 4, 2010

(30) Foreign Application Priority Data

May 10, 2007   (JP) ................................ P2007-125466

(51) Int. Cl.
*H04B 10/00* (2006.01)
*H04B 10/02* (2006.01)
(52) U.S. Cl. ......... 398/135; 398/138; 398/164; 398/134
(58) Field of Classification Search .................... 398/82, 398/25, 41, 132–134, 201, 138, 164
See application file for complete search history.

(56) References Cited

U.S. PATENT DOCUMENTS

| 6,874,954 | B2 * | 4/2005 | Takagi et al. ................. 385/92 |
| 7,513,697 | B2   | 4/2009 | Harano et al. |
| 2006/0002667 | A1 * | 1/2006 | Aronson ........................ 385/93 |
| 2008/0205826 | A1 | 8/2008 | Harano et al. |

FOREIGN PATENT DOCUMENTS

| CN | 1906516 A | 1/2007 |
| JP | 61-108 U | 1/1986 |
| JP | 62-193208 U | 12/1987 |
| JP | 6-140106 A | 5/1994 |

* cited by examiner

*Primary Examiner* — Dalzid Singh
(74) *Attorney, Agent, or Firm* — Birch, Stewart, Kolasch & Birch, LLP

(57) ABSTRACT

An optical and electric signals transmission apparatus includes a receptacle having a light-receiving element and/or a light-receiving element and electrical connecting terminals, a plug having electrical connecting terminals to establish electrical coupling with the receptacle and optical coupling with the light-emitting element and/or the light-receiving element, an electric signal transmission line, and an optical signal transmission line. The receptacle has a fitting recess, and when the plug is fitted in the fitting recess in a direction substantially perpendicular to the optical axis of the light-emitting element or the light-receiving element, the optical coupling, the electrical coupling, and engagement of the receptacle with the plug are established at a location where the fitting recess and the plug are adjacent to each other.

34 Claims, 34 Drawing Sheets

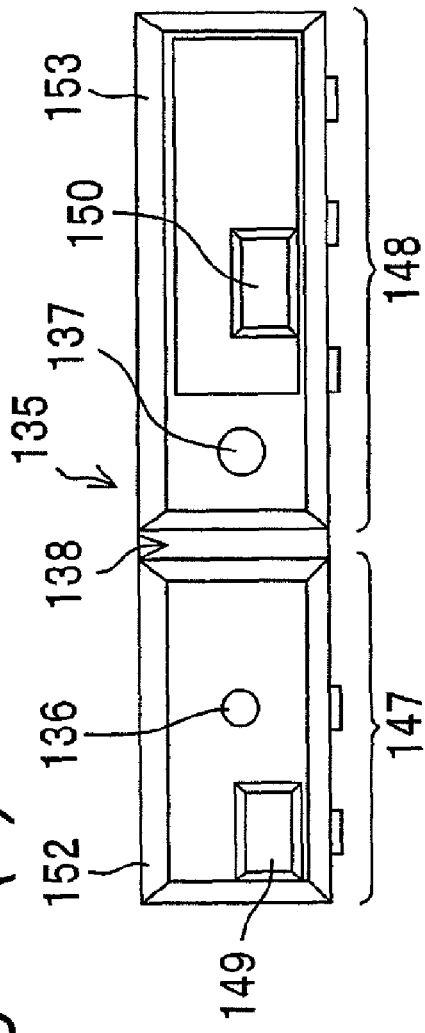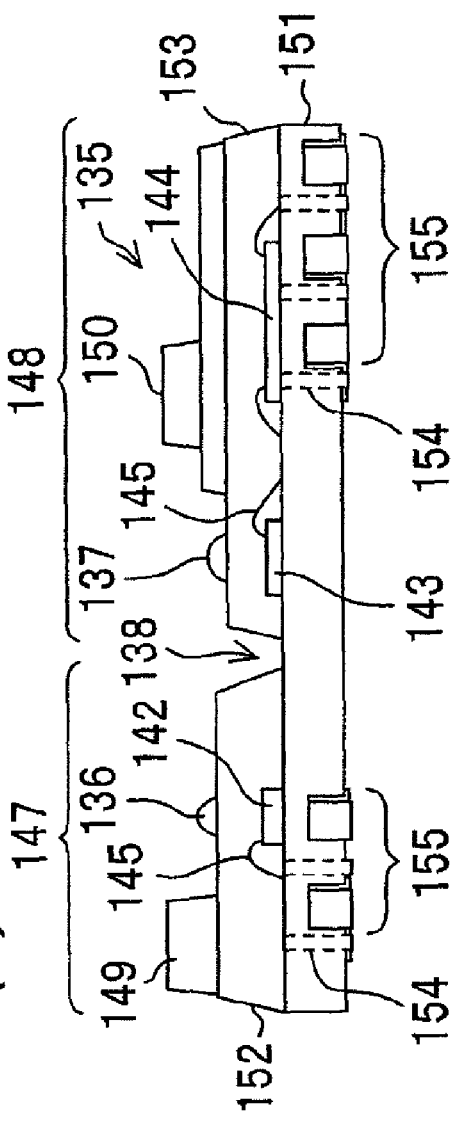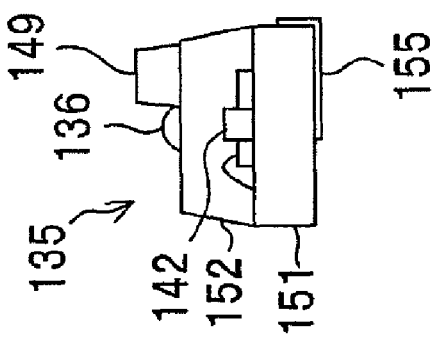

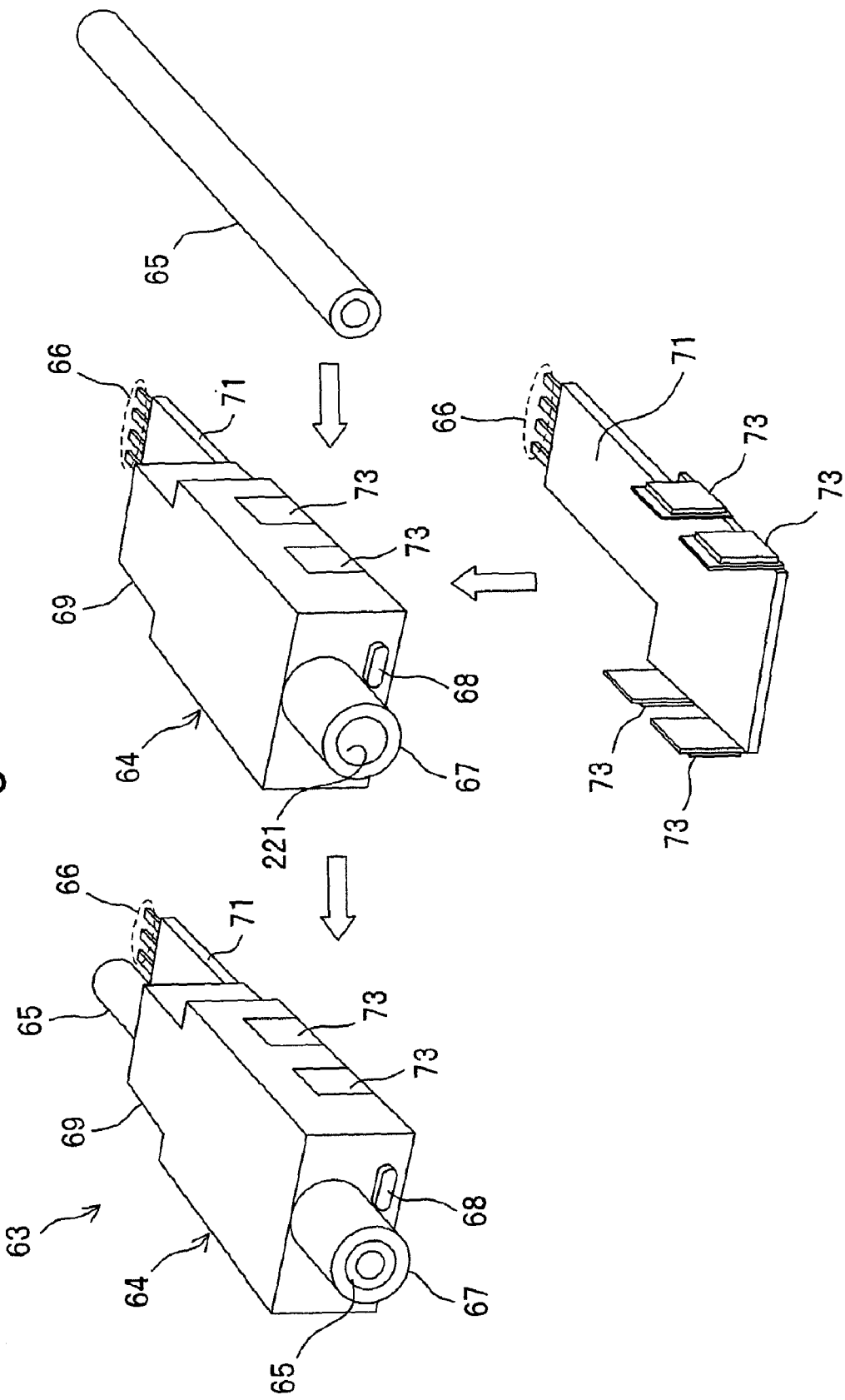

OPTICAL AND ELECTRIC SIGNALS TRANSMISSION APPARATUS, OPTICAL AND ELECTRIC SIGNALS TRANSMISSION SYSTEM, AND ELECTRONIC EQUIPMENT USING SUCH A SYSTEM

This nonprovisional application claims priority under 35 U.S.C. §119(a) on Patent Application No(s). 2007-125466 filed in Japan on May 10, 2007, the entire contents of which are hereby incorporated by reference.

BACKGROUND OF THE INVENTION

The present invention relates to an optical and electric signals transmission apparatus, an optical and electric signals transmission system, and electronic equipment using the optical and electric signals transmission system, which perform transmission of optical and electric signals including high-speed optical signal.

Conventional optical and electric signals transmission apparatuses transmitting both of an optical signal and an electric signal include a "plug and jack type optical and electric common use transmission device" disclosed in JP 6-140106 A (patent document 1). FIG. 41 is a front view of a receptacle (holder) 1 of the plug and jack type optical and electric common use transmission device, and FIG. 42 is a side view of the holder. FIG. 43 is a side view of an optical plug 2 which is attached to the holder 1.

In the plug and jack type optical and electric common use transmission device disclosed in the patent document 1, an optical transmitting device 3 or an optical receiving device 4 is accommodated in the holder 1 equipped with a mechanism of fitting and holding the optical plug 2 having an optical fiber cable 5. A hole for fitting and holding the optical plug 2 is formed in the holder 1 along the optical axis of the holder 1. The optical plug 2 is inserted along the optical axis in the hole 6 of the holder 1 and is thereby fitted and held at a predetermined position, so that optical coupling for optical signal transmission becomes possible.

Lead terminals 7 in FIGS. 41 and 42 are signal input terminals for the optical transmitting device 3. Lead terminals 8 are output terminals for the optical receiving device 3. The reference numeral 9 denotes lead terminals for electric signal transmission.

FIG. 44 is a cross-sectional view showing the state that the optical plug 2 has been inserted in the holder 1. FIG. 45 is a cross-sectional view showing the state that an electric plug 10 has been inserted in the holder 1 and electric signal transmission is possible. In FIG. 45, electrodes 11a, 11b, and 11c of the electric plug 10 are electrically connected with corresponding connecting terminals 9a, 9b, and 9c of lead terminals 9. As described above, in the plug and jack type optical and electric common use transmission device disclosed in the patent document 1, optical signal transmission is possible when the optical plug 2 has been inserted in the holder 1, and electric signal transmission is possible when the electric plug 10 has been inserted in the holder 1.

Furthermore, conventional optical and electric signals transmission apparatuses include a "connecting device" disclosed in JP 62-193208 U (patent document 2). FIG. 46 shows a male connecting component (plug) 15 and a female connecting component (jack) 16 of this connecting device. Both of an optical signal and an electric signal are transmitted by inserting a connecting projection (inserted portion) 17 of the male connecting component 15 into a socket 18 of the female connecting component 16.

As a cable to be connected, a composite cord constituted by an optical fiber 19 and a plurality of electric signal transmission wires is used, and the connecting projection 17 which contains the optical fiber 19 along the axis and has a plurality of conductors 20, 21, and 22 arranged in the axis direction on the periphery is mounted on an end portion of the composite cord. The female connecting component 16 has a shielding conductor 23 which is electrically connected to the first conductor 20 of the connecting projection 17 when the connecting projection 17 is inserted in the socket 18, an Lch conductor 24 which is electrically connected to the second conductor 21 of the connecting projection 17 when the connecting projection 17 has been inserted in the socket 18, an Rch conductor 25 which is electrically connected to the third conductor 22 of the connecting projection 17 when the connecting projection 17 has been inserted in the socket 18, and an optical element 26 which is optically coupled to an end portion 19a of the optical fiber 19 when the connecting projection 17 has been inserted in the socket 18.

According to the connecting device disclosed in the patent document 1, it becomes possible to select both or either of optical signal transmission and electric signal transmission. However, it is not described that the connecting device is used along with a small single head electric plug, and the connecting device is a connector used exclusively for optical and electric signals transmission.

Furthermore, conventional optical and electric signals transmission apparatuses include a "plug-jack type connector" disclosed in JP 61-108 U (patent document 3). FIG. 47 is a cross-sectional view showing the configuration of the plug of the plug-jack type connector. The plug has terminal portions for electrical connection 31 and 32, and a transmitting optical fiber 33 and a receiving optical fiber 34 which penetrate the terminal portions for electrical connection 31 and 32 to an end face of the plug. FIG. 48 shows the sate that the plug has been fitted in the jack. In FIG. 48, the terminal portion for electrical connection 31 of the plug is connected with a conductor for power supply 36 of the jack 35, and the terminal for electrical connection 32 is connected with a grounding conductor 37 of the jack 35. In addition, the jack 35 has a light-emitting element 38 and a light-receiving element 39, which are optically coupled with a transmitting optical fiber 33 and a receiving optical fiber 34, respectively, to perform optical signal transmission.

However, the conventional optical and electric signals transmission apparatuses have the following problems. The plug and jack type optical and electric common use transmission device disclosed in the patent document 1 is able to transmit an optical signal and an electric signal, but is not able to transmit an optical signal and an electric signal at the same time as described above. Furthermore, the plug and jack type optical and electric common use transmission device is structured in such a manner that the optical plug 2 is covered with the holder 1, which constitutes a large restriction on miniaturization of the device. In addition, the optical plug 2 must be moved along the optical axis when the optical plug 2 is inserted in and extracted from the holder 1, so that a region for the insertion and extraction having a length longer than the length of the optical plug 2 must be kept in front of the insertion opening of the holder 1 on a printed circuit board on which the holder 1 is mounted. Thus, any component can not be disposed in the region on the printed circuit board.

From the reason stated above, the plug and jack type optical and electric common use transmission device disclosed in the patent document 1 has a problem that it is unsuitable for being mounted on portable equipment which is going to be reduced in size and thickness.

Furthermore, it has been realized by the connecting device disclosed in the patent document 2 that an optical signal and an electric signal are transmitted by a small and thin device. However, in the patent document 2, only a mechanism realizing electrical contacts is disclosed, and a precision positioning mechanism and a fitting and holding mechanism for the plug and jack necessary for optical coupling are not described. In addition, like the conventional optical and electric signals transmission apparatus disclosed in the patent document 1, the connecting device is structured in such a manner that the connecting projection 17 is covered with the female connecting component 16, which constitutes a large restriction on miniaturization of the device. In addition, a region for insertion and extraction having a length longer than the length of the connecting projection 17 must be kept in front of the socket 18 on a printed circuit board on which the female connecting component 16 is mounted. Thus, no component can be disposed in the region on the printed circuit board.

Furthermore, in the plug-jack type connector disclosed in the patent document 3, a hybrid plug and jack is provided for an optical signal and an electrical signal, and two-way communication by an optical signal and an electric signal is realized. However, the optical plug is structured so as to partially have metal blades for electrical contacts and covered with the jack 35, like the conventional optical and electric signals transmission apparatus disclosed in the patent document 1, which constitutes a large restriction on miniaturization of the connector. In addition, a region for the insertion and extraction of the plug having a length larger than the length of the plug must be kept in front of the plug insertion opening of the jack 35 on a printed circuit board on which the jack 35 is mounted. Thus, no component can be disposed in the region on the printed circuit board.

From the reason stated above, the connecting device disclosed in the patent document 2 or the plug-jack type connector disclosed in the patent document 3 also has a problem that it is unsuitable for being mounted on portable equipment which is going to be reduced in size and thickness.

SUMMARY OF THE INVENTION

It is therefore an object of the present invention to provide an optical and electric signals transmission apparatus, an optical and electric signals transmission system, and electronic equipment using an optical and electric signals transmission system, which are small and thin and are able to transmit an optical signal and an electric signal at the same time without needing a dead area for insertion and extraction of an optical plug on a printed circuit board.

There is provided, according to an aspect of the present invention, an optical and electric signals transmission apparatus comprising:

a receptacle for optical and electric signals transmission which accommodates and holds at least any one of an optical transmitting device including a light-emitting element and an optical receiving device including a light-receiving element and a signal processing circuit processing a signal from the light-receiving element, and has an electrical connecting terminal;

a plug for optical and electric signals transmission which has an electrical connecting terminal to be connected to the electrical connecting terminal of the receptacle and is adapted to be inserted in the receptacle to establish electrical coupling with the receptacle and/or optical coupling with at least any one of the light-emitting element and the light-receiving element and perform optical and electric signals transmission with the receptacle;

an electric signal transmission line, an end of which is connected with the electrical connecting terminal of the plug; and an optical signal transmission line, an end portion of which is mounted to the plug, wherein the receptacle has a fitting recess in which the plug is to be fitted when inserted in the receptacle from a direction substantially perpendicular to an optical axis of the light-emitting element or the light-receiving element;

wherein when the plug is fitted in the fitting recess of the receptacle, the optical coupling, the electrical coupling, and engagement of the receptacle with the plug are established at a location where the fitting recess and the plug are adjacent to each other; and wherein one-way or two-way optical communication and one-way or two-way electrical communication are performed between the receptacle and the plug fitted in the fitting recess.

According to the above configuration, when the plug is inserted in a direction substantially perpendicular to the optical axis of the light-emitting element or the light-receiving element and fitted in the fitting recess of the receptacle, optical coupling between the receptacle and the plug, electrical coupling between the light-emitting element and/or the light-receiving element and the plug, and engagement of the receptacle with the plug are established at a location where the fitting recess and the plug are adjacent to each other. Thus, it is not any more necessary to keep a region for extraction from and insertion into the receptacle of the plug performed along the optical axis direction, near the receptacle. For this reason, other components may be mounted in such a region on a substrate on which the receptacle is mounted.

In other words, the optical and electric signals transmission apparatus performing one-way or two-way optical communication and one-way or two-way electrical communication at the same time is allowed to be reduced in size.

In addition, the receptacle is not required to cover or enclose the insertion side of the plug after the plug has been fit in the fitting recess. Thus, the optical and electric signals transmission apparatus performing one-way or two-way optical communication and one-way or two-way electrical communication at the same time can be reduced in thickness.

In one embodiment, the receptacle accommodates and holds the optical transmitting device or the optical receiving device. And, the plug establishes optical coupling with the light-emitting element or the light-receiving element, and one-way optical communication and one-way or two-way electrical communication are performed between the receptacle and the plug.

According to this embodiment, the optical and electric signals transmission apparatus performing one-way optical communication and one-way or two-way electrical communication at the same time is allowed to be reduced in size and thickness.

In one embodiment, the receptacle accommodates and holds the optical transmitting device or the optical receiving device. And, the plug establishes optical coupling with the light-emitting element or the light-receiving element, and two-way optical communication and one-way or two-way electrical communication are performed between the receptacle and the plug.

According to the above configuration, the optical and electric signals transmission apparatus performing two-way optical communication and one-way or two-way electrical communication at the same time is allowed to reduced in size and thickness.

In one embodiment, the optical signal transmission line is an optical fiber cable. And, when the plug is fitted in the fitting recess of the receptacle, the optical coupling is established between an end face of the optical fiber cable and the light-emitting element or the light-receiving element.

According to this embodiment, the one-way optical signal transmission line is constituted by an optical fiber cable, so that one-way high-speed optical signal transmission and two-way or one-way electric signal transmission can be realized by a smaller, thinner, and space-saving optical and electric signals transmission apparatus.

In one embodiment, the optical signal transmission line comprises a pair of optical fiber cables, one for transmission and the other for reception, and when the plug is fitted in the fitting recess of the receptacle, the optical coupling is established between an end face of the optical fiber cable for transmission and the light-emitting element, while the optical coupling is established between an end face of the optical fiber cable for reception and the light-receiving element.

According to this embodiment, the two-way optical signal transmission line is constituted by optical fiber cables, so that two-way high-speed optical signal transmission and two-way or one-way electric signal transmission can be realized by a smaller, thinner, and space-saving optical and electric signals transmission apparatus.

In one embodiment, the electric signal transmission line is a flexible substrate including a metal wire, and an end portion of the flexible substrate is mounted on a periphery of the plug. The electrical connecting terminal of the plug to be connected to the electrical connecting terminal of the receptacle is formed on a surface of the flexible substrate mounted on the periphery of the plug and is connected with the metal wire in the flexible substrate.

According to this embodiment, the electric signal transmission line is constituted by a flexible substrate having a metal wire, and the electrical coupling with the electrical connecting terminal of the receptacle is established through the electrical connecting terminal formed on the surface of the flexible substrate mounted on and fixed to the periphery of the plug, so that it becomes unnecessary to connect the electrical connecting terminal to the electric signal transmission line inside the plug, and thereby the structure of the plug can be simplified and a plug for optical and electric signals transmission which is small and thin can be realized.

In one embodiment, the electrical connecting terminal of the receptacle is provided on an inner side surface of the fitting recess, and the electrical connecting terminal formed on the surface of the flexible substrate is disposed on a side surface of the plug.

According to this embodiment, the electrical connecting terminal of the receptacle and the electrical connecting terminal of the plug, between which the electrical coupling is to be established, are provided on an inner side surface of the fitting recess and a side surface of the plug. Thus, a number of electrical connecting terminals can be provided on the small receptacle and plug for optical and electric signals transmission.

In one embodiment, the electrical connecting terminal of the receptacle is provided on an inner bottom face of the fitting recess, and the electrical connecting terminal formed on the surface of the flexible substrate is disposed on a bottom face of the plug.

According to this embodiment, the electrical connecting terminal of the receptacle and the electrical connecting terminal of the plug between which the electrical coupling is established are provided on the inner bottom face of the fitting recess and the bottom face of the plug. Thus, the direction of fitting of the plug to the receptacle can be made substantially identical to the direction of the electrical coupling. For this reason, the electrical connecting terminal structure of the plug can be simplified, and a plug for optical and electric signals transmission which is small, thin, and space-saving can be thus realized.

In one embodiment, the electrical connecting terminal of the receptacle includes electrical connecting terminals provided on an inner side surface and an inner bottom face of the fitting recess. Also, the flexible substrate of which the end portion is mounted on the periphery of the plug is constituted by two flexible substrates on which the electrical connecting terminals are formed. The electrical connecting terminal of one of the two flexible substrates is disposed on a side surface of the plug, while the electrical connecting terminal of the other flexible substrate is disposed on a bottom face of the plug.

According to this embodiment, the electrical coupling is established by the electrical connecting terminals which are simply structured and the electrical connecting terminals which can be arranged a lot. Thus, a plug for optical and electric signals transmission which is small and thin and has a lot of electrical connecting terminals can be realized.

In one embodiment, the electrical connecting terminal of the receptacle includes electrical connecting terminals provided on an inner side surface and an inner bottom face of the fitting recess, and the electrical connecting terminal formed on the surface of the flexible substrate includes electrical connecting terminals disposed on a side surface and a bottom face of the plug.

According to this embodiment, the electrical connecting terminals which are simply structured and the electrical connecting terminals which can be arranged a lot are formed on the same flexible substrate. Thus, the plug for optical and electric signals transmission, which is small and thin and has as many electrical connecting terminals as possible, can be further reduced in thickness.

In one embodiment, the electric signal transmission line is a coaxial cable including a copper wire, and the electrical connecting terminal of the plug connected to the electrical connecting terminal of the receptacle is provided on the periphery of the plug and soldered to the copper wire.

According to this embodiment, the copper wire of the coaxial cable is soldered to the electrical connecting terminal of the plug. Thus, an electric signal transmission line which is not limited in bending direction can be realized.

In one embodiment, the light-emitting element of the optical transmitting device and the light-receiving element and signal processing circuit of the optical receiving device are mounted on a lead frame and sealed with resin.

According to this embodiment, a receptacle which is small, thin, space-saving, and of a lead type can be realized.

In one embodiment, the light-emitting element of the optical transmitting device and the light-receiving element and signal processing circuit of the optical receiving device are mounted on a rigid printed circuit board and sealed with resin.

According to this embodiment, a receptacle which is small, thin, space-saving, and of a surface-mounted type can be realized.

In one embodiment, of regions of the bottom face of the receptacle, which is a surface opposite to a surface in which the fitting recess is formed, an outer region outside of a region opposite to the fitting recess is lower than the region opposite to the fitting recess by a predetermined height such that the region opposite to the fitting recess is made a protrusion and that the outer region serves as a mounting surface for a substrate. And, the substrate on which the receptacle is mounted has a fitting portion which has a shape corresponding to the shape of the protrusion of the receptacle so that the protrusion is fitted in the fitting portion in order that the mounting surface of the receptacle comes into contact with a surface of the substrate when the protrusion of the receptacle is fitted in the fitting portion, whereby a mounting height of the receptacle to the substrate is made low and a mounting position of the receptacle to the substrate is fixed.

According to this embodiment, the mounting surface of the receptacle for the substrate is positioned higher than the bottom face. This makes it possible to realize an optical and electric signals transmission apparatus that has the receptacle mounted to the substrate at a reduced height (i.e., a small mounting height) and that is easy to be surface-mounted.

In one embodiment, the optical transmitting device and the optical receiving device are separated from each other.

According to this embodiment, the optical transmitting device and the optical receiving device are formed to be separated from each other, so that at a production stage where the yield of one of the light-emitting element or the light-receiving element is lower than the yield of the other, the production process can be efficiently performed without influence of the lower degree of the yield upon the higher degree of the yield.

In one embodiment, the optical transmitting device and the optical receiving device are formed in one piece to constitute an optical transmitting and receiving device, and a groove for separating the light-emitting element and the light-receiving element from each other is provided between the optical receiving device and the optical transmitting device of the optical transmitting and receiving device.

According to this embodiment, the optical transmitting device and the optical receiving device are formed in one piece to constitute an optical transmitting and receiving device, so that the optical and electric signals transmission apparatus can be assembled easily and thus manufactured efficiently at low cost.

In one embodiment, the optical signal transmission line is an optical waveguide, and when the plug is fitted in the fitting recess of the receptacle, the optical coupling is established between an end face of the optical waveguide and the light-emitting element or the light-receiving element.

According to this embodiment, the optical signal transmission line is constituted by an optical waveguide. Thus, the optical coupling portion of the receptacle and the plug can be made smaller and this contributes to further reduction in size and thickness of the optical and electric signals transmission apparatus performing one-way high-speed optical signal transmission and two-way or one-way electric signal transmission. As a result, a space-saving apparatus is realized.

In one embodiment, the optical signal transmission line comprises a pair of optical waveguides, one for transmission and the other for reception. And, when the plug is fitted in the fitting recess of the receptacle, the optical coupling is established between an end face of the optical waveguide for transmission and the light-emitting element, while the optical coupling is established between an end face of the optical waveguide for reception and the light-receiving element.

According to this embodiment, the optical signal transmission line is constituted by a pair of an optical waveguide for transmission and an optical waveguide for reception. Thus, the optical coupling portion of the receptacle and the plug can be made smaller and the optical and electric signals transmission apparatus performing two-way high-speed optical signal transmission and two-way or one-way electric signal transmission can be reduced in size and thickness to be space-saving.

In one embodiment, the electric signal transmission line is a flexible substrate including a metal pattern, and the optical waveguide which is the optical signal transmission line is formed in and held by the flexible substrate. The flexible substrate constitutes an optical and electric signals transmission line.

According to this embodiment, the optical waveguide which is the optical signal transmission line is formed in and held by the flexible substrate including the metal pattern which is the electric signal transmission line. This means that the optical waveguide shares the flexible substrate with the metal pattern. Thus, a plug, which is small, thin and easy to assemble, is obtained.

In one embodiment, the plug mounted, on its periphery, with the end portion of the flexible substrate having the electrical connecting terminal on its surface is formed in one piece by insert-molding the flexible substrate having the electrical connecting terminal on its surface and a resin plug body together.

According to this embodiment, the flexible substrate having the electrical connecting terminal on its surface and the resin plug body are formed together by insert-molding. Thus, the process of assembling the plug is simplified and a small and thin optical and electric signals transmission apparatus which is excellent in productivity is obtainable.

In one embodiment, the plug having the electrical connecting terminal on its surface is formed in one piece by insert-molding the electrical connecting terminal and the resin plug body together, and the copper wire of the coaxial cable is soldered to the electrical connecting terminal which is integrally formed with the plug body.

According to this embodiment, after the electrical connecting terminals and the resin plug body have been insert-molded in one piece, the copper wire of the coaxial cable is soldered to the electrical connecting terminal. Thus, a small and thin optical and electric signals transmission apparatus which is excellent in flexibility is easily obtainable.

In one embodiment, the optical signal transmission line is an optical waveguide. And, when the plug is fitted in the fitting recess of the receptacle, the optical coupling is established between an end face of the optical waveguide and the light-emitting element or the light-receiving element.

According to this embodiment, the process of assembling the plug can be simplified, and a small and thin optical and electric signals transmission apparatus which is excellent in productivity is obtainable.

In one embodiment, the light-emitting element is a surface emitting laser.

According to this embodiment, the light-emitting element is constituted by a surface emitting laser, which simplifies the structure of the optical transmitting device. Thus, a small, thin, and low-cost optical and electric signals transmission apparatus is obtainable.

According to another aspect of the present invention, there is provided an optical and electric signals transmission system comprising a first optical and electric signals transmission apparatus and a second optical and electric signals transmission apparatus, each of the first optical and electric signals transmission apparatus and the second optical and electric signals transmission apparatus consisting of the described optical and electric signals transmission apparatus according to the present invention. In this system, the electric signal transmission line of the first optical and electric signals transmission apparatus and the electric signal transmission line of the second optical and electric signals transmission apparatus are electrically coupled with each other, while the optical signal transmission line of the first optical and electric signals transmission apparatus and the optical signal transmission line of the second optical and electric signals transmission apparatus are optically coupled with each other. The first optical and electric signals transmission apparatus includes at least the optical transmitting device and a drive control circuit driving and controlling the light-emitting element of the optical transmitting device. The second optical and electric signals transmission apparatus includes at least the optical receiving device, a receiving circuit extracting a receiving signal from a light-receiving signal obtained by the signal processing circuit of the optical receiving device, and a receiving level detecting circuit detecting the level of the receiving signal. The second optical and electric signals transmission apparatus is configured to receive an optical signal transmitted from the first optical and electric signals transmission apparatus through the optical signal transmission line and transmit to the first optical and electric signals transmission apparatus through the electric signal transmission line an electric signal representing the level of the receiving signal extracted from the light-receiving signal, which is obtained by receiving the optical signal. And, the drive control circuit of the first optical and electric signals transmission apparatus controls the light-emitting element in such a manner that an amount of light emitted by the light-emitting element becomes optimum, on the basis of the level of the receiving signal represented by the electric signal transmitted from the second optical and electric signals transmission apparatus.

According to this configuration, the drive control circuit of the first optical and electric signals transmission apparatus drives and controls the light-emitting element in such a manner that the amount of light emitted by the light-emitting element becomes optimum, on the basis of the level of a receiving signal represented by an electric signal transmitted from the second optical and electric signals transmission apparatus. Thus, an optical and electric signals transmission system is achievable which is able to obtain an optimum level optical signal with relative ease and which is capable of steady high-speed optical transmission. In addition, the optical and electric signals transmission apparatus of the present invention which can be reduced in size and thickness is used as the first optical and electric signals transmission apparatus and the second optical and electric signals transmission apparatus. Thus, an optical and electric signals transmission system which is small, thin, and suitable for mounting on portable equipment is achievable.

In one embodiment, each of the first optical and electric signals transmission apparatus and the second optical and electric signals transmission apparatus includes the optical transmitting device, the optical receiving device, the drive control circuit driving and controlling the light-emitting element of the optical transmitting device, the receiving circuit extracting a receiving signal from a light-receiving signal obtained by the signal processing circuit of the optical receiving device, and the receiving level detecting circuit detecting the level of the receiving signal. One of the first optical and electric signals transmission apparatus or the second optical and electric signals transmission apparatus that has received an optical signal transmitted through the optical signal transmission line transmits an electric signal representing the level of the receiving signal based on the obtained light-receiving signal to the other optical and electric signals transmission apparatus through the electric signal transmission line. One of the first optical and electric signals transmission apparatus or the second optical and electric signals transmission apparatus that has received the electric signal representing the level of the receiving signal transmitted through the electric signal transmission line controls the light-emitting element by the drive control circuit in such a manner that an amount of light emitted by the light-emitting element becomes optimum, on the basis of the level of the receiving signal represented by the electric signal.

According to this configuration, the optical and electric signals transmission system is capable of performing steady two-way high-speed optical transmission, and is small, thin, and suitable for mounting on portable equipment.

In one embodiment, the electric signal transmitted from the second optical and electric signals transmission apparatus to the first optical and electric signals transmission apparatus through the electric signal transmission line is an analog electric signal.

According to this embodiment, the electric signal representing the level of the receiving signal is an analog electric signal. Thus, the level of the received optical signal can be amplified and directly fed back to the first optical and electric signals transmission apparatus, so that the first optical and electric signals transmission apparatus is able to directly drive and control the light-emitting element by the drive control circuit on the basis of the fed back analog signal. As a result, an optical and electric signals transmission system which is able to perform steady high-speed optical transmission with a simple circuit is achievable.

In one embodiment, the drive control circuit of the first optical and electric signals transmission apparatus includes an analog processing circuit setting a drive current for the light-emitting element on the basis of the analog electric signal transmitted from the second optical and electric signals transmission apparatus.

According to this embodiment, the analog processing circuit sets a drive current for the light-emitting element on the basis of an analog electric signal. An optical and electric signals transmission system which is able to perform steady high-speed optical transmission with a simple circuit is thus achievable.

In one embodiment, the electric signal transmitted from the second optical and electric signals transmission apparatus to the first optical and electric signals transmission apparatus through the electric signal transmission line is a digital electric signal.

According to this embodiment, the electric signal representing the level of the receiving signal is a digital electric signal. Thus, the optical and electric signals transmission system is able to transmit and receive the level of the receiving signal using a steady digital electric signal and perform steady high-speed optical transmission.

In one embodiment, the first optical and electric signals transmission apparatus includes a D/A converter converting the digital electric signal transmitted from the second optical and electric signals transmission apparatus to an analog electric signal. And, the drive control circuit of the first optical and electric signals transmission apparatus sets a drive current for the light-emitting element on the basis of the analog electric signal obtained by the D/A converter.

According to this embodiment, the digital electric signal which has been transmitted is converted to an analog electric signal by the D/A converter, and then a drive current for the light-emitting element is set based on the analog electric signal. Thus, an optical and electric signals transmission system which is able to perform steady high-speed optical transmission with a simple circuit is achievable.

In one embodiment, the optical and electric signals transmission system further includes a microcomputer which receives the digital electric signal transmitted from the second optical and electric signals transmission apparatus, obtains using an internal correlation table a digital electric signal representing such a drive current for the light-emitting element that allows the amount of light emitted by the light-emitting element to be optimum, converts the digital electric signal to an analog electric signal by an internal D/A converter, and sends out the analog electric signal to the drive control circuit of the first optical and electric signals transmission apparatus. The drive control circuit of the first optical and electric signals transmission apparatus sets the drive current for the light-emitting element on the basis of the analog electric signal sent out from the microcomputer.

According to this embodiment, the microcomputer obtains from the received digital electric signal an analog electric signal representing a drive current for the light-emitting element allowing an optimum amount of light to be emitted by the light-emitting element, and a drive current for the light-emitting element is set based on the analog electric signal. Thus, the first optical and electric signals transmission apparatus dose not need to set a drive current for the light-emitting element in such a manner that the amount of light emitted by the light-emitting element becomes optimum. Thus, the optical and electric signals transmission system is able to perform steady high-speed optical transmission with the simple circuit configuration of the first optical and electric signals transmission apparatus.

In one embodiment, the digital electric signal transmitted from the second optical and electric signals transmission apparatus to the first optical and electric signals transmission apparatus is a serial signal.

According to this embodiment, the digital electric signal transmitted from the second optical and electric signals transmission apparatus to the first optical and electric signals transmission apparatus is a serial signal. Thus, the number of the electric signal transmission lines between the first optical and electric signals transmission apparatus and the second optical and electric signals transmission apparatus may be one, and a smaller and simpler optical and electric signals transmission system is achievable.

According to another aspect of the present invention, there is provided an electronic equipment comprising a first housing having a display unit, and a second housing connected with the first housing so as to rotate freely and having an operation unit, wherein the first housing is mounted with one of the first optical and electric signals transmission apparatus or the second optical and electric signals transmission apparatus of the above-described optical and electric signals transmission system of the present invention, the second housing is mounted with the other optical and electric signals transmission apparatus of the optical and electric signals transmission system, and transmission of optical and electric signals is performed between the first housing and the second housing by the optical and electric signals transmission system.

According to this configuration, transmission of the optical and electric signals is performed between the first housing having the display unit and the second housing having the operation unit by the optical and electric signals transmission system of the present invention which can be reduced in size and thickness. Thus, electronic equipment which is small, thin, and suitable for mounting on portable equipment is achievable.

In addition, little electromagnetic noise is generated by the first optical and electric signals transmission apparatus and the second optical and electric signals transmission apparatus, and the electromagnetic noise of the whole of the electronic equipment can be extremely reduced. For this reason, it becomes unnecessary to shield any of the optical and electric signals transmission apparatuses, and the electronic equipment can be more space-saving and compact.

The electronic equipment may be, for example, a mobile phone, a PDA, a notebook PC, a portable DVD, digital music equipment, or the like.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIGS. 17(a), 17(b), and 17(c) area front view, a side view, and a bottom view showing the configuration of a variation of an optical transmitting and receiving device shown in FIGS. 16(a), 16(b), and 16(c);

Figure 2A:
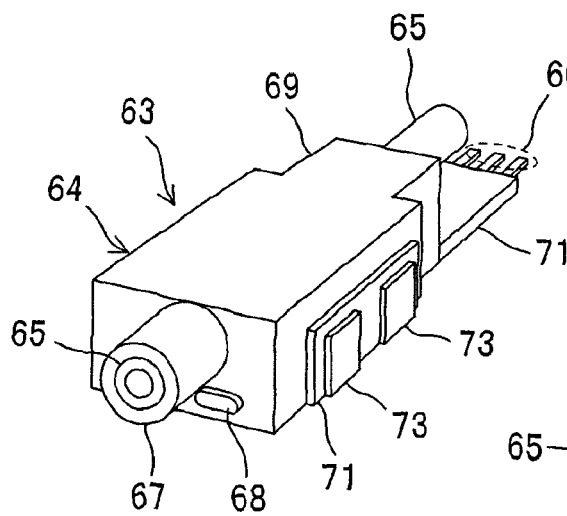
FIGS. 2(a) and 2(b) are perspective views of a plug to be fitted in a recess of a receptacle body in FIG. 1 seen from the front and the back.
Figure 2B:
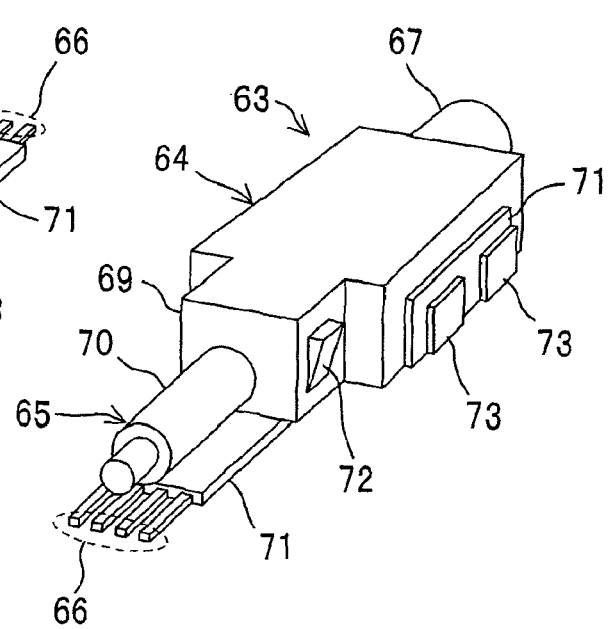
Figure 8A:
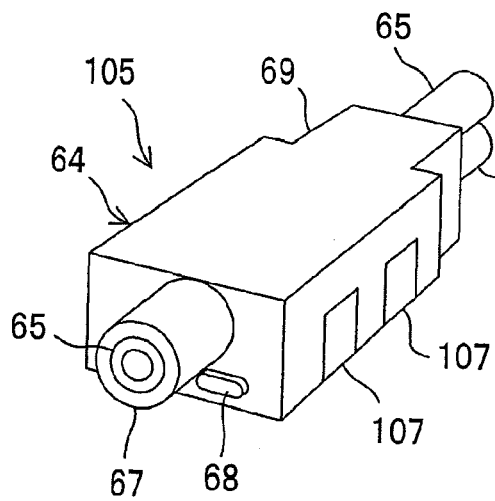
FIGS. 8(a) and 8(b) are perspective views of a plug according to an embodiment seen from the front and the back.
Figure 8B:
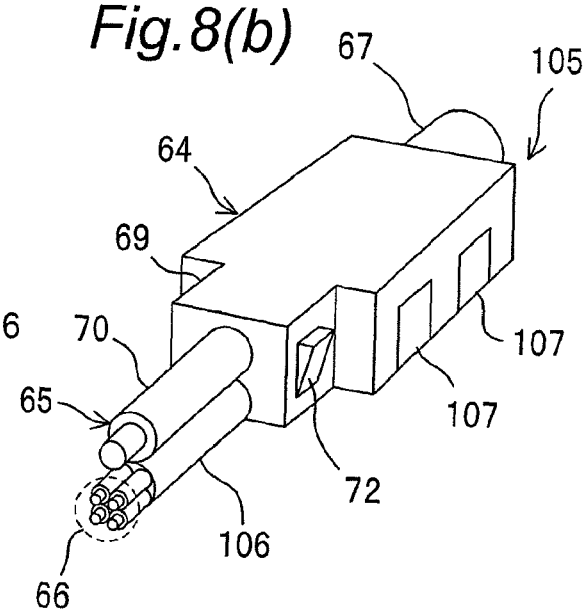
Figure 16A:
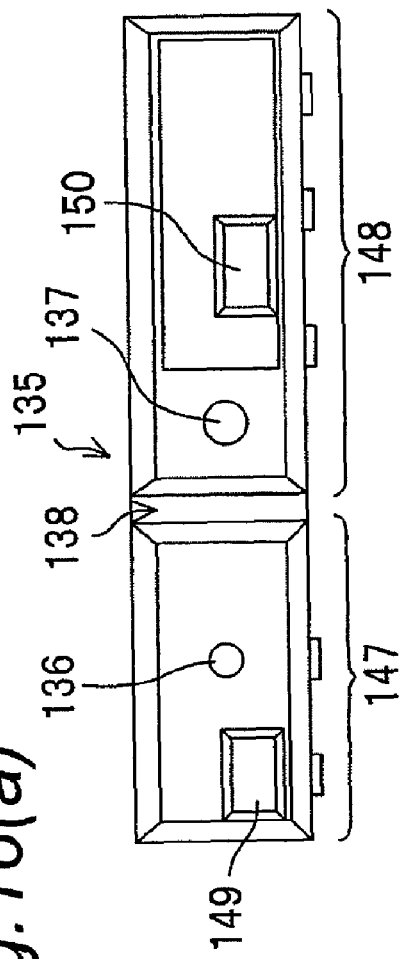
FIGS. 16(a), 16(b), and 16(c) area front view, a side view, and a bottom view showing the configuration of an optical transmitting and receiving device in FIG. 14.
Figure 16B:
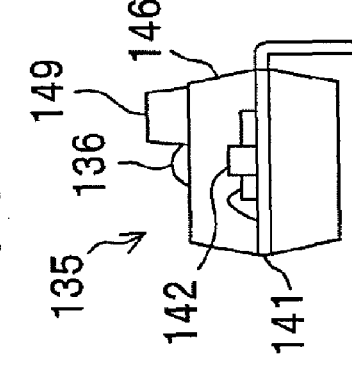
Figure 16C:
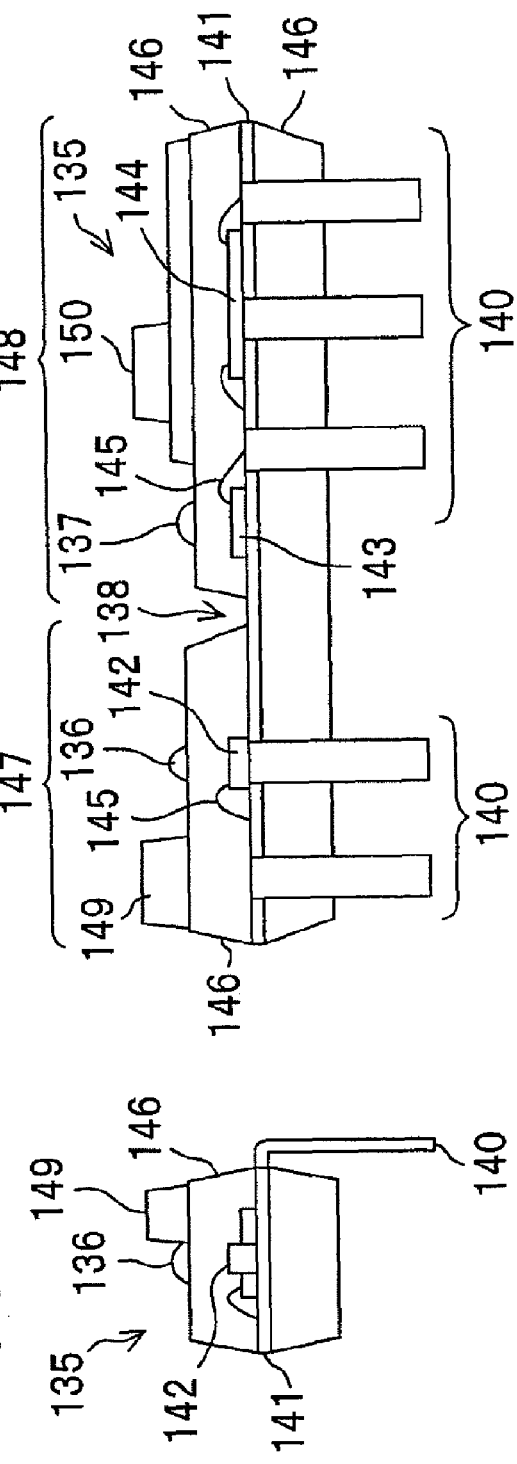
Figure 18:
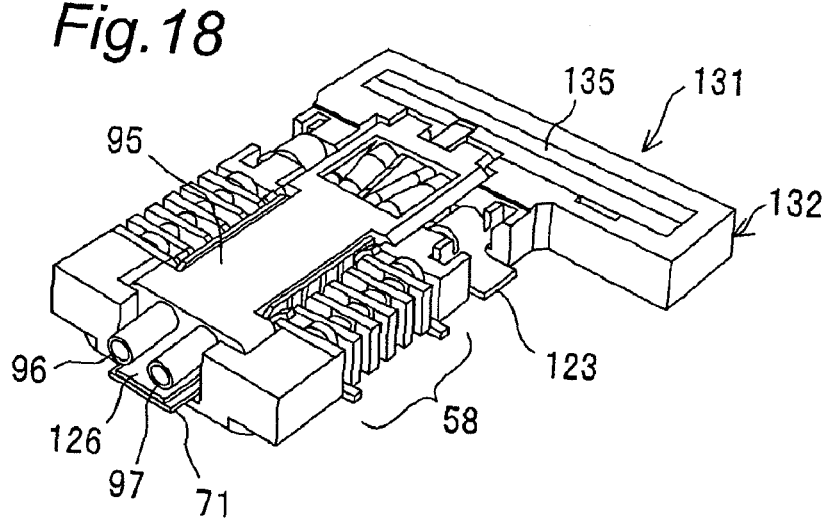
FIG. 18 is a general view of an optical and electric signals transmission apparatus in which the plug shown in FIGS. 7(a)
Figure 19:
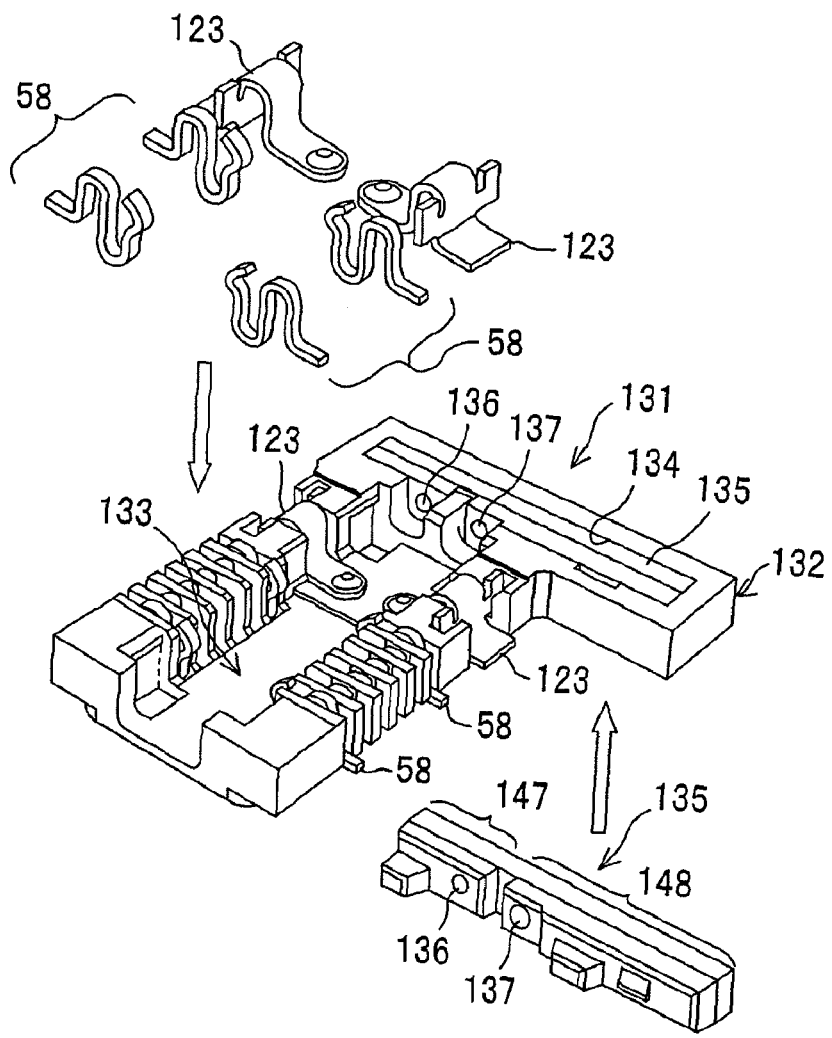
Figure 20A:
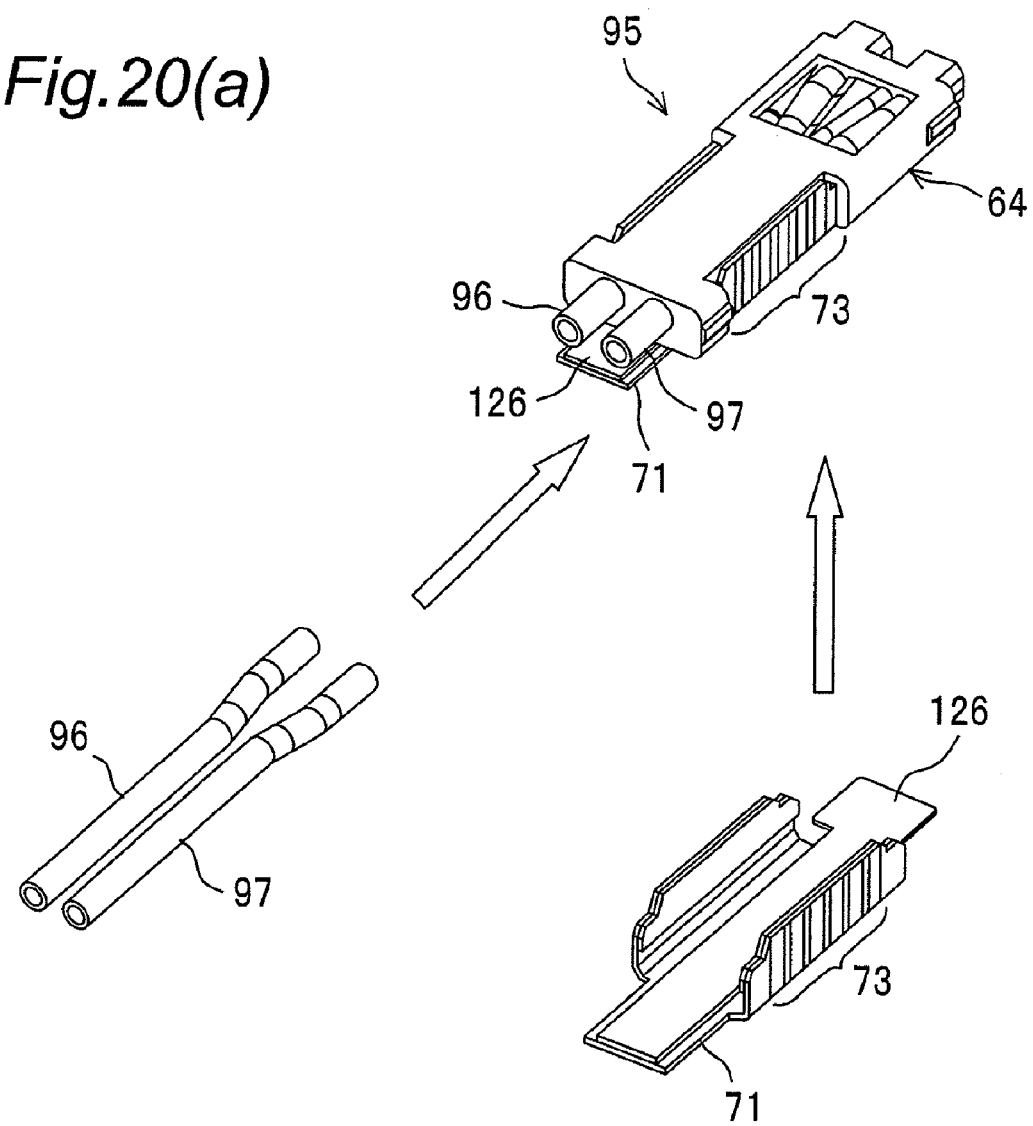
Figure 20B:
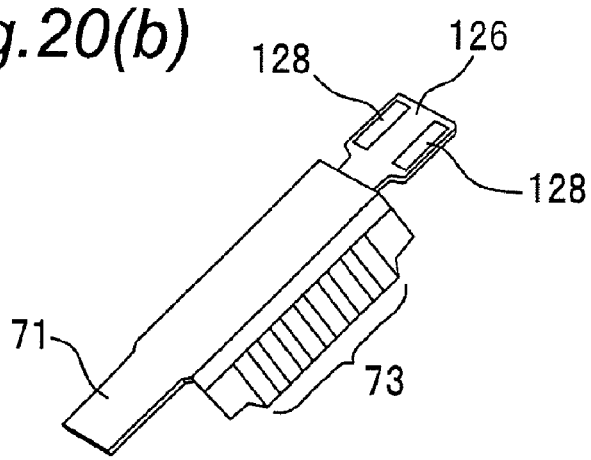
Figure 21:
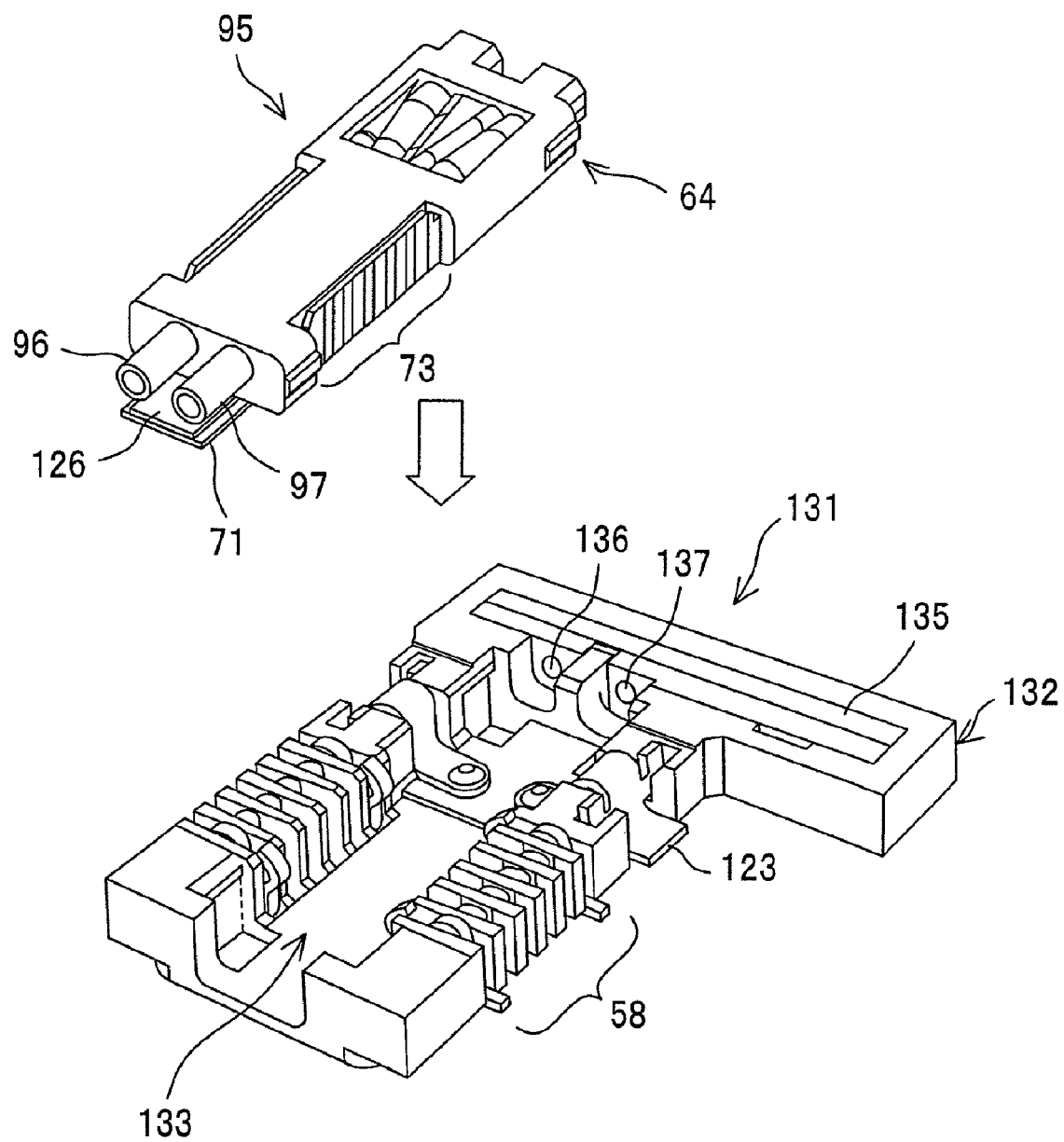
Figure 22A:
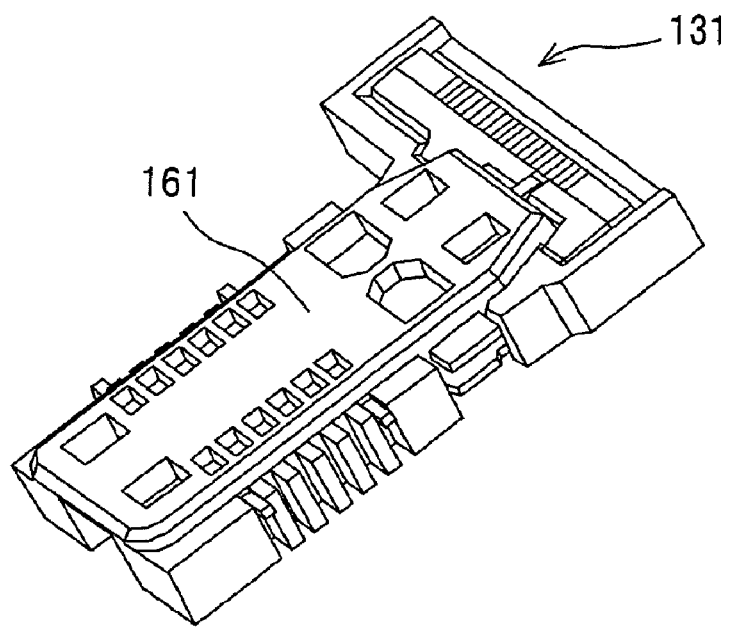
Figure 22B:
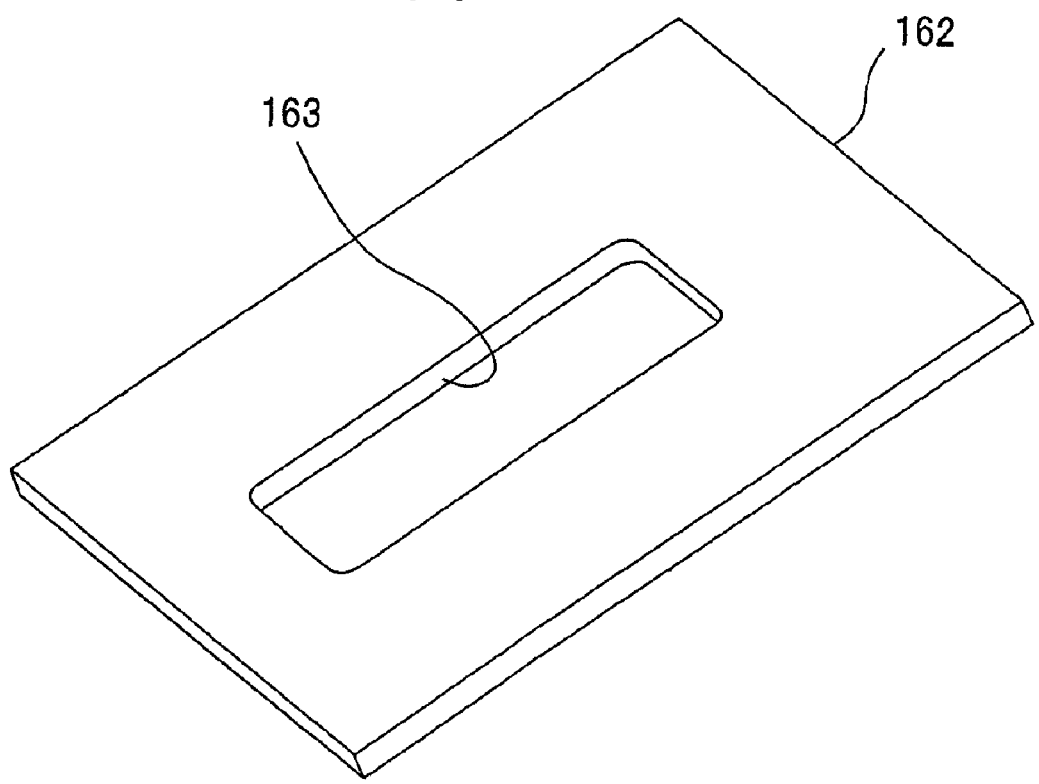
Figure 23A:
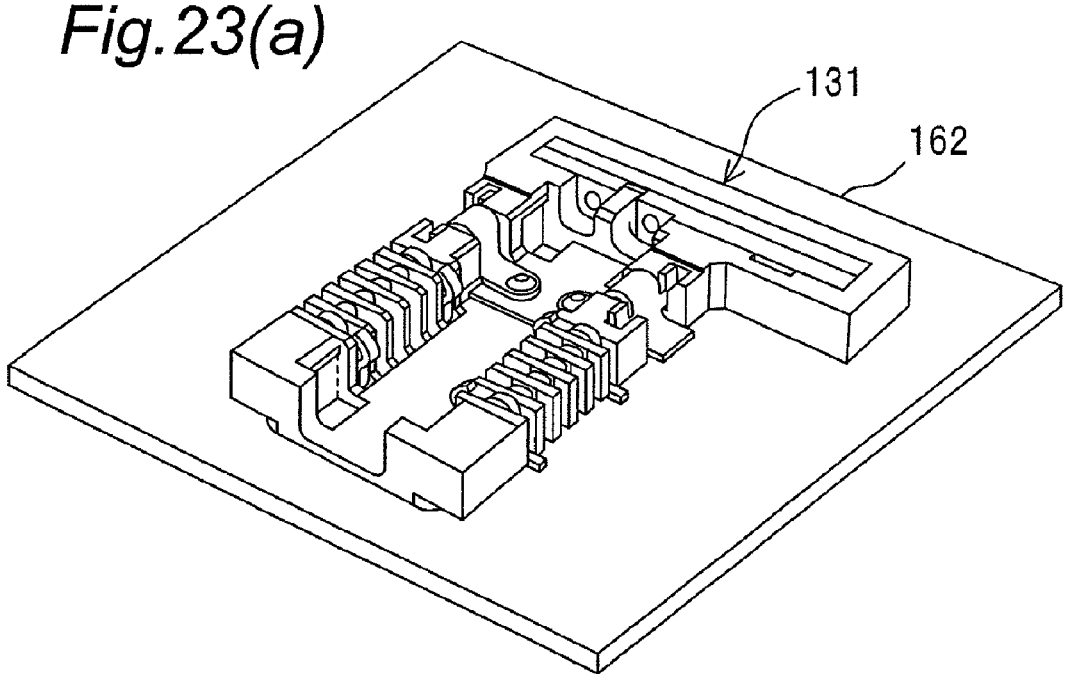
Figure 23B:
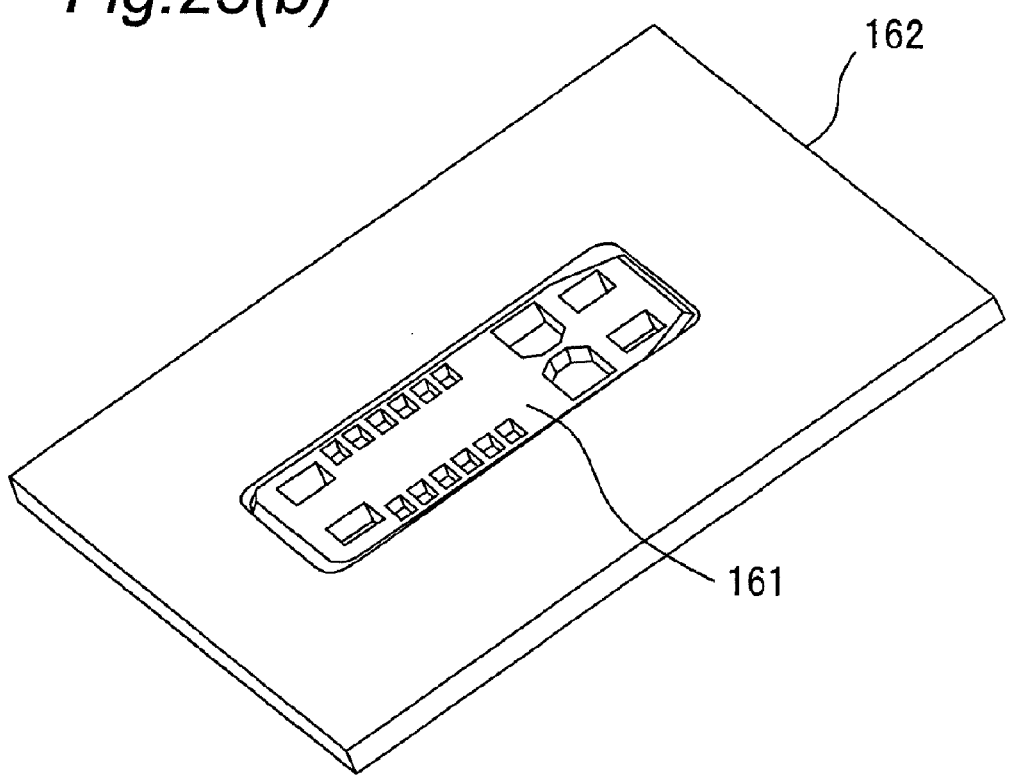
Figure 24A:
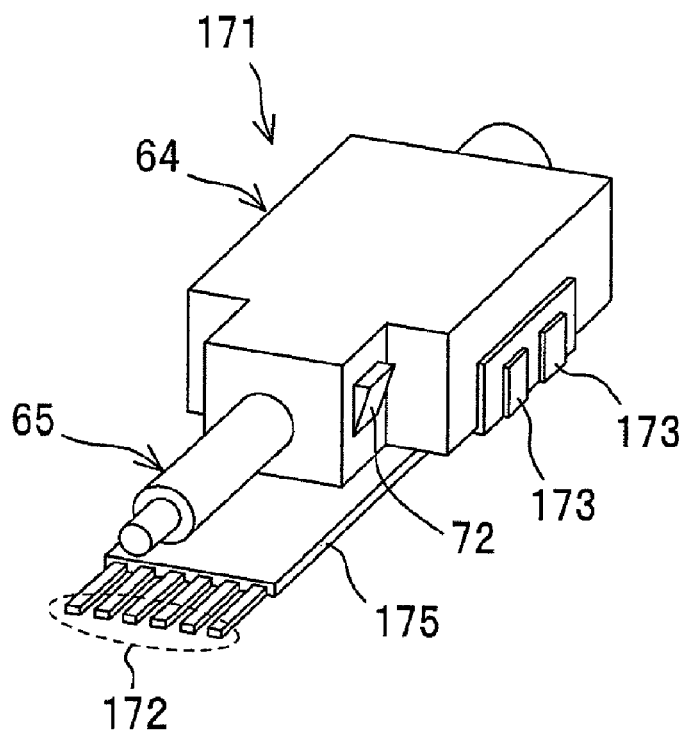
Figure 24B:
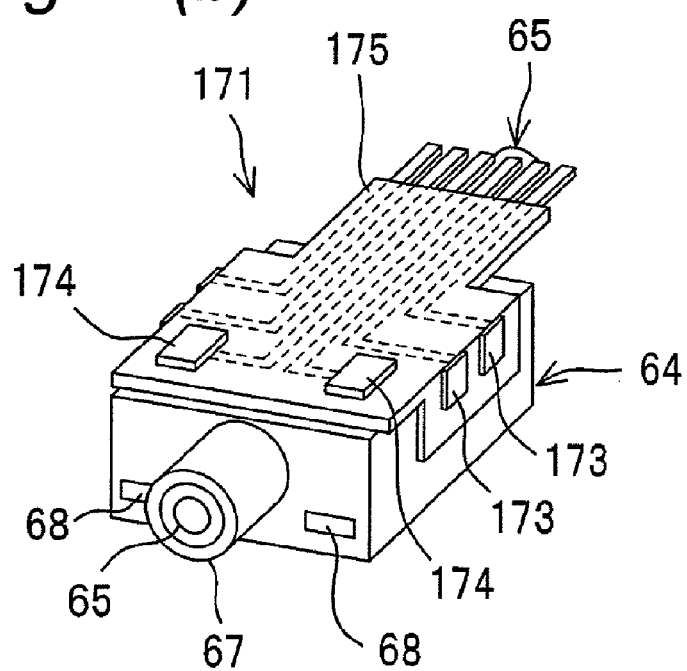
Figure 25:
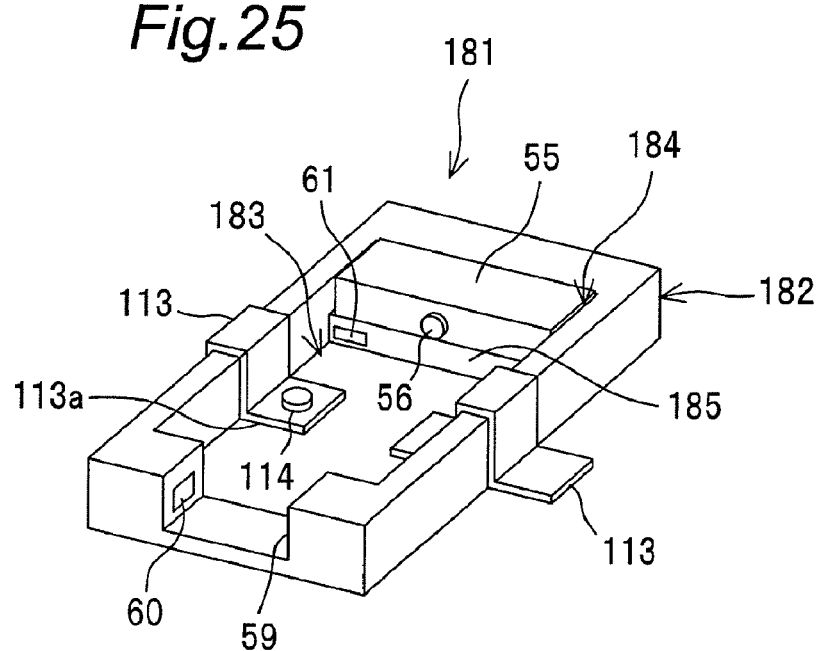
Figure 26A:
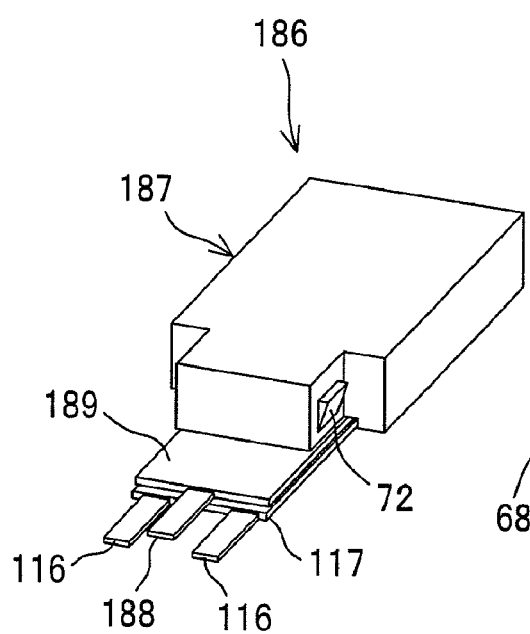
Figure 26B:
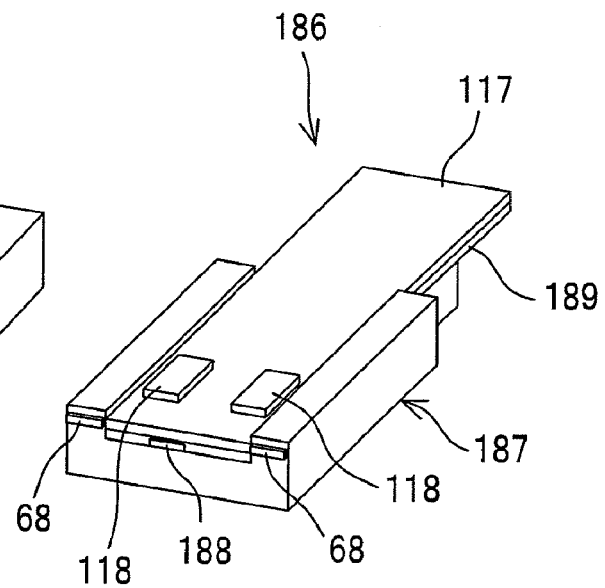
Figure 27A:
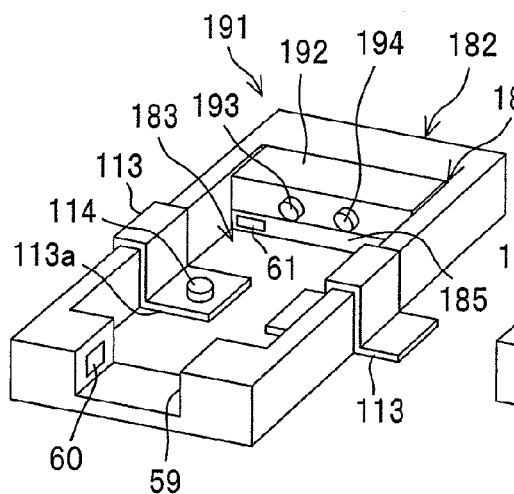
Figure 27B:
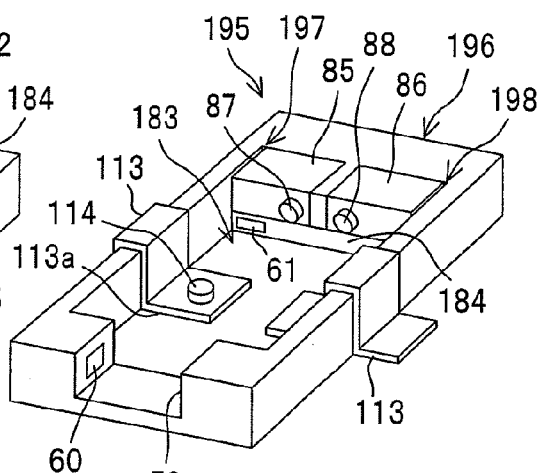
Figure 28A:
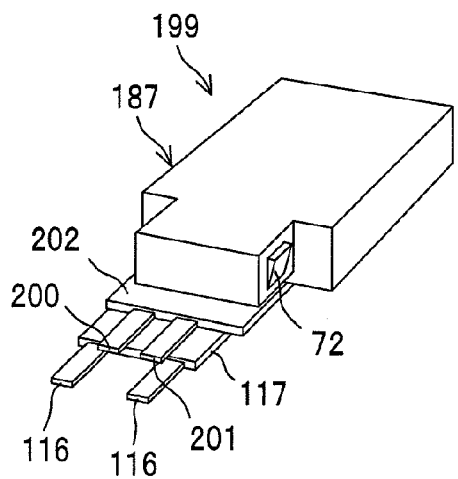
Figure 28B:
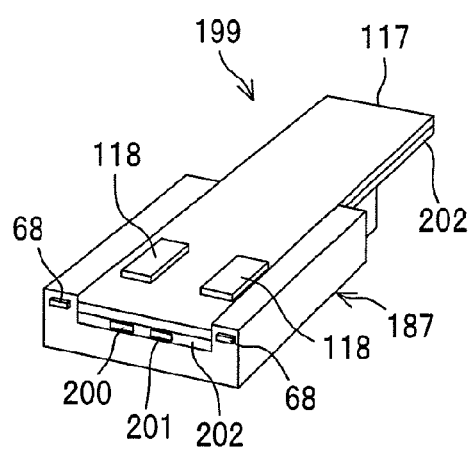
Figure 29A:
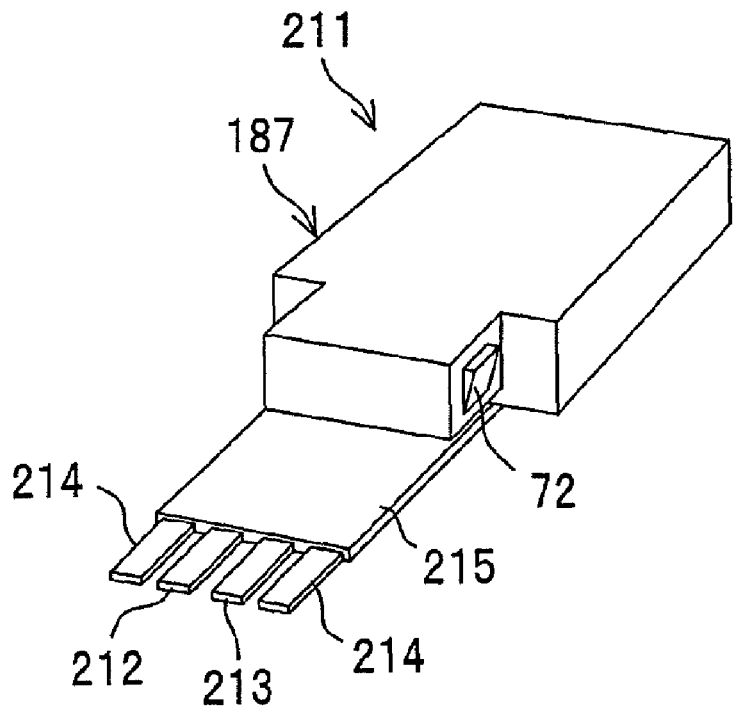
Figure 29B:
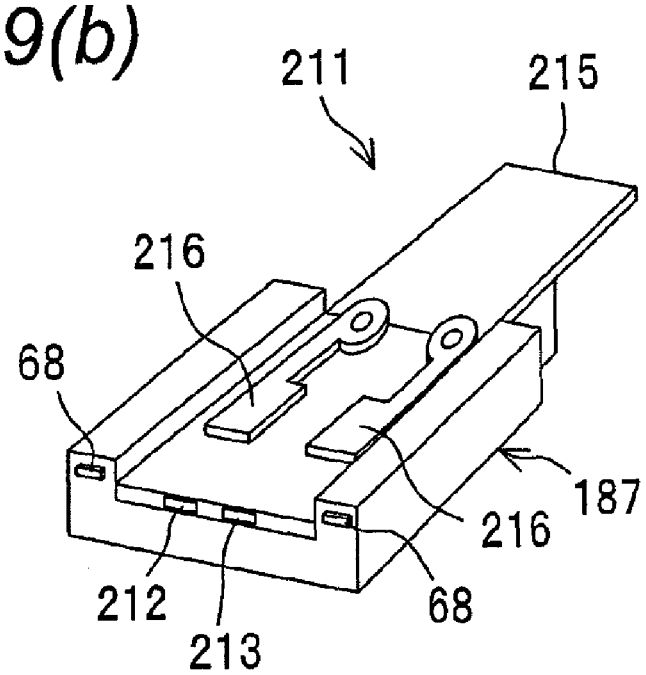
Figure 31:
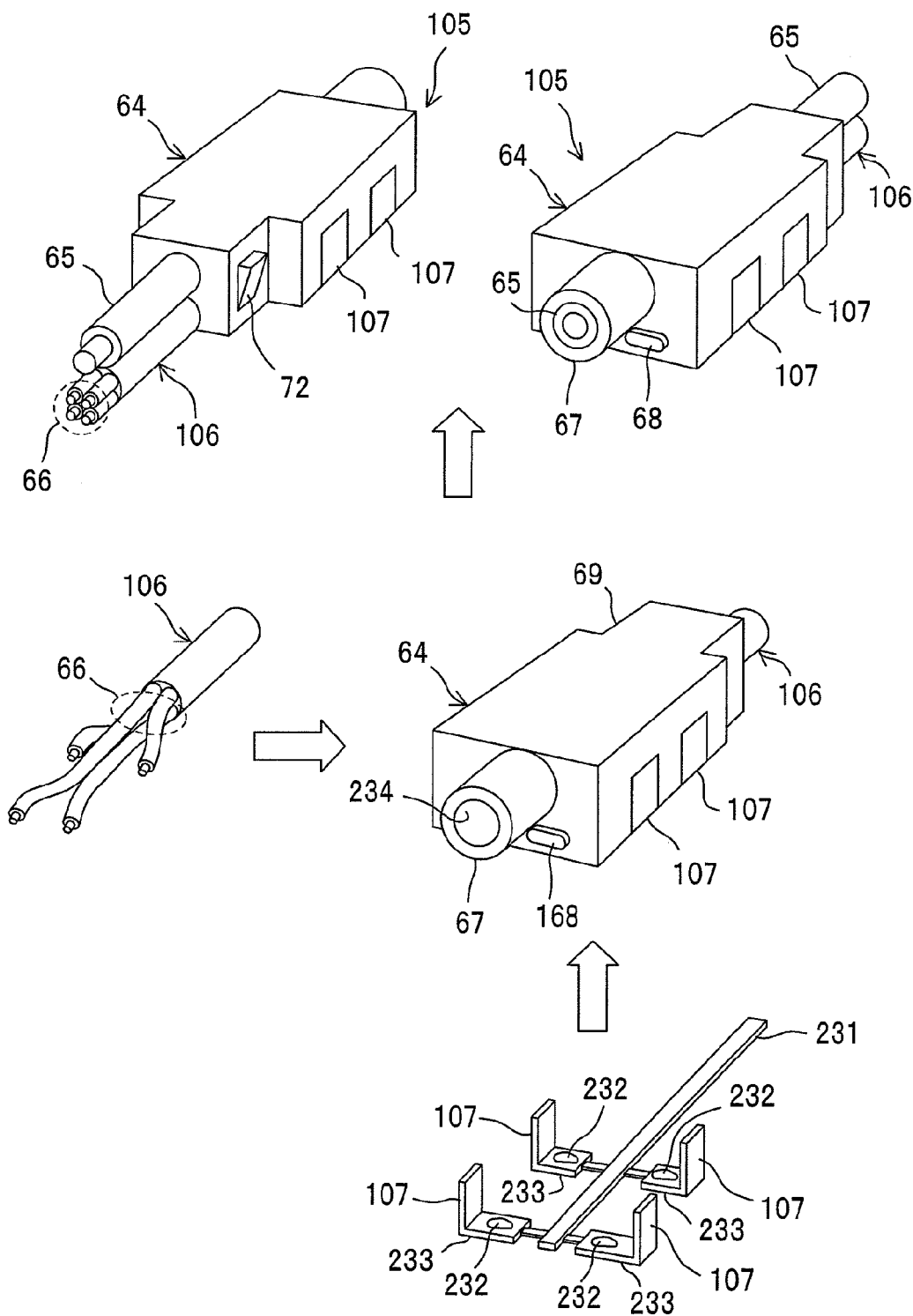
Figure 32:
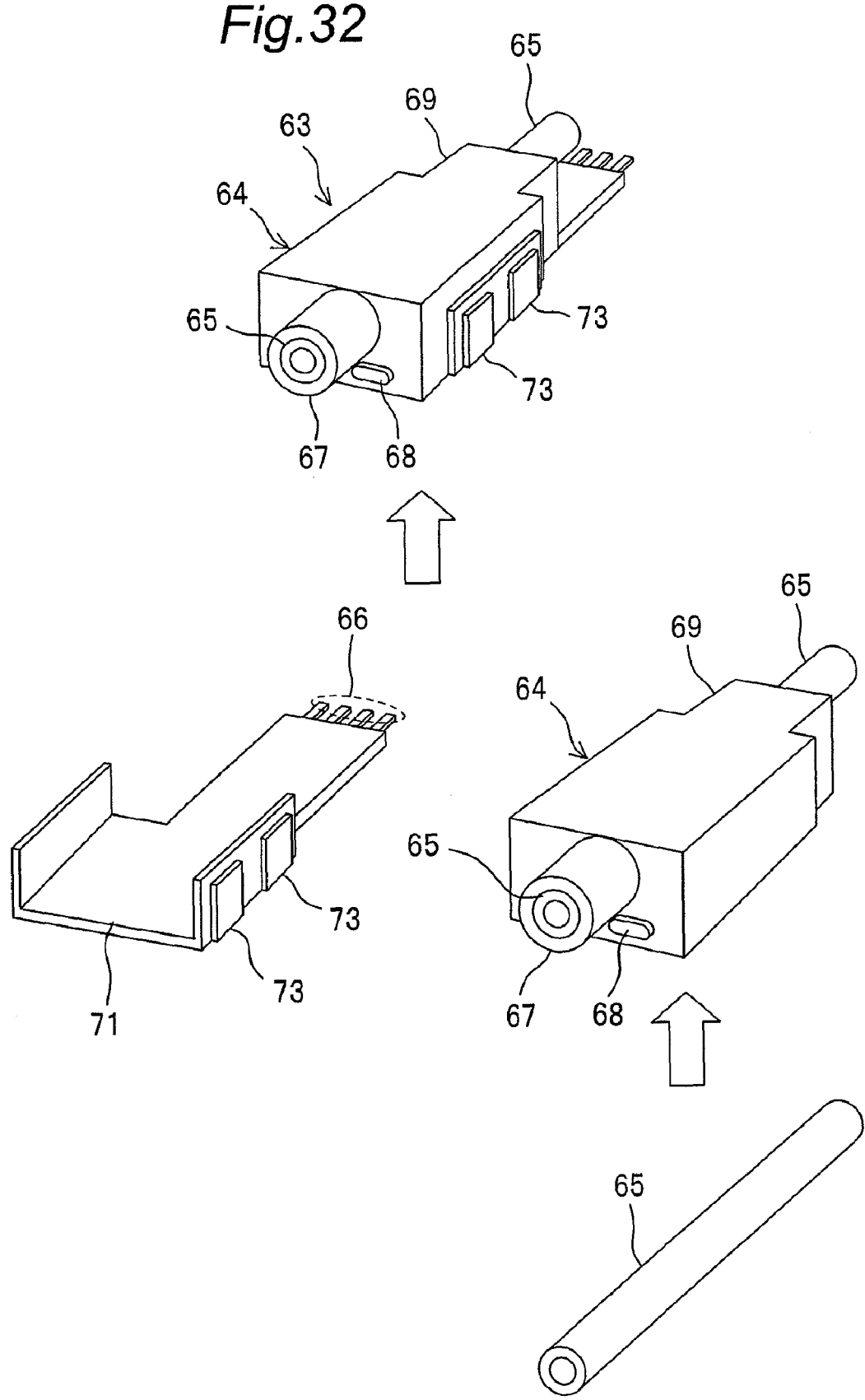
Figure 33:
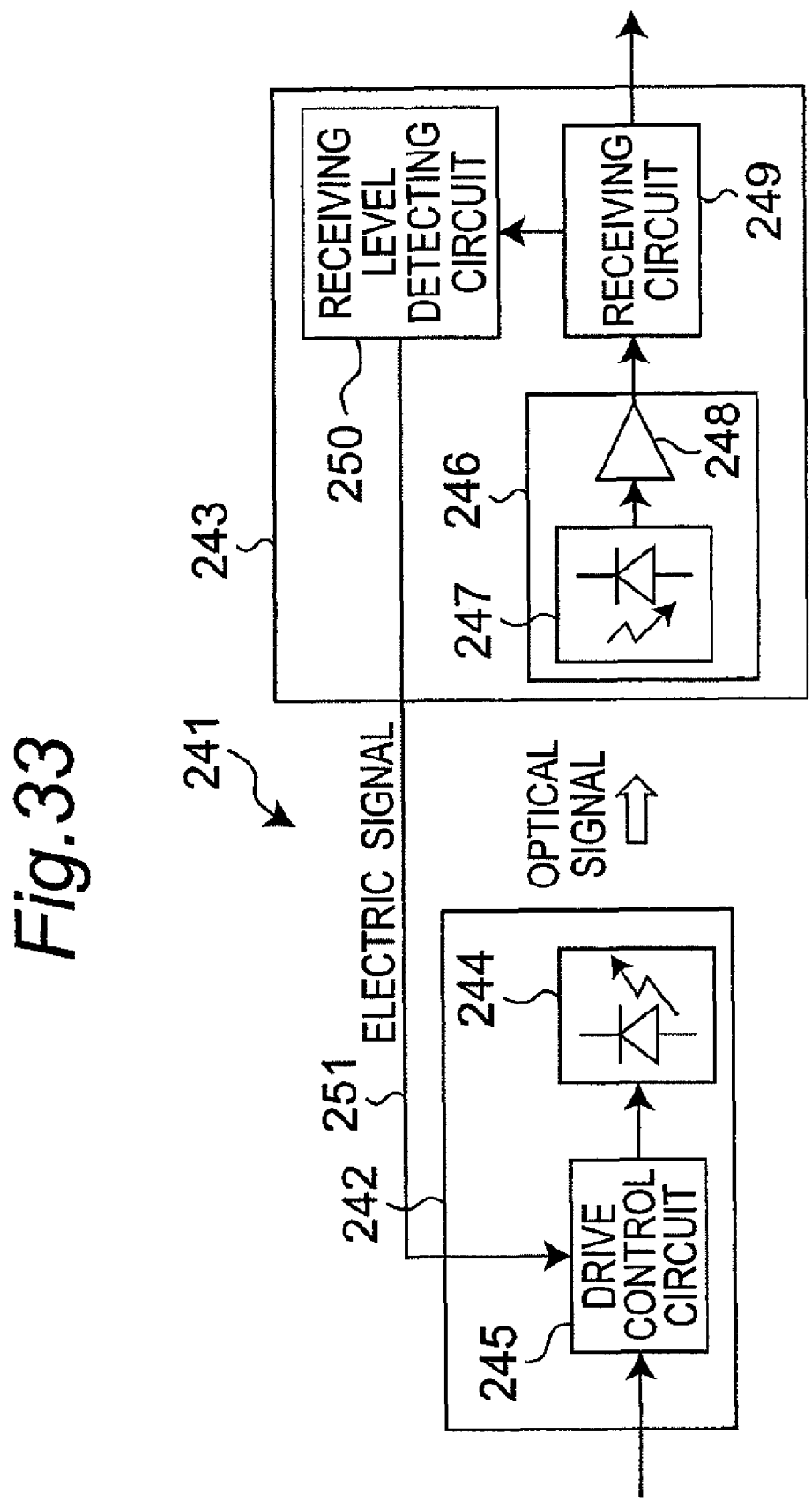
Figure 34:
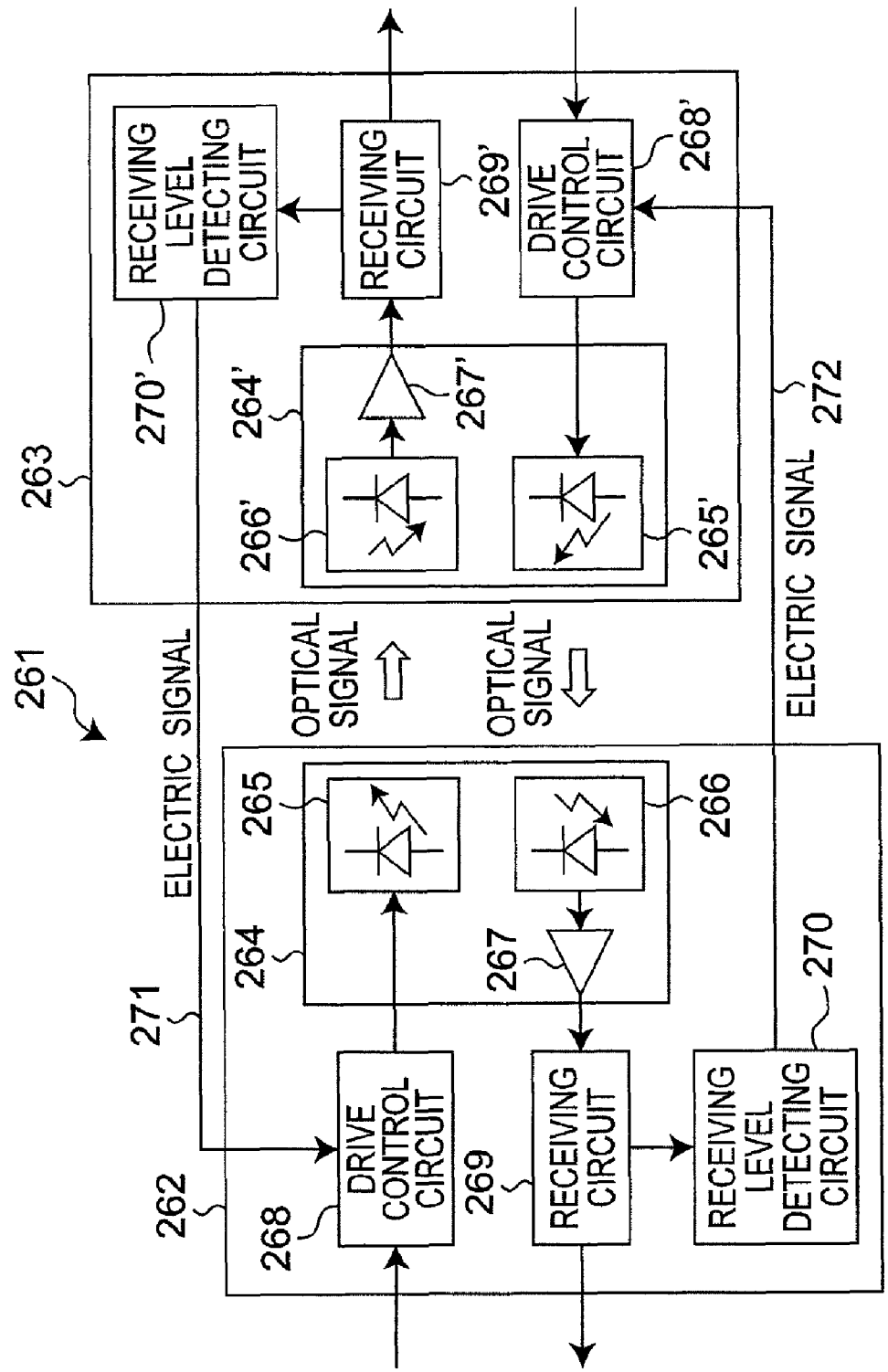
Figure 35:
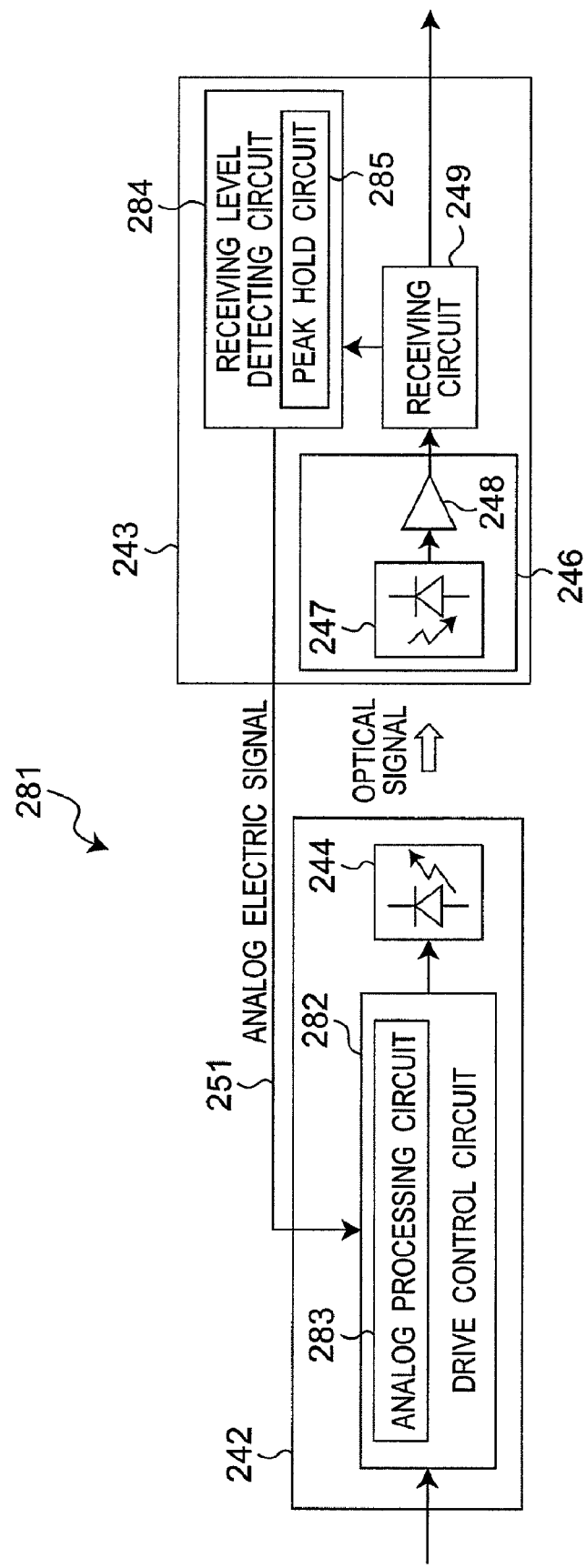
Figure 36:
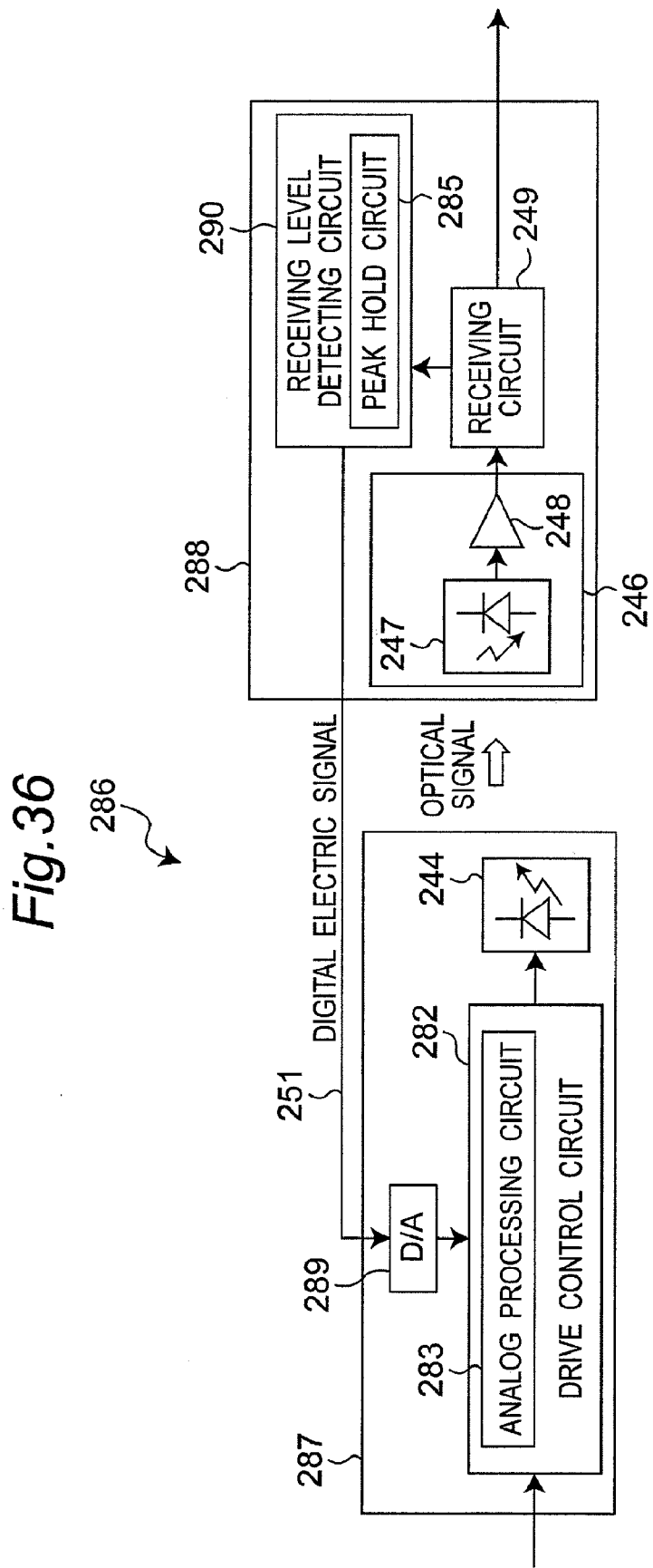
Figure 37:
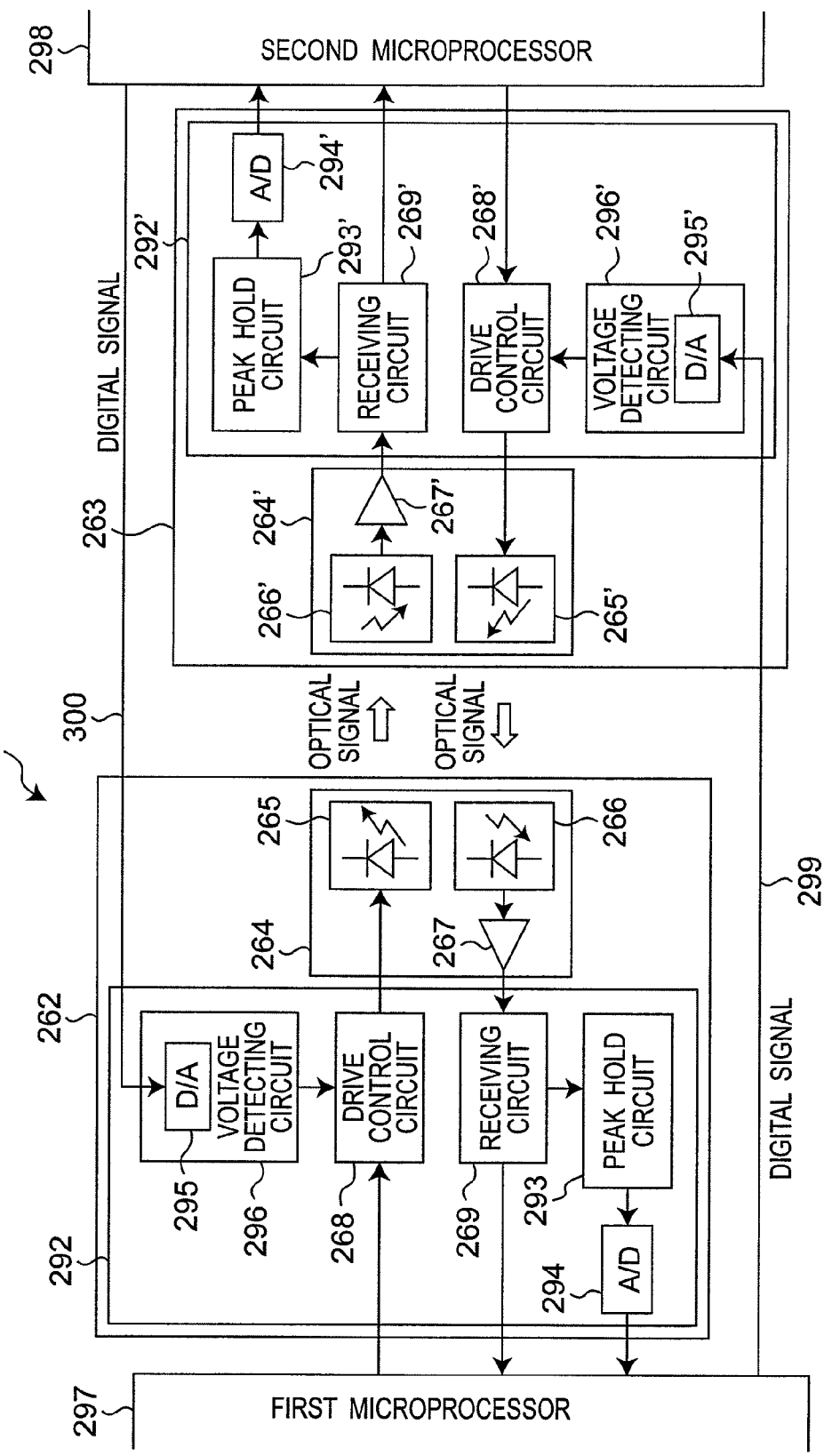
Figure 38:
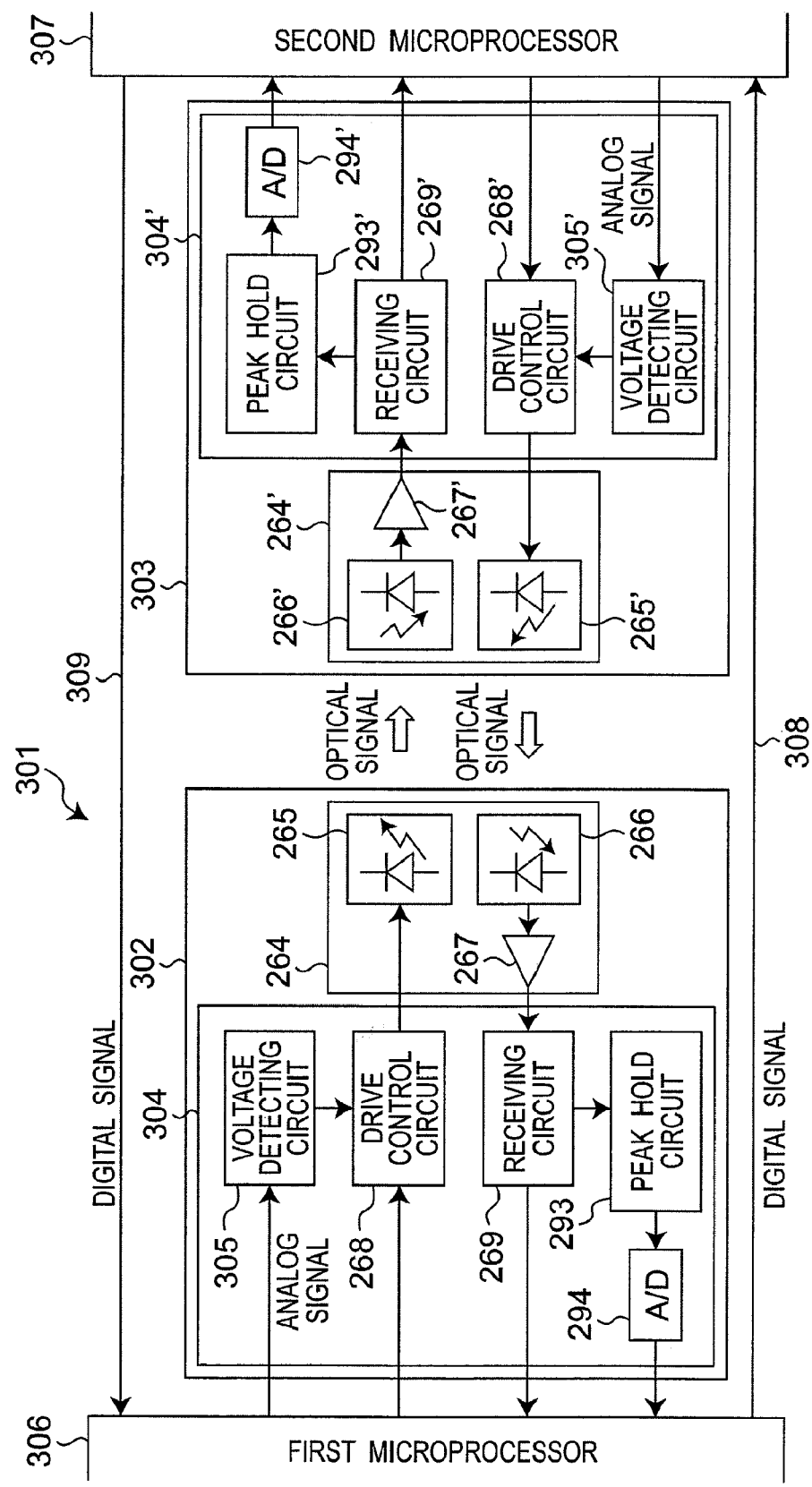
Figure 39:
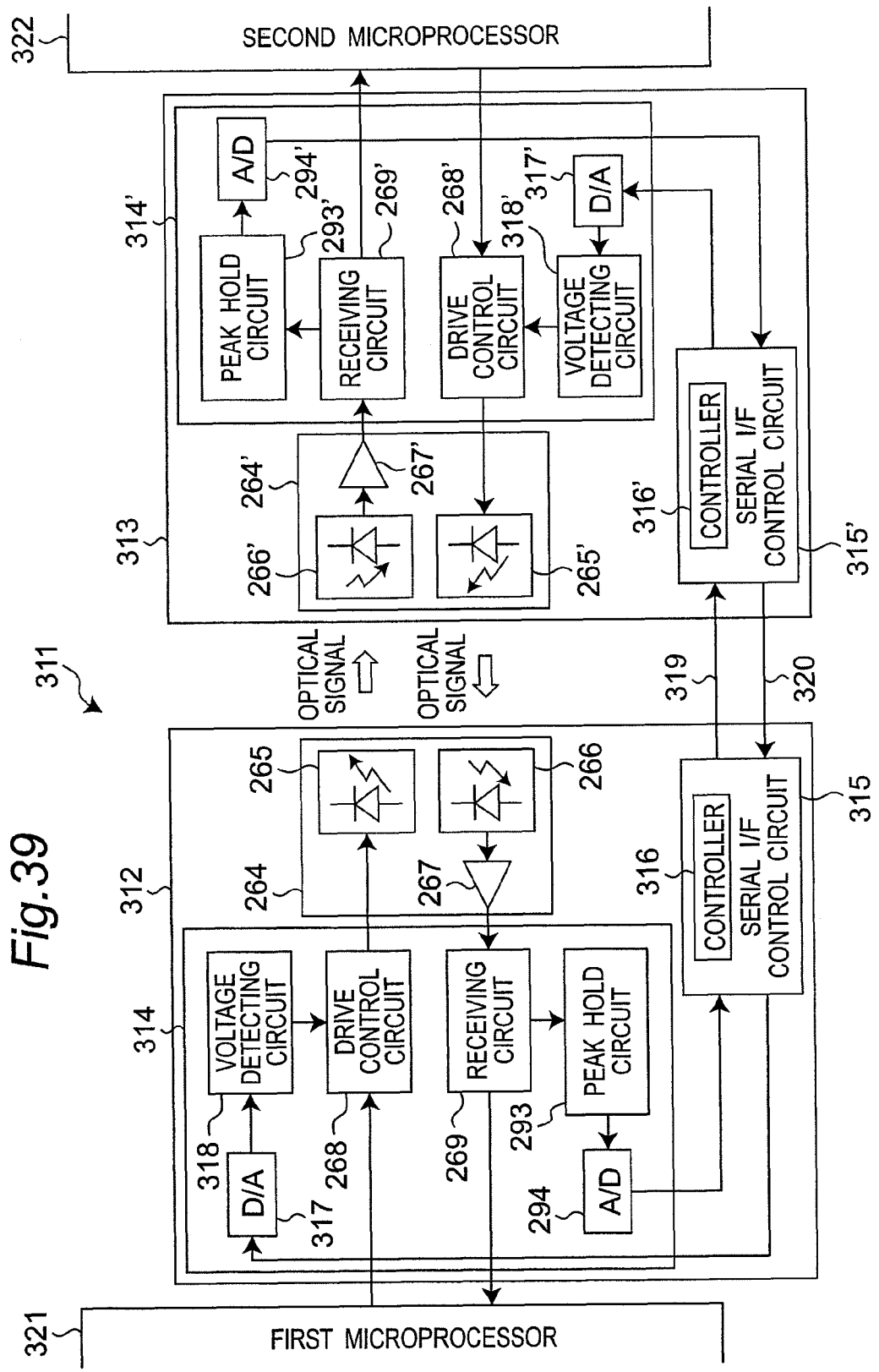
Figure 40A:
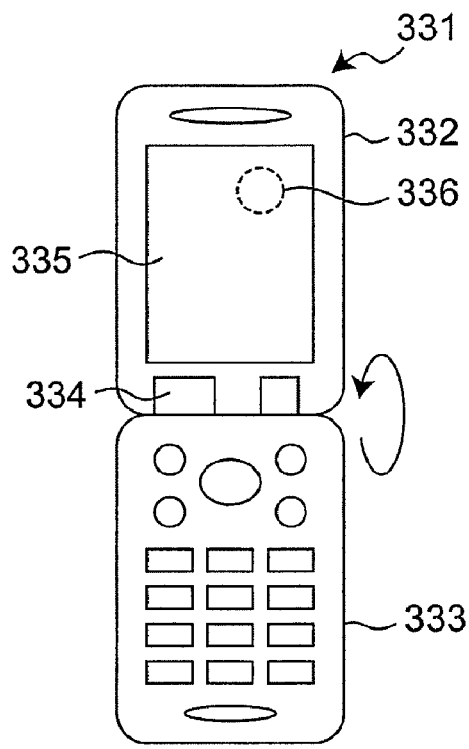
Figure 40B:
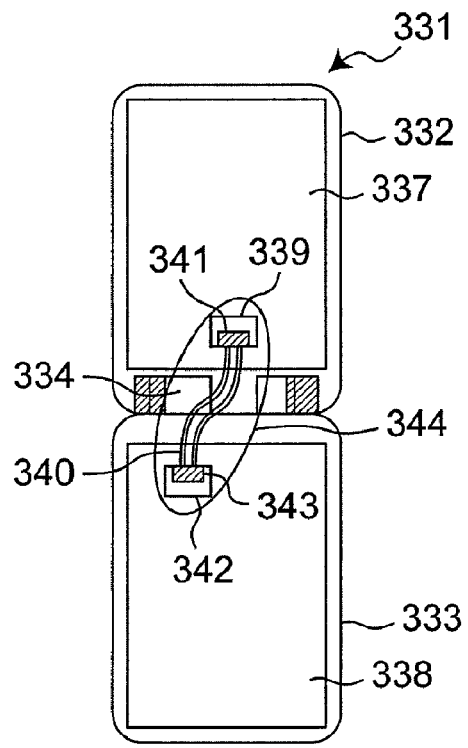
Figure 40C:
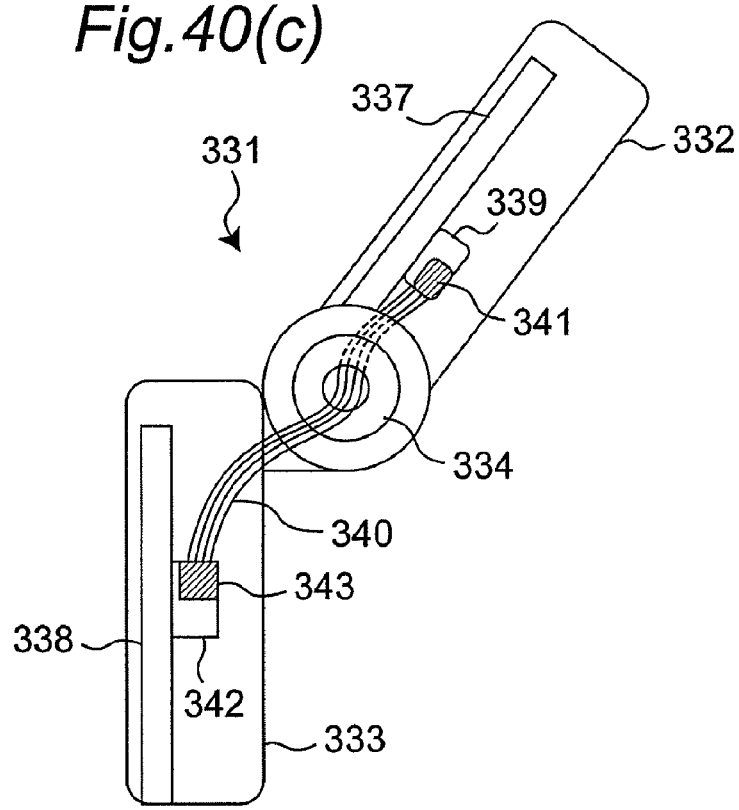
Figure 41:
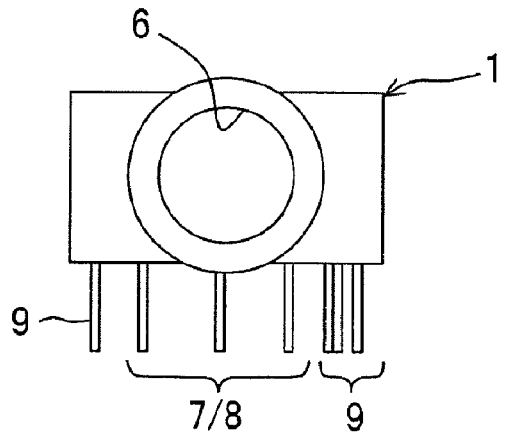
Figure 42:
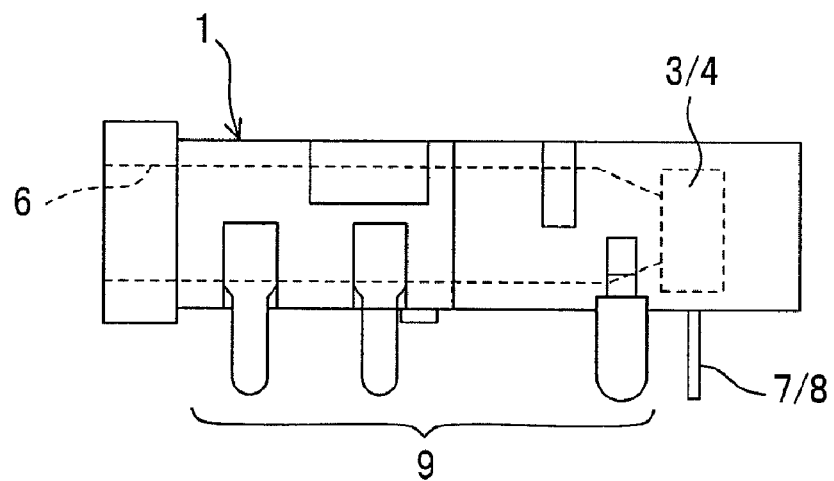
Figure 43:
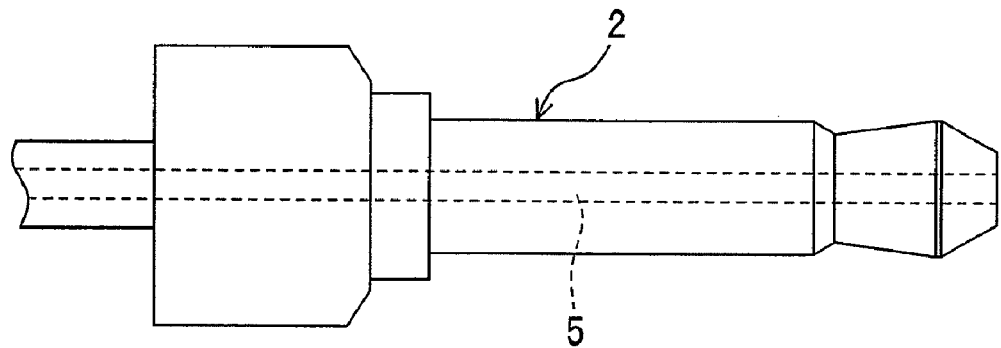
Figure 44:
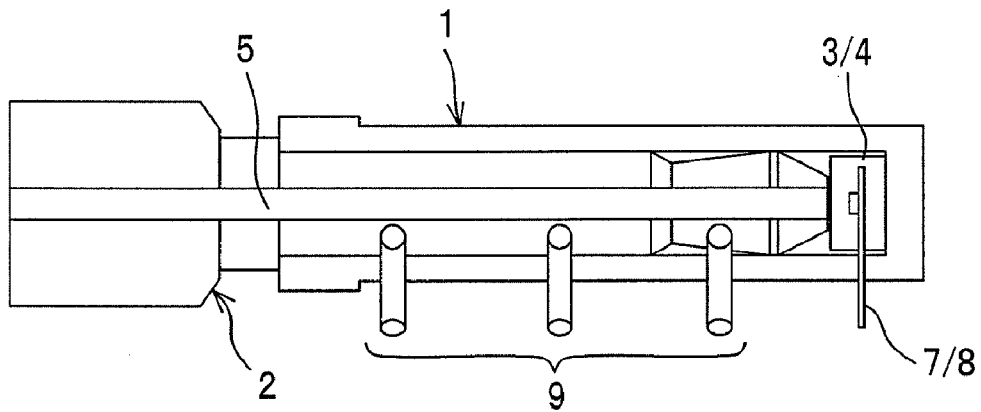
Figure 45:
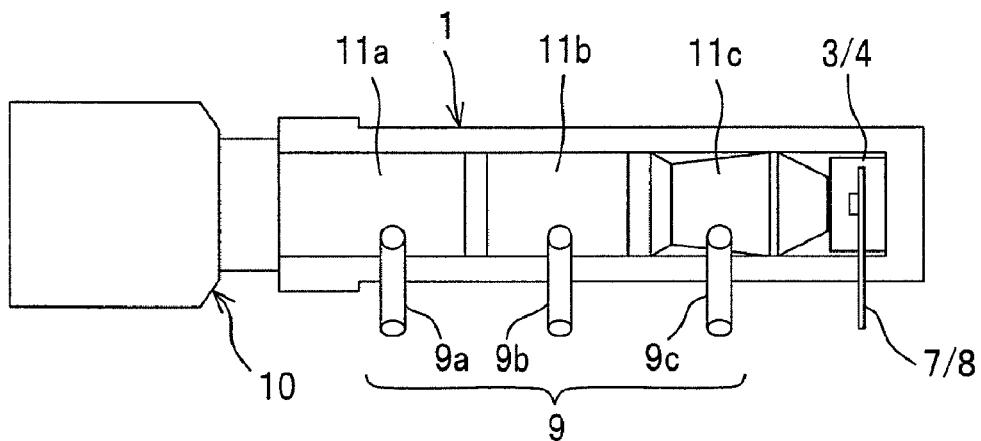
Figure 46:
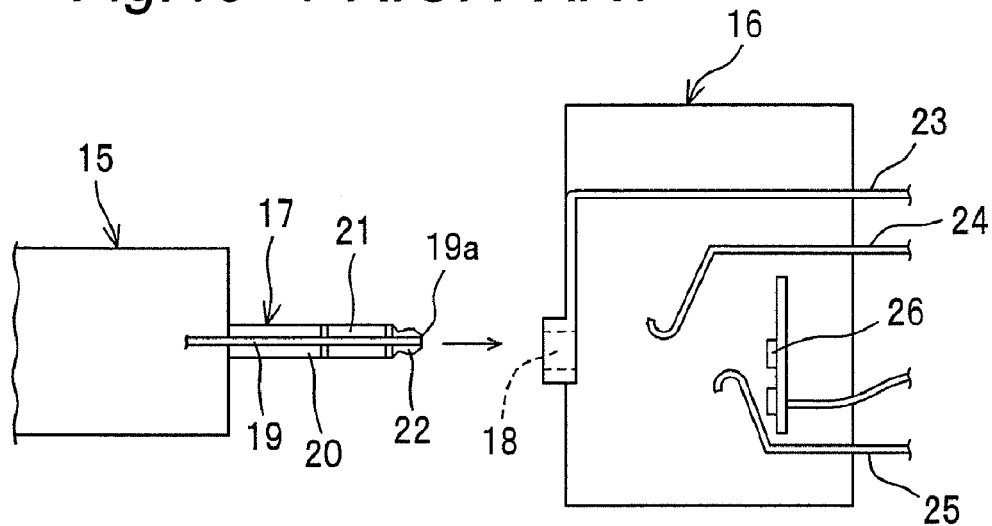
Figure 47:
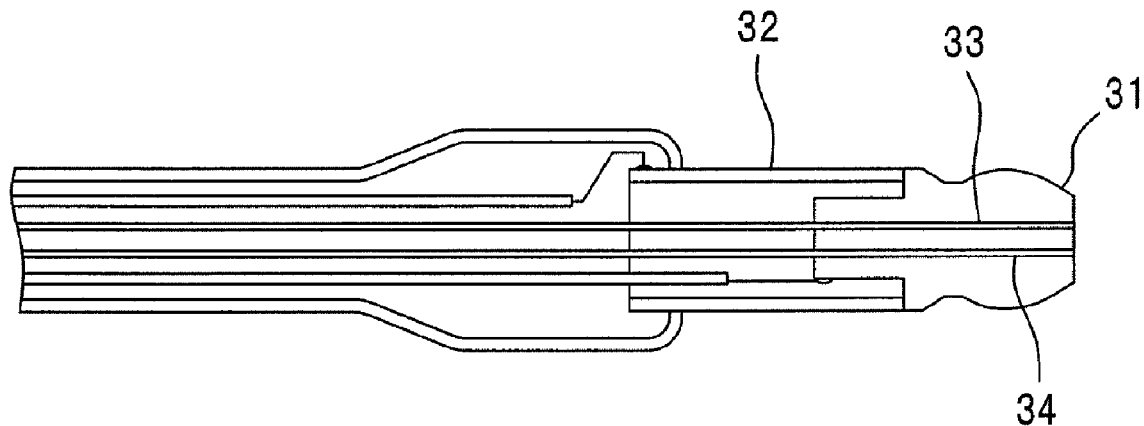
Figure 48:
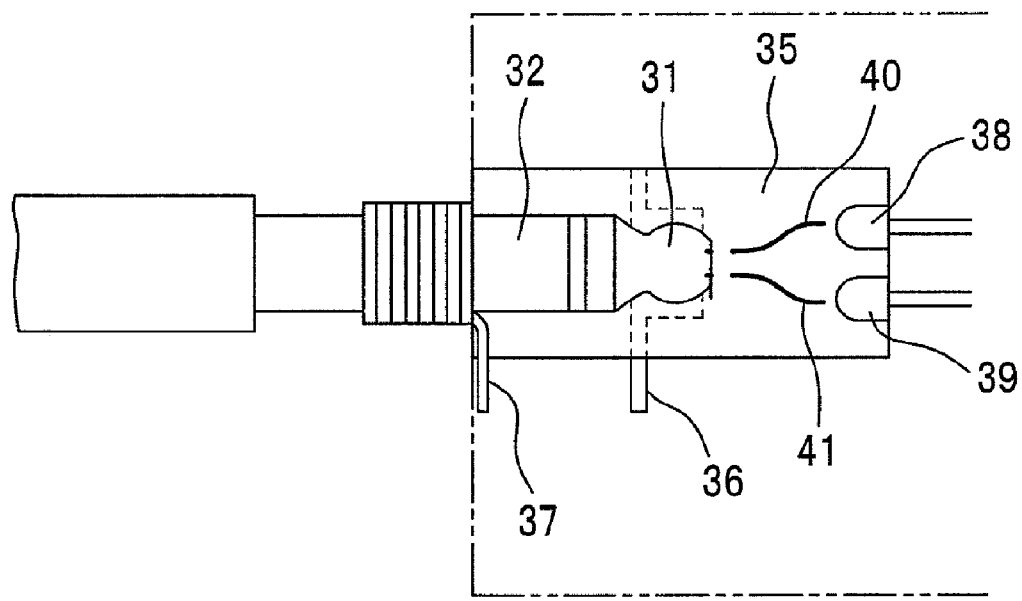

and 7(b) and the optical transmitting and receiving device shown in FIGS. 16(a), 16(b), and 16(c) are attached to a receptacle body;

FIG. 19 depicts a step in a procedure of assembling the optical and electric signals transmission apparatus shown in FIG. 18;

FIGS. 20(a) and 20(b) depict a step in the assembling procedure subsequent to that in FIG. 19;

FIG. 21 depicts a step in the assembling procedure subsequent to that in FIGS. 20(a) and 20(b);

FIGS. 22(a) and 22(b) depict a step in a procedure of mounting the optical and electric signals transmission apparatus shown in FIG. 18 on a printed circuit board;

FIGS. 23(a) and 23(b) depict a step in the mounting procedure subsequent to that in FIGS. 22(a) and 22(b);

FIGS. 24(a) and 24(b) are perspective views of a plug according to an embodiment seen from the back and the front bottom;

FIG. 25 is a perspective view of a receptacle of an optical and electric signals transmission apparatus according to an embodiment;

FIGS. 26(a) and 26(b) are perspective views of a plug to be fitted in a recess of a receptacle body in FIG. 25 seen from the back and the front bottom;

FIGS. 27(a) and 27(b) are perspective views of different receptacles of an optical and electric signals transmission apparatus according to an embodiment;

FIGS. 28(a) and 28(b) are perspective views of a plug to be fitted in a recess of a receptacle body in FIGS. 27(a) and 27(b) seen from the back and the front bottom;

FIGS. 29(a) and 29(b) are perspective views of a plug according to an embodiment seen from the back and the front bottom;

FIG. 30 shows a procedure of forming the plug shown in FIGS. 2(a) and 2(b);

FIG. 31 shows a procedure of forming the plug shown in FIGS. 8(a) and 8(b);

FIG. 32 shows a procedure of forming the plug shown in FIGS. 2(a) and 2(b) different from the procedure in FIG. 30;

FIG. 33 is a circuit diagram of an optical and electric signals transmission system according to an embodiment using any one of the above optical and electric signals transmission apparatuses;

FIG. 34 is a circuit diagram of an optical and electric signals transmission system according to an embodiment;

FIG. 35 is a circuit diagram of an optical and electric signals transmission system according to an embodiment;

FIG. 36 is a circuit diagram of an optical and electric signals transmission system according to an embodiment;

FIG. 37 is a circuit diagram of an optical and electric signals transmission system according to an embodiment;

FIG. 38 is a circuit diagram of an optical and electric signals transmission system according to an embodiment;

FIG. 39 is a circuit diagram of an optical and electric signals transmission system according to an embodiment;

FIGS. 40(a), 40(b), and 40(c) show electronic equipment using any one of the above optical and electric signals transmission systems, in which FIG. 40(a) is a front view showing an unfolded sate, FIG. 40(b) shows a state of the equipment with the outer shell in FIG. 40(a) removed, and FIG. 40(c) is a cross-sectional view taken along a direction perpendicular to an axis around which the equipment is folded;

FIG. 41 is a front view of a holder of a conventional plug and jack type optical and electric common use transmission device;

FIG. 42 is a side view of the conventional holder shown in FIG. 41;

FIG. 43 is a side view of an optical plug to be fitted in the conventional holder shown in FIGS. 41 and 42;

FIG. 44 is a cross-sectional view showing the state that the optical plug shown in FIG. 43 is inserted in the conventional holder shown in FIGS. 41 and 42;

FIG. 45 is a cross-sectional view showing the state that an electric plug has been inserted in the conventional holder shown in FIGS. 41 and 42;

FIG. 46 shows a male connecting component (plug) and a female connecting component (jack) of a conventional connecting device;

FIG. 47 is a cross-sectional view of a plug of a conventional plug-jack type connector; and FIG. 48 shows how the conventional plug shown in FIG. 47 is fitted in a jack.

DETAILED DESCRIPTION OF THE INVENTION

The present invention will be described in detail below with reference to embodiments shown in the figures.

First Embodiment

Figure 1:
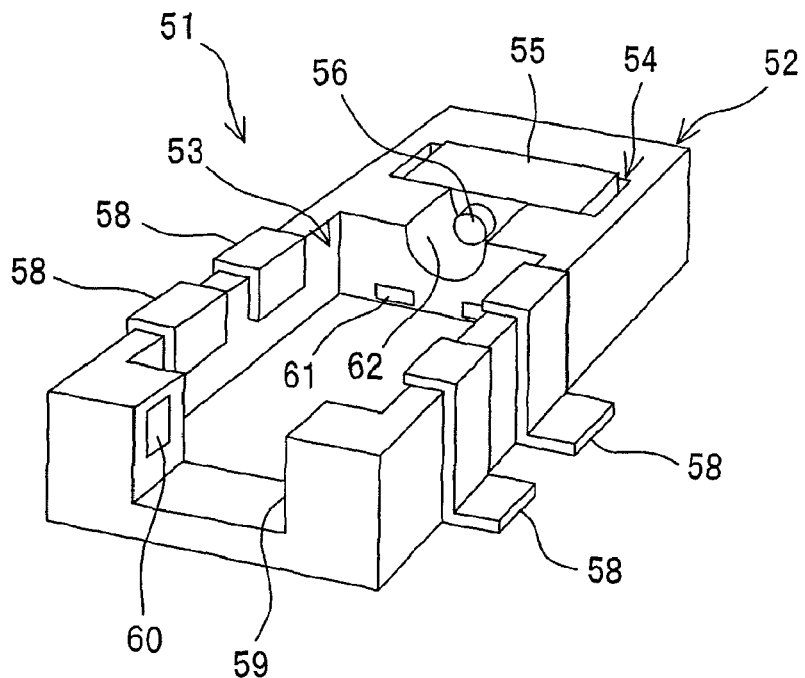
FIG. 1 is a perspective view showing a schematic configuration of a receptacle of an optical and electric signals transmission apparatus according to an embodiment of the present invention.
Figure 5:
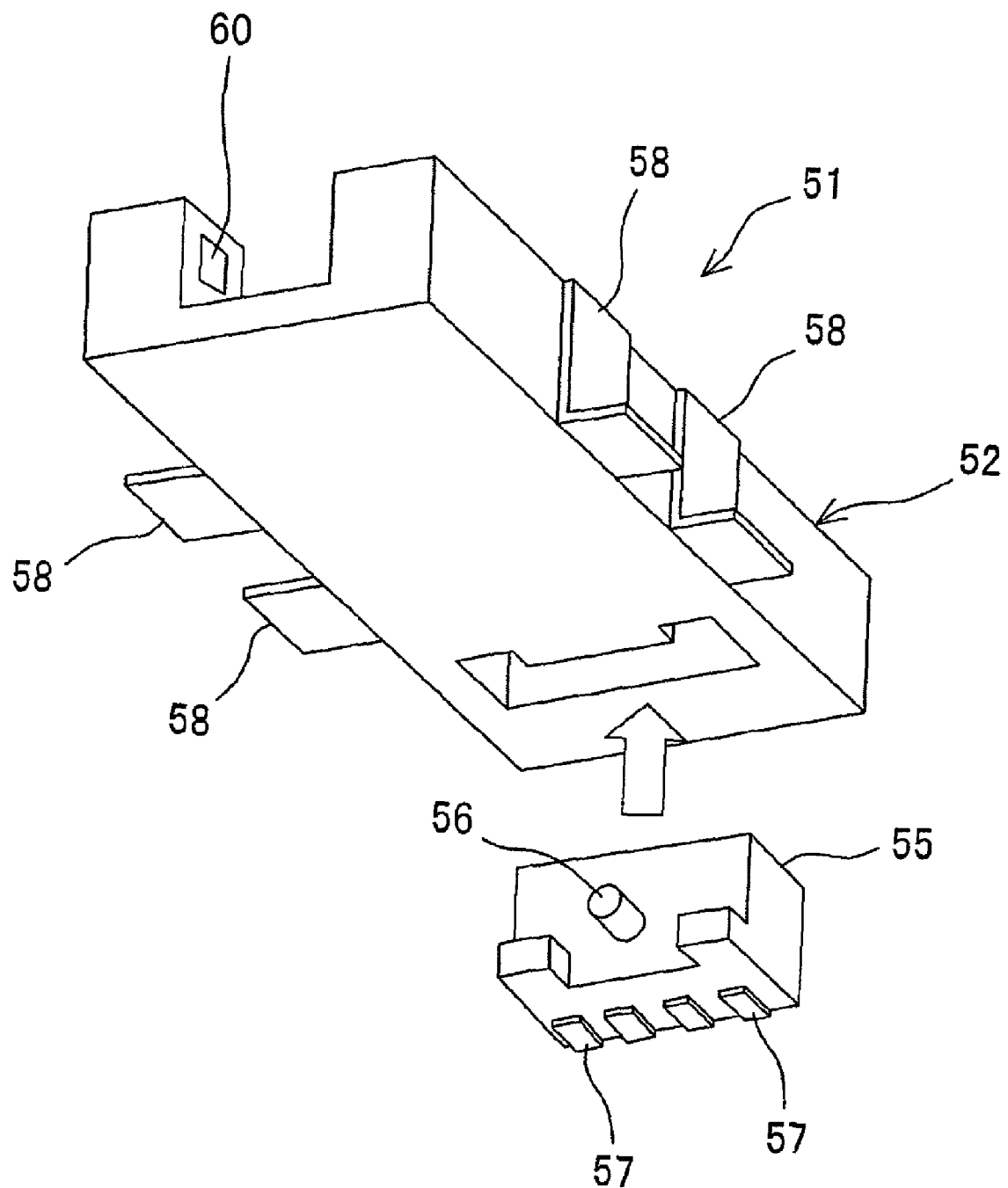
FIG. 5 shows a method of mounting a photoelectric device to a receptacle body.

FIG. 1 is a perspective view showing a schematic configuration of a receptacle 51 of the optical and electric signals transmission apparatus of this embodiment. The receptacle body 52 is shaped like a substantially rectangular parallelepiped provided with a rectangular recess 53 and a rectangular hole 54 on a surface of the parallelepiped, and a photoelectric device 55 for optical signal transmission is to be received in the hole 54. The photoelectric device 55 includes a light-emitting element in the case that it is an optical signal transmitting device, or includes a light-receiving element and a light-receiving signal processing circuit such as a trans-impedance amplifier in the case that it is an optical receiving device. In either case, a lens 56 for optical coupling is provided. Mounting the photoelectric device 55 to the receptacle body 52 is performed from the bottom of the receptacle body 52 as shown in FIG. 5. In FIG. 5, the reference numeral 57 denotes electrode terminals of the photoelectric device 55.

Furthermore, a plug is fitted in the recess 53 of the receptacle body 52. Side face electrode terminals 58 for electric signal transmission, which are to be electrically connected to the electrode terminals of the plug, are provided from the inner wall of the recess 53 to the outer wall of the receptacle body 52. Furthermore, a rectangular notch 59 is provided on a wall opposite to the hole 54—side wall of the recess 53, and side hooks 60 engaging with side hooks of the plug are provided on both side walls defining the notch 59. In addition, two front hooks 61 (only one of them is seen) engaging with front hooks of the plug are provided on an inner wall facing the notch 59 of the recess 53. Furthermore, a notch 62 of a semicircular cross section is formed on a partition between the recess 53 and the hole 54, and the lens 56 of the photoelectric device 55 faces the recess 53 through the notch 62.

FIGS. 2(a) and 2(b) are perspective views of a plug 63 to be fitted in the recess 53 of the receptacle body 52. FIG. 2(a) is a perspective view of the plug 63 seen from the front, and FIG. 2(b) is a perspective view of the plug 63 seen from the back. In FIGS. 2(a) and 2(b), the plug body 64 has an optical fiber cable 65 penetrating the plug body from the back side to the front side, and four copper wires 66 for electric signal transmission. In FIGS. 2(a) and 2(b), the four copper wires are collectively numbered. As shown in FIG. 2(a), a cylindrical optical fiber supporting unit 67 supporting the protruding optical fiber cable 65, and two front hooks 68 (only one of them is seen) engaging with the two front hooks 61 of the recess 53 of the receptacle body 52 are provided on the front face of the plug body 64. The optical fiber supporting unit 67 is designed to fit in the notch 62 formed on the partition to allow an end face of the optical fiber cable 65 to face the lens 56 when the plug 63 is fitted in the recess 53 of the receptacle body 52.

As shown in FIG. 2(b), the plug body 64 has on its back a rectangular parallelepiped protrusion 69 having a width which is less than the width of the plug body 64 and which allows the protrusion 69 to be fitted in the notch 59 of the receptacle body 52. The optical fiber cable 65 covered with a protective cover 70 and the four copper wires 66 held by a flexible substrate 71 protrude from an end face of the protrusion 69. Furthermore, side hooks 72 engaging with the side hooks 60 of the notch 59 of the receptacle body 52 are provided on both sides of the protrusion 69. Furthermore, a flexible substrate 71 holding the copper wires 66 extends from one side of the plug body 64 to the other side of it through the bottom face of it. On each side of the flexible substrate 71 lying on both sides of the plug body 64, as shown in FIGS. 2(a) and 2(b), two side face electrode terminals 73 electrically connected to the side face electrode terminals 58 of the receptacle body 52 are provided.

Figure 3:
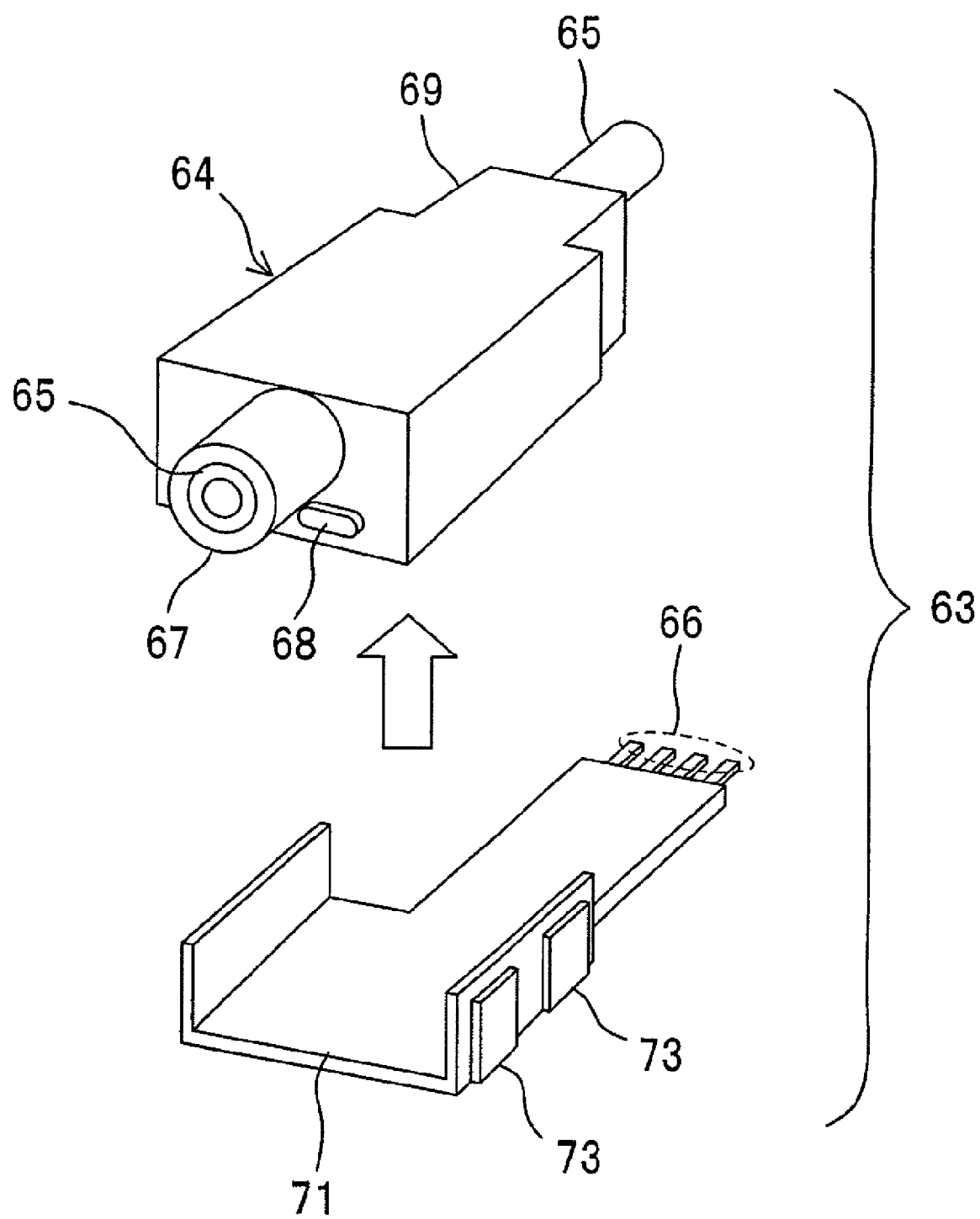
FIG. 3 shows the configuration of the plug shown in FIGS. 2(a) and 2(b)

The flexible substrate 71 is shaped like a letter "T" when it is developed as shown in FIG. 3. Portions of the flexible substrate 71 corresponding to both side protrusions in the shape of a letter "T" are bent so as to run along both sides of the plug body 64, the side face electrode terminals 73 are provided on both bent portions, and each of the side face electrode terminals 73 is mechanically and electrically connected with one of the four copper wires 66 inside the flexible substrate 71. When the flexible substrate having the above configuration is mounted on the plug body 64, the relative position of the flexible substrate 71 to the plug body 64 is decided by a positioning device (not shown) or the like and then the flexible substrate is mounted on the plug body 64 by adhesion with adhesive resin or press fitting.

Figure 4:
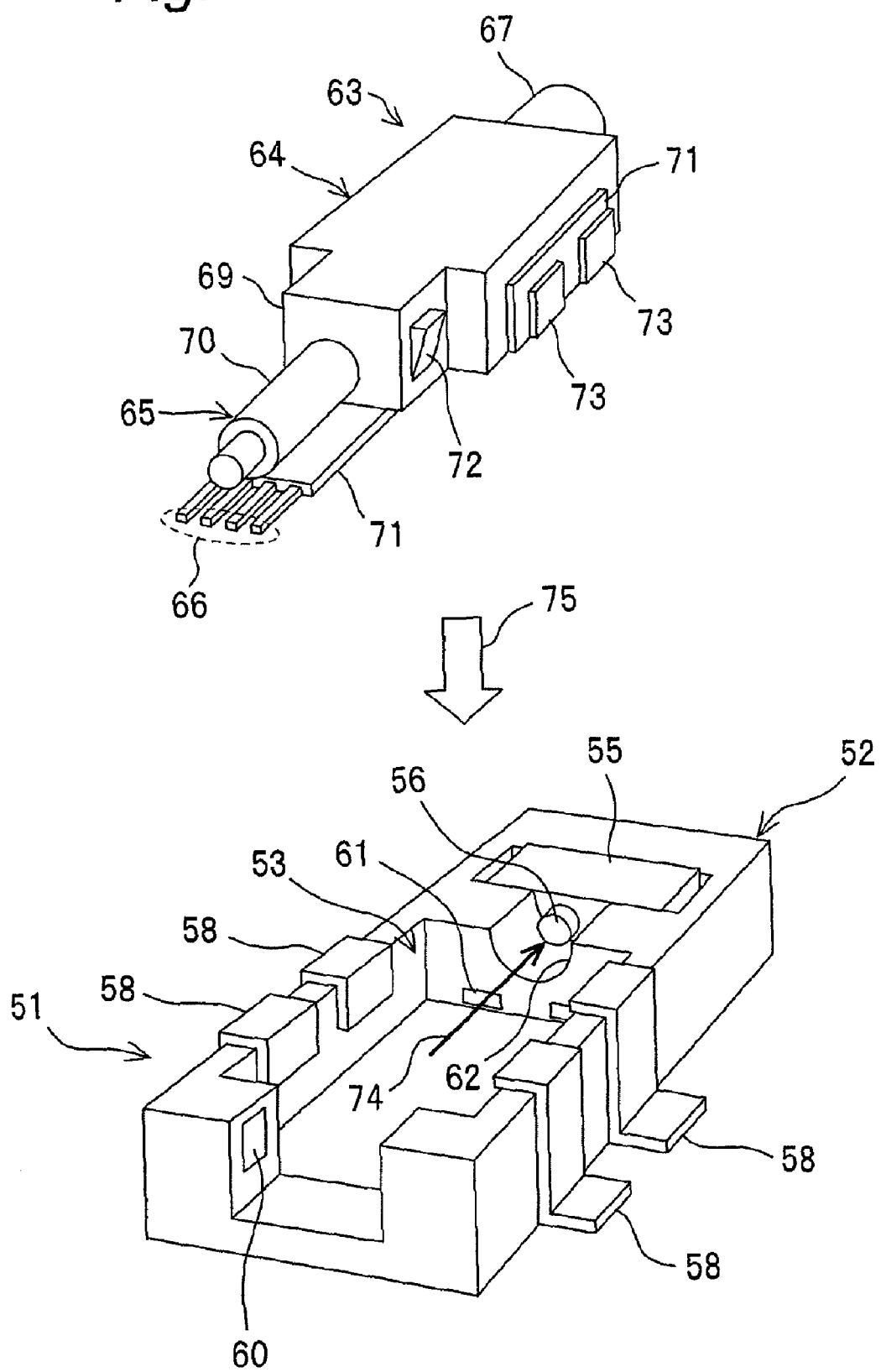
FIG. 4 shows a method of inserting a plug body in and fixing it in a recess of a receptacle body.

The plug having the above configuration is fitted to the recess 53 of the receptacle body 52 as follows. In other words, as shown in FIG. 4, the plug body 64 is inserted in the recess 53 of the receptacle body 52 in a direction (the direction of the arrow 75) perpendicular to the optical axis (the direction of the arrow 74) of the photoelectric device 55 which is fitted in the hole 54 of the receptacle body 52. The side hooks 72 of the plug body 64 are engaged with the side hooks 60 of the receptacle body 52, and the front hooks 68 of the plug body 64 are engaged with the front hooks 61 of the receptacle body 52, so that the plug is mounted in a predetermined location in the recess 53 of the receptacle body 52.

In this state, an end face of the optical fiber cable 65 on the optical fiber supporting unit 67 side of the plug 63 faces the lens 56 of the photoelectric device 55, so that the optical fiber cable 65 is optically coupled to the photoelectric device 55. Furthermore, the side face electrode terminals 73 of the plug body 64 come into contact with the side face electrode terminals 58 of the receptacle body 52, so that the copper wires 66 of the plug 63 are electrically connected to the side face electrode terminals 58 of the receptacle 51.

As described above, in this embodiment, the recess 53 in which the plug 63 is fitted and the hole 54 in which the photoelectric device 55 is fitted are provided side by side on a surface of the receptacle body 52, and the plug 63 is inserted in the recess 53 of the receptacle body 52 in a direction perpendicular to the optical axis of the photoelectric device 55, so that the side hooks 72 and front hooks 68 of the plug body 64 are engaged with the side hooks 60 and front hooks 61 of the receptacle body 52, the optical fiber cable 65 of the plug body 64 is optically coupled to the photoelectric device 55 of the receptacle body 52, and the copper wires 66 of the plug body 64 are electrically connected to the side face electrode terminals 58 of the receptacle body 52.

Thus, the plug 63 is allowed to be inserted in the recess 53 of the receptacle body 52 in a direction perpendicular to the optical axis of the photoelectric device 55, so that it becomes unnecessary to keep a region beyond the plug 63 for allowing insertion into and extraction from the receptacle body of the plug 63 along the optical axis. For this reason, other components can be mounted in that region on a printed circuit board (not shown) on which the receptacle 51 having the photoelectric device 55 is to be mounted.

In other words, according to this embodiment, an optical and electric signals transmission apparatus performing one-way optical communication and one-way or two-way electrical communication at the same time is allowed to be reduced in size.

Furthermore, the receptacle body 52 of this embodiment is not required to cover the inserting side of the plug 63 in contrast to conventional optical and electric signals transmission apparatuses disclosed in the patent documents which are structured in such a manner that a plug is covered with a jack when the plug is inserted in the jack. Thus, according to this embodiment, the optical and electric signals transmission apparatus performing one-way optical communication and one-way or two-way electrical communication at the same time can be reduced in thickness.

As described above, according to this embodiment, an optical and electric signals transmission apparatus which is mountable on portable equipment being in the process of downsizing and which is able to perform both one-way optical communication and one-way or two-way electrical communication at the same time, is achievable.

In addition, in this embodiment, the side face electrode terminals 73 of the plug body 64 are formed on the flexible substrate 71, and are each mechanically and electrically connected with any one of the four copper wires 66 inside the flexible substrate 71. Thus, it is not necessary to connect the side face electrode terminals 73 to the copper wires 66 inside the plug body 64, so that the structure of the plug body 64 can be simplified and the plug body 64 can be reduced in size.

Second Embodiment

In the first embodiment, an optical and electric signals transmission apparatus performing one-way optical communication has been described. However, in this embodiment, an optical and electric signals transmission apparatus performing two-way optical communication will be described. The same reference numerals are attached to the same components as those in the first embodiment to omit detailed description.

Figure 6:
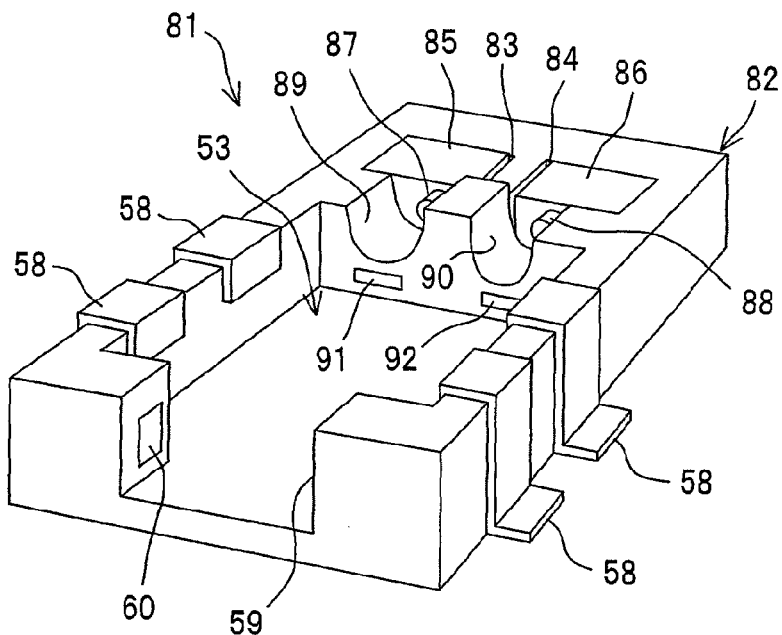
FIG. 6 is a perspective view of a receptacle of an optical and electric signals transmission apparatus according to an embodiment.

FIG. 6 is a perspective view showing a schematic configuration of a receptacle 81 of the optical and electric signals transmission apparatus of this embodiment. A rectangular recess 53 and two rectangular holes 83 and 84 are formed on a surface of a receptacle body 82, and the two holes 83 and 84 are formed in a location corresponding to the location of the hole 54 of the first embodiment. An optical signal transmitting device 85 including a light-emitting element is fitted in one 83 of the two holes 83 and 84. An optical signal receiving device 86 including a light-receiving element and a light-receiving signal processing circuit is fitted in the other hole 84. The devices 85 and 86 have lenses for optical coupling 87 and 88, respectively.

Furthermore, a notch 89 of semicircular cross section is formed on a partition between the recess 53 and the hole 83, and the lens 87 of the optical signal transmitting device 85 faces the recess 53 through the notch 89. Likewise, a notch 90 of semicircular cross section is formed on the partition between the recess 53 and the hole 84, and the lens 88 of the optical signal receiving device 86 faces the recess 53 through the notch 90. In addition, two front hooks 91 and 92 engaging with two front hooks provided on a plug to be fitted in the recess 53 are provided on an inner wall facing a notch 59 of the recess 53.

Figures 7A, 7B:
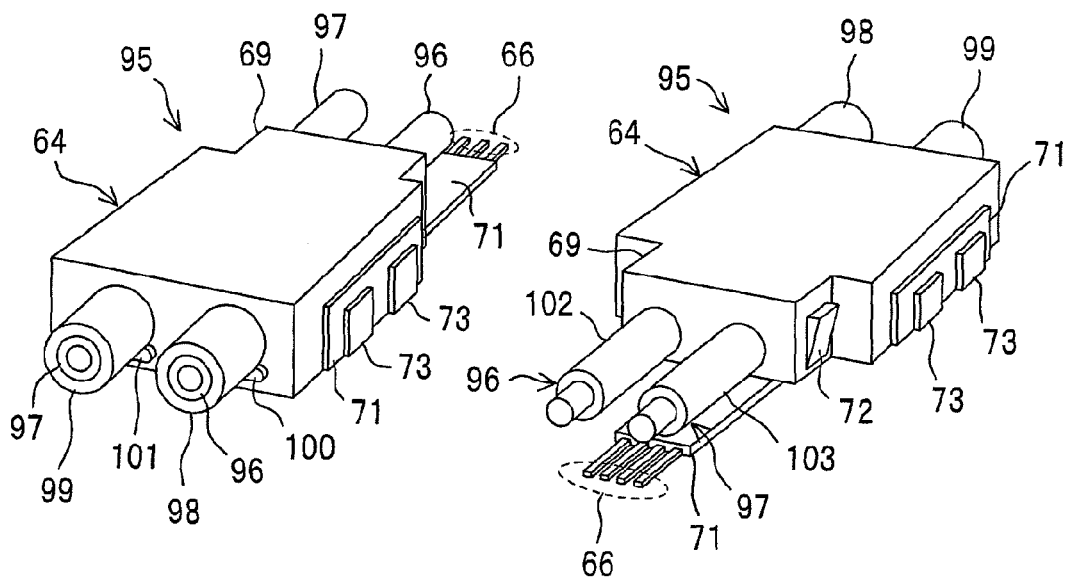
FIGS. 7(a) and 7(b) are perspective views of a plug to be fitted in a recess of a receptacle body in FIG. 6 seen from the front and the back.

FIGS. 7(a) and 7(b) are perspective views of a plug 95 which is fitted in the recess 53 of the receptacle body 82. FIG. 7(a) is a perspective view of the plug 95 seen from the front, and FIG. 7(b) is a perspective view of the plug 95 seen from the back. In FIGS. 7(a) and 7(b), the plug body 64 has two optical fiber cables 96 and 97 penetrating the plug body from the back side to the front side, and four copper wires 66 for electric signal transmission. As shown in FIG. 7(a), two cylindrical optical fiber supporting units 98 and 99 supporting the protruding optical fiber cables 96 and 97, and two front hooks 100 and 101 engaging with the two front hooks 91 and 92 of the recess 53 of the receptacle body 82 are provided on the front of the plug body 64. The optical fiber supporting unit 98 and 99 are designed to fit in the notches 89 and 90 formed on the partition to allow the end faces of the optical fiber cable 96 and 97 to face the lenses 87 and 88 when the plug 95 is fitted in the recess 53 of the receptacle body 82.

As shown in FIG. 7(b), a rectangular parallelepiped protrusion 69 having a width allowing it to be fitted in the notch 59 of the receptacle body 82 is formed on the back of the plug body 64, and optical fiber cables 96 and 97 having protective covers 102 and 103 and four copper wires 66 held by a flexible substrate 71 protrude from the end face of the protrusion 69.

Other configuration and the method of fitting the plug 95 to the receptacle 81 are same as those of the first embodiment.

Thus, according to this embodiment, the optical and electric signals transmission apparatus performing two-way optical communication and one-way or two-way electrical communication at the same time can be reduced in size and thickness.

In other words, according to this embodiment, an optical and electric signals transmission apparatus which can be mounted on portable equipment going to be reduced in size and thickness and is able to perform two-way optical communication and one-way or two-way electrical communication at the same time can be obtained.

In addition, the photoelectric device to be attached to the receptacle body 82 is constituted by an optical signal transmitting device 85 and an optical signal receiving device 86 which are fabricated separately. Thus, the production yield of the whole of the photoelectric device is prevented from reducing, without being affected by that the production yield of the light-emitting element or the light-receiving element is lower than that of the other.

The optical fiber cables 96 and 97 may be single-core plastic fiber cables or multi-core plastic fiber cables.

Third Embodiment

This embodiment relates to a connecting structure different from the connecting structures for connection between the side face electrode terminals 173 of the plug body 64 and the copper wires 66 in the first and second embodiments. The same reference numerals are attached to the same components as those in the first embodiment to omit detailed description.

FIGS. 8(a) and 8(b) are perspective views of a plug 105 in this embodiment. FIG. 8(a) is a perspective view of the plug 105 seen from the front, and FIG. 8(b) is a perspective view of the plug 105 seen from the back. In FIGS. 8(a) and 8(b), the plug body 64 has an optical fiber cable 65 penetrating the plug body from the back side to the front side, and four copper wires 66 for electric signal transmission. As shown in FIG. 8(a), the front configuration of the plug body 64 is similar to that of the first embodiment.

As shown in FIG. 8(b), a protrusion 69 having a width allowing it to be fitted in the notch 59 of the receptacle body 52 is formed on the back of the plug body 64, and the optical fiber cable 65 having a protective cover 70 and a coaxial cable 106 having the four copper wires 66 covered with a protective cover protrude from the end face of the protrusion 69. Furthermore, two side face electrode terminals 107 to be electrically connected to the side face electrode terminals 58 of the receptacle body 52 are provided on each of opposite lateral sides of the plug body 64.

Figure 9:
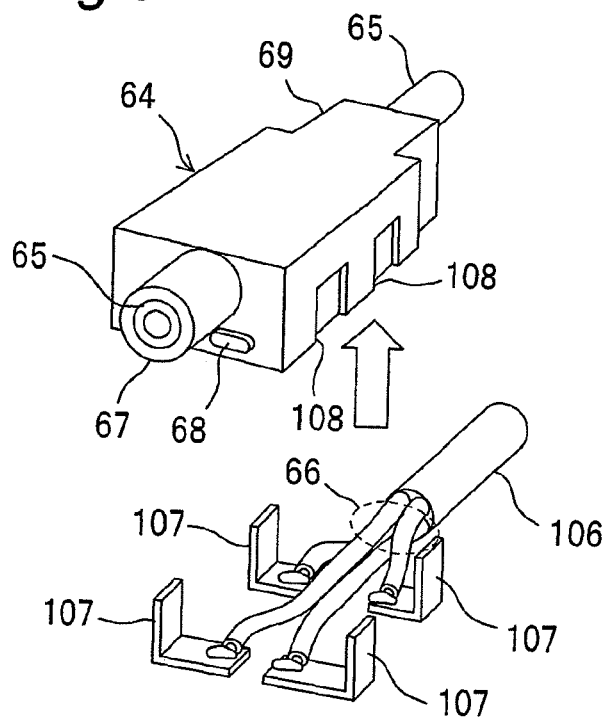
FIG. 9 shows a connecting structure for connection between side face electrode terminals and copper wires in FIGS. 8(a) and 8(b)

FIG. 9 shows a connecting structure for connection between the side face electrode terminals 107 of the plug body 64 and the copper wires 66. As shown in FIG. 9, the side face electrode terminals 107 are connected with the four copper wires 66 exposed from the protective cover of the coaxial cable 106 by soldering. The side face electrode terminals 107 are inserted in the direction of the arrow into grooves 108 provided on both sides of the plug body 64, whereby side face electrode terminals 107 are attached to both sides of the plug body 64. At that time, the four copper wires 66 and part of the coaxial cables 106 are stored in, for example, storing grooves (not shown) or the like provided on the bottom of the plug body 64.

Other configuration and the method of fitting the plug 105 to the receptacle 51 are same as those of the first embodiment.

As described above, in this embodiment, the four copper wires 66 exposed from the protective cover of the coaxial cable 106 are connected to the side face electrode terminals of the plug body 64 by soldering. Thus, the electric signal transmission line which is not limited in bending direction can be obtained.

FIGS. 8(a) and 8(b) depict the plug 105 for one-way optical communication as an example, although in the case that the plug is for two-way optical communication like one as shown in FIGS. 7(a) and 7(b) in the second embodiment as well, copper wires of the coaxial cable can be similarly connected to side face electrode terminals of the plug body.

Furthermore, the copper wires 66 may be coaxial small-gauge wires as necessary.

Fourth Embodiment

This embodiment relates to a connecting structure, different from the connecting structures in the first to third embodiments, for connection between receptacle side face electrode terminals and a plug side electric transmission line. The same reference numerals are attached to the same components as those in the first embodiment to omit detailed description.

Figure 10:
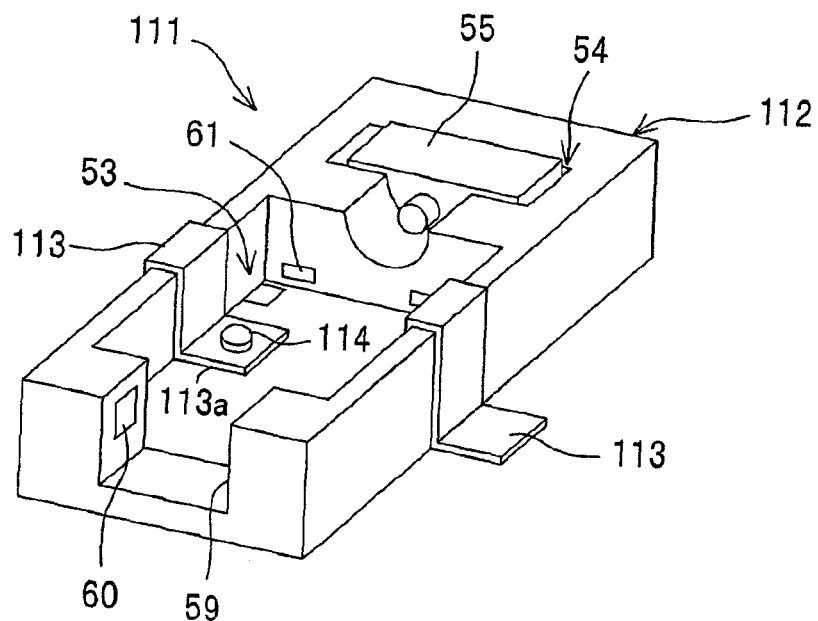
FIG. 10 is a perspective view of a receptacle of an optical and electric signals transmission apparatus according to an embodiment.

FIG. 10 is a perspective view showing a schematic configuration of a receptacle 111 of the optical and electric signals transmission apparatus of this embodiment. A rectangular recess 53 and a rectangular hole 54 are formed on a surface of a receptacle body 112, and a photoelectric optical signal transmitting device 55 is fitted in the hole 54. Furthermore, front hooks 61 for engaging with front hooks provided on a plug to be fitted in the recess 53 are provided on the inner wall facing the notch 59 of the recess 53.

Furthermore, bottom face electrode terminals for electric signal transmission 113 electrically connected to electrode terminals of the plug are provided from the bottom face of the recess 53 of the receptacle body 112 to the outer wall of the receptacle body 112 through the inner wall of the recess 53. Provided on portions 113a formed on the bottom face of the recess 53 of the bottom face electrode terminals 113 are circular contacts 114 having a predetermined thickness to secure effective contact with the electrode terminals of the plug.

Figure 11A:
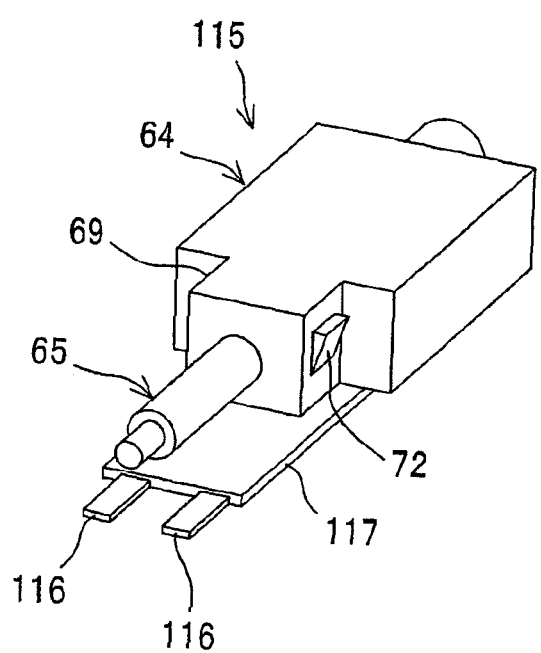
FIGS. 11(a) and (b) are perspective views of a plug to be fitted in a recess of a receptacle body in FIG. 10 seen from the back and the front bottom.
Figure 11B:
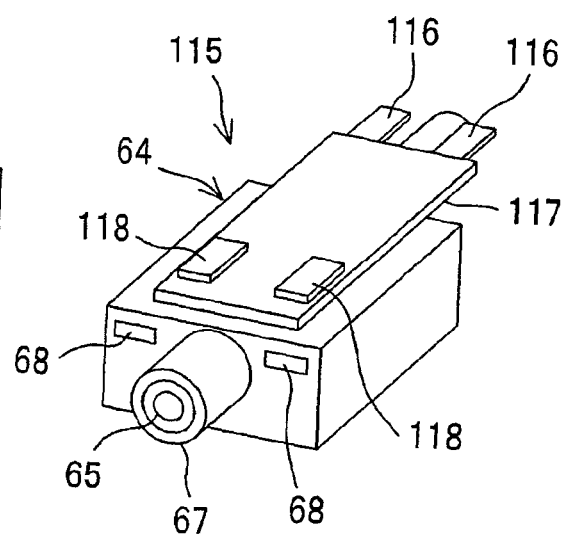

FIGS. 11(*a*) and 11(*b*) are perspective views of a plug 115 to be fitted in the recess 53 of the receptacle body 112. FIG. 11(*a*) is a perspective view of the plug 115 seen from the back, and FIG. 11(*b*) is a perspective view of the plug 115 seen from the front bottom. In FIGS. 11(*a*) and 11(*b*), the plug body 64 has an optical fiber cable 65 penetrating the plug body from the back side to the front side, and two copper patterns for electric signal transmission 116. As shown in FIG. 11(*b*), the front configuration of the plug body 64 is similar to that of the first embodiment.

Furthermore, as shown in FIG. 11(*a*), a protrusion 69 having a width allowing it to be fitted in the notch 59 of the receptacle body 112 is formed on the back of the plug body 64. In addition, the two copper patterns 116 held by a flexible substrate 117 protrude from the bottom of the plug body 64 in the same direction as the optical fiber cable 65. As shown in FIG. 11(*b*), an end portion of the flexible substrate 117 is attached to the bottom face of the plug body 64 by adhesion or the like. Two bottom face electrode terminals 118 to be electrically connected to the bottom face electrode terminals 113 of the receptacle body 112 are provided on the bottom face of the plug body 64 in locations corresponding to the contacts 114 of the receptacle body 112. The two bottom face electrode terminals 118 are mechanically and electrically connected with the two copper patterns 16 inside the flexible substrate 117.

Other configuration and the method of fitting the plug 115 to the receptacle 111 are same as those of the first embodiment.

As described above, in this embodiment, the two copper patterns 116 are held by the flexible substrate 117 to make the electrical transmission line for electrical communication. Furthermore, an end portion of the flexible substrate 117 is mounted on the bottom face of the plug body 64, and the bottom face electrode terminals 118 are provided on the flexible substrate for electrical connection to the bottom face electrode terminals 113 of the receptacle body 112. In addition, the bottom face electrode terminals 113 are provided from the bottom face of the recess 53 of the receptacle body 112 to the outer wall of the receptacle body 112 through the inner wall of the recess 53, and the contacts 114 capable of effective contact with the bottom face electrode terminals of the plug 115 are provided on portions 113a formed on the bottom face of the recess 53 of the bottom face electrode terminals 113.

Furthermore, the plug 115 is inserted in the recess 53 of the receptacle body 112 in a direction perpendicular to the optical axis of the photoelectric device 55, so that the optical fiber cable 65 of the plug body 64 is optically coupled to the photoelectric device 55 of the receptacle body 112, and the copper patterns 116 of the plug body 64 are electrically connected to the side face electrode terminals 113 of the receptacle body 112.

Thus, the electrode terminal structure of the plug body 64 is simplified and the plug body 64 is reduced in size.

Fifth Embodiment

This embodiment relates to an electrode terminal structure different from electrode terminal structures of plug bodies 64 in the first to fourth embodiments. The same reference numerals are attached to the same components as those in the first embodiment to omit detailed description.

Figure 12:
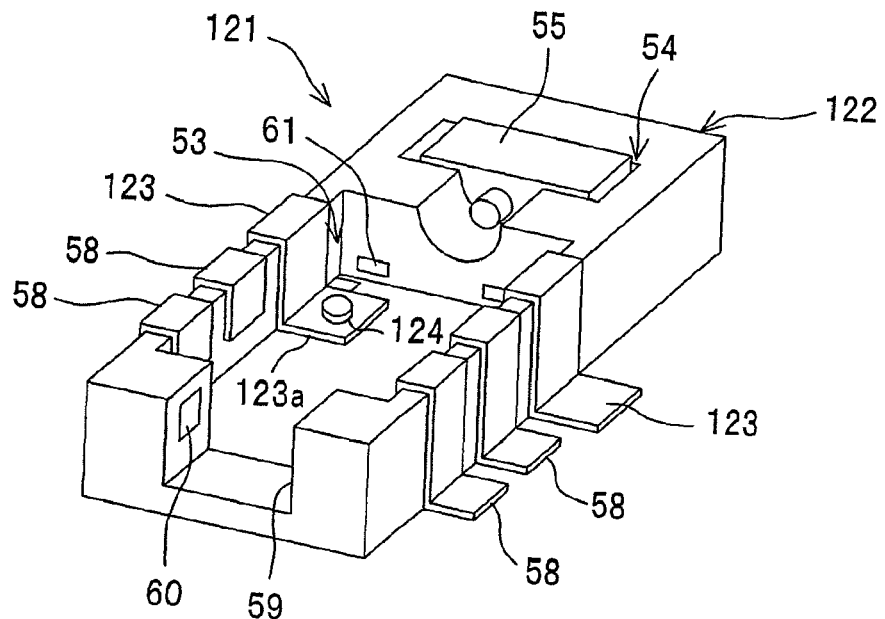
FIG. 12 is a perspective view of a receptacle of an optical and electric signals transmission apparatus according to an embodiment.

FIG. 12 is a perspective view showing a schematic configuration of a receptacle 121 of the optical and electric signals transmission apparatus of this embodiment. Side face electrode terminals for electric signal transmission 58 to be electrically connected to electrode terminals of a plug as inserted are provided from the inner wall of the recess 53 of the receptacle body 112 to the outer wall of the receptacle body 112. In addition, bottom face electrode terminals for electric signal transmission 123 to be electrically connected to electrode terminals of a plug as inserted are provided from the bottom face of the recess 53 to the outer wall of the receptacle body 112 through the inner wall of the recess 53. Contacts 124 are provided on portions 123a on the bottom face of the recess 53 of the bottom face electrode terminals 123.

Figure 13A:
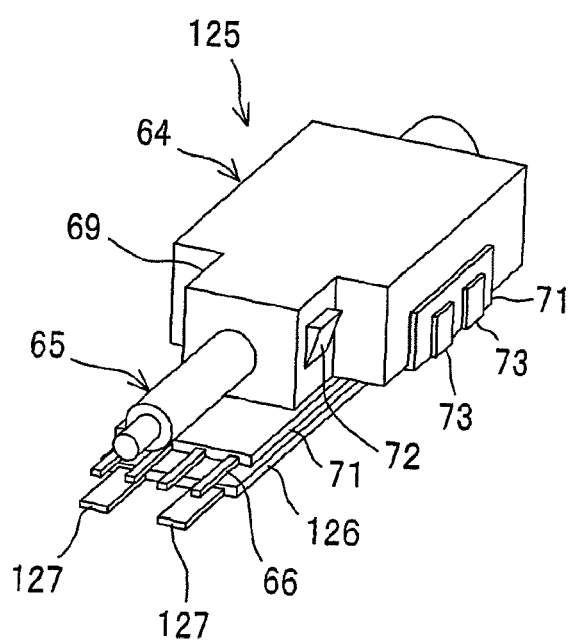
FIGS. 13(a) and 13(b) are perspective views of a plug to be fitted in a recess of a receptacle body in FIG. 12 seen from the back and the front bottom.
Figure 13B:
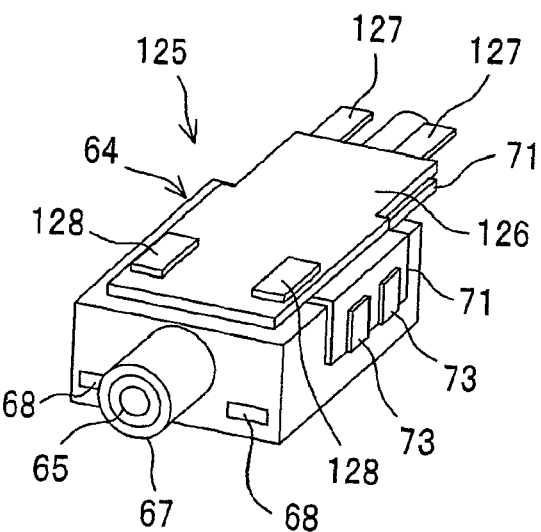

FIGS. 13(*a*) and 13(*b*) are perspective views of a plug 125 to be fitted in the recess 53 of the receptacle body 122. FIG. 13(*a*) is a perspective view of the plug 125 seen from the back, and FIG. 13(*b*) is a perspective view of the plug 125 seen from the front bottom. In FIGS. 13(*a*) and 13(*b*), like the first embodiment, a flexible substrate 71 holding four copper wires 66 is disposed from one side face of the plug body 64 to the other side face across the bottom face of the flexible substrate 71. Each side of the flexible substrate 71 lying on both sides of the plug body 64, as shown in FIGS. 13(*a*) and 13(*b*) is provided with two side face electrode terminals 73 electrically connected to the side face electrode terminals 58 of the receptacle body 122.

In addition, as shown in FIG. 13(*b*), an end portion of the flexible substrate 126 holding the two copper patterns 127 is laid on and fixed to the upper side (outside) of the flexible substrate 71 on the bottom face of the plug body 64. Two bottom face electrode terminals 128 electrically connected to the bottom face electrode terminals 123 of the receptacle body 122 are provided on the flexible substrate 126 in locations corresponding to the contacts 124 of the receptacle body 122.

Other configuration and the method of fitting the plug 125 to the receptacle 121 are same as those of the first embodiment.

As described above, the electrode terminal connecting structure of this embodiment is achieved by a connecting structure for connection between the side face electrode terminals 58 of the receptacle body 122 and the side face electrode terminals 73 of the plug 64 similar to that of the first embodiment in combination with a connecting structure for connection between the bottom face electrode terminals 123 of the receptacle body 122 and the bottom face electrode terminals 128 of the plug body 64 similar to that of the fourth embodiment.

According to this embodiment, the two copper patterns 127 held by the flexible substrate 126 may be assigned to a power supply and a ground which need relatively thick electrical transmission lines, and the four copper wires 66 held by the flexible substrate 71 may be assigned to other electric signals.

Thus, the plug 125 is allowed to be made small and have an increased number of electrical transmission lines.

Sixth Embodiment

This embodiment relates to a photoelectric device different from the photoelectric devices of the first to fifth embodiments. The same reference numerals are attached to the same components as those in the first embodiment to omit detailed description.

Figure 14:
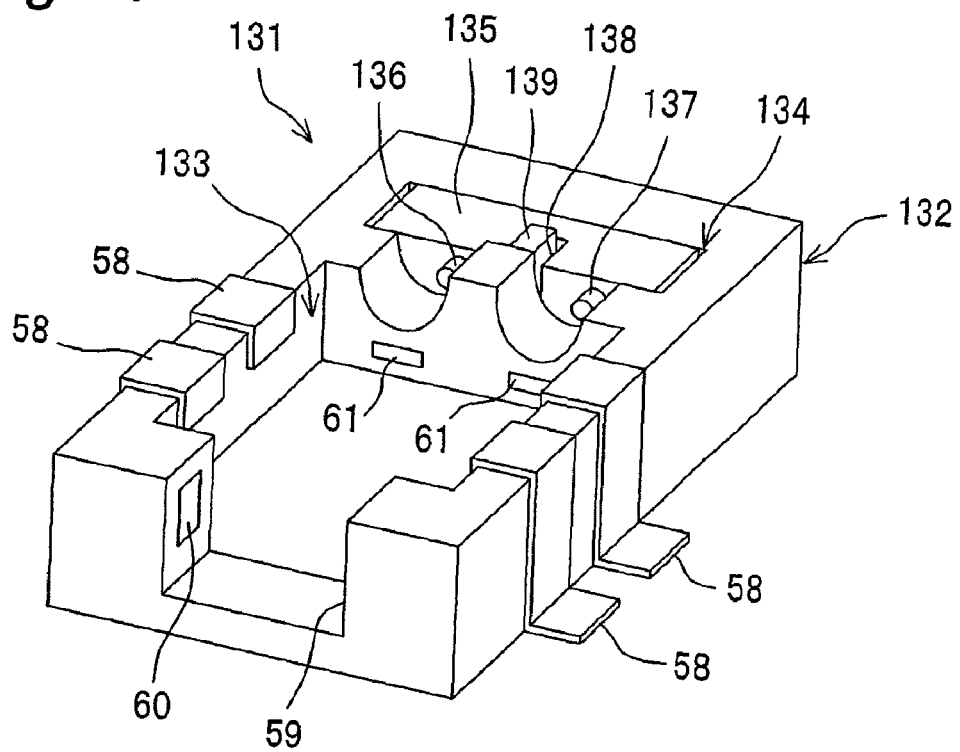
FIG. 14 is a perspective view of a receptacle of an optical and electric signals transmission apparatus according to an embodiment.
Figure 15:
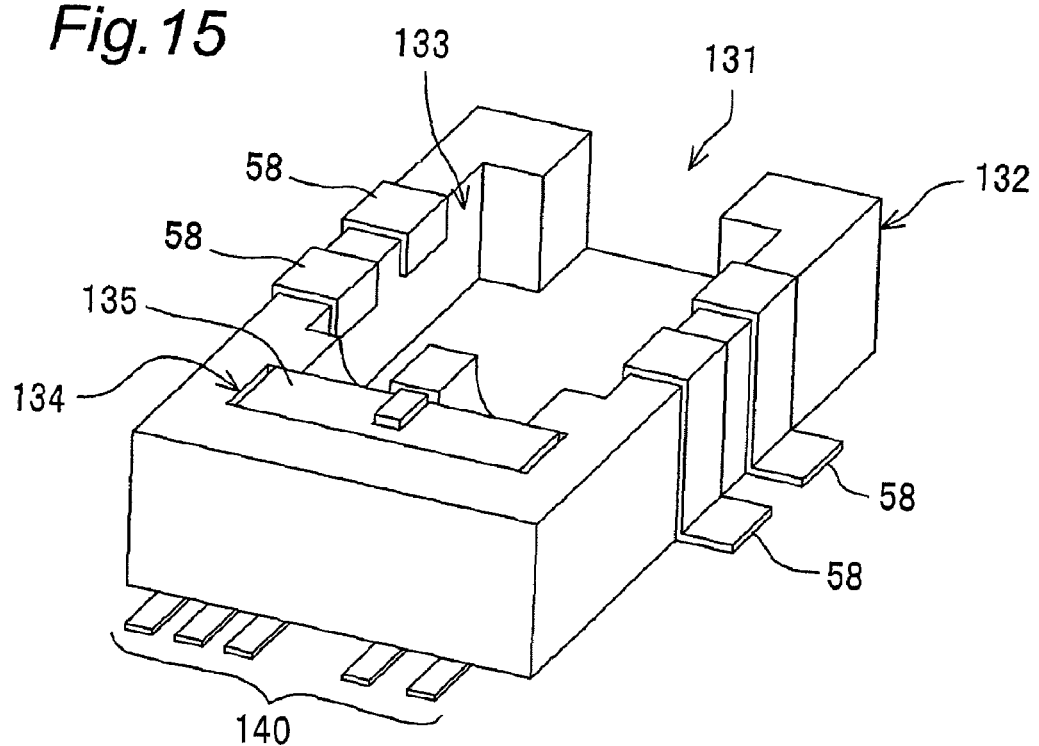
FIG. 15 is a perspective view of the receptacle shown in FIG. 14 seen from the opposite side.

FIGS. 14 and 15 are perspective views showing a schematic configuration of a receptacle 131 of the optical and electric signals transmission apparatus of this embodiment. FIGS. 14 and 15 are perspective views of the receptacle 131 seen from sides opposite to each other. A rectangular recess 133 and a rectangular hole 134 are formed on a surface of the receptacle body 132, and an optical transmitting and receiving device 135 is fitted in the hole 134. The optical transmitting and receiving device 135 has an optical signal transmitting device section including a light-emitting element, and an optical signal receiving device section including a light-receiving element and a light-receiving signal processing circuit. The optical signal transmitting device section has a lens 136 for optical coupling, and the optical signal receiving device section has a lens 137 for optical coupling. A groove 138 is provided on a boundary portion between the device sections so that the optical signal transmitting device section and the optical signal receiving device section of the optical transmitting and receiving device 135 do not affect each other. On the other hand, a rib 139 which protrudes to the optical transmitting and receiving device 135 and engages with the groove 138 of the optical transmitting and receiving device 135 is provided on a partition between the recess 133 and the hole 134 of the receptacle body 132.

FIG. 15 is a perspective view of the receptacle 131 seen from the optical transmitting and receiving device 135 to be fitted in the hole 134 of the receptacle 131. In FIG. 15, the reference numeral 140 denotes lead terminals for the optical transmitting and receiving device 135, which are used as surface mounting terminals.

FIGS. 16(a), 16(b), and 16(c) show the optical transmitting and receiving device 135 to be fitted in the hole 134 of the receptacle body 132. FIG. 16(a) is a front view of the device 135, FIG. 16(b) is a side view of the device 135, and FIG. 16(c) is a bottom view of the device 135. In the optical transmitting and receiving device 135, a light-emitting element 142 for optical signal transmission, a light-receiving element 143 for optical signal reception and a light-receiving signal processing circuit (IC) 144 are mounted on a lead frame 141 connected with the lead terminals 140 by bonding with conductive resin such as silver paste. Electrodes of the light-emitting element 142, light-receiving element 143, and light-receiving signal processing circuit 144 are electrically connected with corresponding lead terminals 140 by wire bonding with gold wires 145 or the like.

The light-emitting element 142, light-receiving element 143, and light-receiving signal processing circuit 144 mounted on the lead frame 141 are sealed with transparent resin 142. Furthermore, in order to increase the light extraction efficiency, a lens 136 for light emission made of transparent resin 146 is disposed just above the light-emitting element 142. Furthermore, in order to increase the light-reception efficiency, a lens 137 for light reception similarly made of the transparent resin 146 is disposed just above the light-receiving element 143. On the boundary portion between an optical signal transmitting device section 147 and an optical signal receiving device section 148, a groove 138 bottomed at the lead frame 141 to separate the light-emitting element 142 from the light-receiving element 143 is provided so that the light-emitting element 142 and the light-receiving element 143 do not affect each other. In addition, the lead terminals 140 are bent 90 degrees at positions just outside the sealing transparent resin 146 to be surface mounting terminals. Furthermore, a protrusion 149 provided on the light-outgoing side of the optical signal transmitting device section 147 and a protrusion 150 provided on the light-incoming side of the optical signal receiving device section 148 serve as positioning stoppers when the optical transmitting and receiving device 135 is mounted in the receptacle 131.

Furthermore, other configuration including the plug is same as that of the second embodiment performing two-way optical communication. The method of fitting the plug to the receptacle 131 in this case is also same as that of the second embodiment.

As described above, in this embodiment, the optical transmitting and receiving device 135, which has the optical signal transmitting device section 147 and the optical signal receiving device section 148 and is formed with the groove 138 separating the light-emitting element 142 from the light-receiving element 143 between the optical signal transmitting device section 147 and the optical signal receiving device section 148, is fitted in the hole 134 of the receptacle body 132. Thus, in contrast to the case that the optical signal transmitting device section 147 and the optical signal receiving device section 148 are formed as separate components, mounting of the photoelectric device to the hole 134 of the receptacle body 132 may be simple, thereby increasing the manufacturing efficiency.

Furthermore, the light-emitting element 142 of the optical signal transmitting device section 147, and the light-receiving element 143 and light-receiving signal processing circuit 144 of the optical signal receiving device section 148 are mounted on the lead frame 141 and sealed with the transparent resin 146. Thus, a small and space-saving receptacle 131 of a lead type can be obtained.

FIGS. 17(a), 17(b), and 17(c) show a variation of the optical transmitting and receiving device 135. The same reference numerals are attached to the same components as those of the optical transmitting and receiving device 135 in FIGS. 16(a), 16(b), and 16(c). In the optical transmitting and receiving device 135, the light-emitting element 142 of the optical signal transmitting device section 147, and the light-receiving element 147 and light-receiving signal processing circuit 144 of the optical signal receiving device section 148 are bonded to a rigid printed circuit board 151 with conductive resin such as silver paste. Furthermore, the electrodes of the light-emitting element 142, light-receiving element 143, and light-receiving signal processing circuit 144 are electrically connected with corresponding circuit patterns (not shown) by wire bonding with gold wires 145 or the like.

The light-emitting element 142 of the optical signal transmitting device section 147 mounted on the rigid printed circuit board 151 is sealed with transparent resin 152. Likewise, the light-receiving element 143 and the light-receiving signal processing circuit 144 of the optical signal receiving device section 148 mounted on the rigid printed circuit board 151 are sealed with transparent resin 153. On the boundary portion between the optical signal transmitting device section 147 and the optical signal receiving device section 148, a groove 138 bottomed at the rigid printed circuit board 151 to separate the light-emitting element 142 from the light-receiving element 143 is provided so that the light-emitting element 142 and the light-receiving element 143 do not affect each other. Furthermore, in order to increase the light extraction efficiency, the lens 136 for light emission made of transparent resin 152 is disposed just above the light-emitting element 142. Furthermore, in order to increase the light-reception efficiency, the lens 137 for light reception similarly made of transparent resin 153 is disposed just above the light-receiving element 143. The element side circuit patterns are mechanically and electrically connected via through-holes 154 to output terminals 155 which serve as surface mounting terminals. Furthermore, a protrusion 149 provided on the light-outgoing side of the optical signal transmitting device section 147 and a protrusion 150 provided on the light-incoming side of the optical signal receiving device section 148 serve as positioning stoppers used when the optical transmitting and receiving device 135 is attached to the receptacle 131.

First Example

FIGS. 18 to 21 show a concrete example of an optical and electric signals transmission apparatus in which the electrode terminal configuration of the fifth embodiment is applied to the general structure of the sixth embodiment. In the sixth embodiment, the configuration of the plug is not specifically described, but the plug performing two-way optical communication of the second embodiment may be used. Thus, in this example, description will be made using the plug 95 of the second embodiment. For easy understanding of the description, the same reference numerals as those of the sixth embodiment are attached to the components of the receptacle and the optical transmitting and receiving device, the same reference numerals as those of the fifth embodiment are attached to the electrode terminals, and the same reference numerals as those of the second embodiment are attached to the components of the plug.

In this example, the heights of the receptacle 131 and the plug 95 are made as small as possible like about 1 mm or less. FIG. 18 shows the state that the optical transmitting and receiving device 135 and the plug 95 are placed in the receptacle 131. The optical transmitting and receiving device 135 of this example has a width larger than the effectual width of the receptacle body 132. Furthermore, side face electrode terminals 58 are each provided from an inner wall of the recess of the receptacle body 132 to an outer wall of the receptacle body 132. In addition, bottom face electrode terminals 123 are provided from the bottom face of the recess to the outer wall of the receptacle body 132 across the inner wall of the recess. The plug 95 is fitted in the recess of the receptacle body 132, and thus the side face electrode terminals of the plug 95 are connected with the side face electrode terminals 58 of the receptacle body 132, while the bottom face electrode terminals of the plug 95 are connected with the bottom face electrode terminals of the receptacle body 132.

The optical and electric signals transmission apparatus shown in FIG. 18 is assembled as follows. First, as shown in FIG. 19, the optical transmitting and receiving device 135 having an optical signal transmitting device section 147 and an optical signal receiving device section 148 are inserted from below in the hole 134 of the receptacle body 132 and fixed thereto. In this sate, the lens for light emission 136 of the optical signal transmitting device section 147 and the lens for light reception 137 of the optical signal receiving device section 148 face the recess 133 of the receptacle body 132. Next, the bottom face electrode terminals 123 and the side face electrode terminals 58 are put from above and fixed to the walls of the recess 133 of the receptacle body 132. The side face electrode terminals 58 are shaped to have a spring characteristic. Furthermore, in this example, up to 12 side face electrode terminals 58 can be mounted.

Next, assembly of the plug 95 will be described according to FIGS. 20(a) and 20(b). As shown in FIG. 20(a), a pair of optical fiber cables 96 and 97 for transmission and reception having a diameter of 500 μm or less are inserted in and fixed to the plug body 64. In addition, a combination of a flexible substrate 71 having side face electrode terminals 73 and a flexible substrate 126 having bottom face electrode terminals 128 (see FIG. 20(b)) stacked on the flexible substrate 71 is fixed to the bottom face and side faces of the plug body 64. The flexible substrate 71 having side face electrode terminals 73 and the flexible substrate 126 having bottom face electrode terminals 128 are different flexible substrates and each constitutes an electrical signal transmission line. In this example, the two bottom face electrode terminals 128 are assigned to a power supply and a ground, while the side face electrode terminals 73 are assigned to electric signals. Furthermore, in this example, the flexible substrate 71 is laid under the flexible substrate 126, but the flexible substrate 126 may be laid under the flexible substrate 71.koko Next, the plug 95 assembled as shown in FIG. 20(a) is inserted in the recess 133 of the receptacle 131 assembled as shown in FIG. 19 from above as shown in FIG. 21 and is attached to the receptacle 131 as shown in FIG. 18. At that time, the end faces of the optical fiber cables 96 and 97 of the plug 95 are positioned to face the lens for light emission 136 and the lens for light reception 137 of the optical transmitting and receiving device 135.

The optical and electric signals transmission apparatus assembled like this is mounted on a printed circuit board as shown in FIGS. 22(a), 22(b), 23(a) and 23(b). In other words, as shown in FIGS. 22(a) and 22(b), a surface around a region 161 facing the recess 133 of the bottom face of the receptacle 131 is made lower than the region 161 by a predetermined height as a mounting surface for the printed circuit board 162. The region 161 will be referred to as a protrusion hereafter. Furthermore, a mounting hole 163 having a shape allowing the protrusion 161 of the receptacle 131 to be fitted in the hole is formed in the printed circuit board 162. As shown in FIGS. 23(a) and 23(b), the protrusion 161 of the receptacle 131 is fitted in the mounting hole 163 of the printed circuit board 162, and the mounting surface of the receptacle 131 is brought into contact with the surface of the printed circuit board 162 and fixed to it, so that the optical and electric signals transmission apparatus of this example is mounted on the printed circuit board 162.

As described above, when the optical and electric signals transmission apparatus is mounted on the printed circuit board 162, the protrusion 162 of the bottom face of the receptacle 131 is fitted in the mounting hole 163 of the printed circuit board 162. Thus, a mounting location for the receptacle 131 is fixed, and the height above the printed circuit board 162 of the receptacle 131 can be reduced by the protrusion height of the protrusion 161, so that the thickness of an apparatus constituted by the optical and electric signals transmission apparatus and the printed circuit board can be reduced.

Seventh Embodiment

This embodiment relates to an electric signal transmission line structure different from the electric signal transmission line structure of the plug body 64 of fifth embodiment. The same reference numerals are attached to the same components as those in the fifth embodiment to omit detailed description.

In the fifth embodiment, two different flexible substrates, which are a flexible substrate 71 which holds four copper wires 66 and has four side face electrode terminals 73 and a flexible substrate 126 which holds two copper patterns 127 and has two bottom face electrode terminals 128, are stacked and fixed to the bottom face of the plug body 64.

In contrast to this, as shown in FIGS. 24(a) and 24(b), in the plug 171 of this embodiment, the electric signal transmission line of this embodiment is constituted by a flexible substrate 175 which holds six copper wires 172 and has two side face electrode terminals 173 on each side of it, that is, four side face electrode terminals 173 in total, and two bottom face electrode terminals 174 in locations of the bottom face of the plug body 64.

Other configuration and the method of fitting the plug 171 to the receptacle are same as those of the fifth embodiment.

As described above, in this embodiment, the side face electrode terminals 173 and the bottom face electrode terminals 174 are formed on the common flexible substrate 175. Thus, the plug 171 for optical and electric signals transmission which has many electrode terminals and is small and thin can be realized.

Eighth Embodiment

This embodiment relates to an optical and electric signals transmission line structure different from the optical and electric signals transmission line structures of the plug bodies 64 of first to seventh embodiments. The same reference numerals are attached to the same components as those in the first to fourth embodiments to omit detailed description.

FIG. 25 is a perspective view showing a schematic configuration of the receptacle 181 of the optical and electric signals transmission apparatus of this embodiment. A rectangular recess 183 and a rectangular hole 184 continuing to it are formed on a surface of the receptacle body 182, and a photoelectric device for optical signal transmission 55 is fitted in the hole 184. Furthermore, a plug described later is fitted in the recess 183. Two front hooks 61 (only one of them is seen) engaging with front hooks provided on the plug are provided on the partition between the recess 183 and the hole 184.

Furthermore, bottom face electrode terminals for electric signal transmission 113 electrically connected to electrode terminals of the loaded plug are provided from the bottom face of the recess 183 of the receptacle body 182 to the outer wall of the receptacle body 182 via the inner wall of the recess 183. Provided on portions 113a formed on the bottom face of the recess 53 of the bottom face electrode terminals 113 are circular contacts 114 having a predetermined thickness so that the bottom face electrode terminals are able to effectively come into contact with the electrode terminals of the plug.

FIGS. 26(a) and 26(b) are perspective views of a plug 186 which is fitted in the recess 183 of the receptacle body 182. FIG. 26(a) is a perspective view of the plug 186 seen from the back, and FIG. 26(b) is a perspective view of the plug 186 seen from the front bottom. In FIGS. 26(a) and 26(b), an end portion of a laminate consisting of an optical waveguide holder 189 shaped like a flat plate holding an optical waveguide 188 and a flexible substrate 117 holding two copper patterns 116 for electric signal transmission is mounted on the bottom face of the plug body 187 by, for example, adhesion or the like.

Two bottom face electrode terminals 118 electrically connected to the bottom face electrode terminals 113 of the receptacle body 182 are provided in locations corresponding to the contacts 114 of the receptacle body 182 of the flexible substrate 117. The two bottom face electrode terminals 118 are mechanically and electrically connected with the two copper patterns 116 inside the flexible substrate 117.

In contrast to this, the optical waveguide holder 189 extends to an end of the plug body 187 and is located in such a manner that an end face of the optical waveguide 188 faces the lens 56 of the photoelectric device 55 when the plug 186 is fitted in the recess 183 of the receptacle body 182. Furthermore, two front hooks 68 engaging with two front hooks 61 provided on the partition 185 of the receptacle body 182 are provided on the front face of the plug body 187.

Other configuration and the method of fitting the plug 186 to the receptacle 181 are same as those of the first and fourth embodiments.

As described above, in this embodiment, the optical signal transmission line is constituted by the optical waveguide holder 189 shaped like a flat plate holding the optical waveguide 188, and is laid on the flexible substrate 117 holding the two copper patterns 116 which are electrical signal transmission lines. In this way, the optical signal transmission line and the electric signal transmission lines are made thin, so that the thickness of the optical and electric signals transmission line can be reduced, and furthermore the thickness of the plug 186 can also be reduced.

In this embodiment, the bottom face electrode terminals 113 provided from the bottom face of the recess 183 of the receptacle body 182 to the outer wall of the receptacle body 182 via the inner wall of the recess 183 are used as electrode terminals for the electric signal transmission lines, but it may be perfectly all right to use side face electrode terminals provided from the inner wall of the recess 183 to the outer wall of the receptacle body 182 as electrode terminals for the electric signal transmission lines. However, in this case, it is necessary to form side face electrode terminals also on the plug 186.

Ninth Embodiment

In contrast to the eighth embodiment that relates to a one-way optical signal transmission line, this ninth embodiment relates to a two-way optical signal transmission line. The same reference numerals are attached to the same components as those in the eighth and second embodiments to omit detailed description.

FIGS. 27(a) and 27(b) are perspective views each showing a schematic configuration of a receptacle of the optical and electric signals transmission apparatus of this embodiment. FIG. 27(a) shows a receptacle 191 to which an optical transmitting and receiving device is mounted. In contrast to this, FIG. 27(b) shows a receptacle 195 to which an optical signal transmitting device and an optical signal receiving device are individually mounted as in the second embodiment.

In FIG. 27(a), a rectangular recess 183 and a rectangular hole 184 continuing from the recess 183 are formed on a surface of a receptacle body 182, and an optical transmitting and receiving device 192 constituted by an optical signal transmitting device section and an optical signal receiving device section which are formed in one piece is fitted in the hole 184. In addition, a plug described later is fitted in the recess 183. The optical transmitting and receiving device 192 has a lens 193 for optical transmission and a lens 194 for optical reception.

In FIG. 27(b), a rectangular recess 183 and two rectangular holes 197 and 198 continuing from the recess 183 are formed on a face of a receptacle body 196, and the two holes 197 and 198 are formed in locations corresponding to the location of the hole 184 of the receptacle body 182 shown in FIG. 27(a). An optical signal transmitting device 85 including a light-emitting element is fitted in one 197 of the two holes 197 and 198. Furthermore, an optical signal receiving device 86 including a light-receiving element and a light-receiving signal processing circuit is fitted in the other hole 198. The devices 85 and 86 have lenses 87 and 88 for optical coupling, respectively. In addition, a plug described later is fitted in the recess 183.

FIGS. 28(a) and 28(b) are perspective views of a plug 199 to be fitted in the recess 183 of the receptacle body 182 in FIG. 27(a) or the receptacle body 196 in FIG. 27(b). FIG. 28(a) is a perspective view of the plug seen from the back, and FIG. 28(b) is a perspective view of the plug seen from the front bottom. In FIGS. 28(a) and 28(b), an end portion of a laminate consisting of an optical waveguide holder 202 shaped like a flat plate holding an optical waveguide 200 for optical signal transmission and an optical waveguide 201 for optical signal reception, and a flexible substrate 117 for electric signal transmission having a configuration similar to that of the eighth embodiment is mounted on the bottom face of the plug body 187 by, for example, adhesion or the like.

The optical waveguide holder 202 extends to an end of the plug body 187 and is located in such a manner that an end face of the optical waveguide 200 (201) faces the lens 193 (194) of the optical transmitting and receiving device 192 when the plug 199 is fitted in the recess 183 of the receptacle body 182, or in such a manner that an end face of the optical waveguide 200 (201) faces the lens 87 of the optical signal transmitting device 85 (the lens 88 of the optical signal receiving device 86).

Other configuration and the method of fitting the plug 199 to the receptacle 191 or 195 are same as those of the eighth embodiment.

As described above, in this embodiment, the optical signal transmission line is constituted by the optical waveguide holder 202 shaped like a flat plate holding the optical waveguide for optical signal transmission 200 and the optical waveguide for optical signal reception 201. Thus, the thickness of the plug 199 capable of performing two-way optical communication and one-way or two-way electrical communication at the same time can be reduced.

In this embodiment, the bottom face electrode terminals 113 provided from the bottom face of the recess 183 of the receptacle body 182, 196 to the outer wall of the receptacle body 182, 196 via the inner wall of the recess 183 are used as electrode terminals for the electric signal transmission line, but it may be perfectly all right to use side face electrode terminals provided from the inner wall of the recess 183 to the outer wall of the receptacle body 182, 196 as electrode terminals for the electric signal transmission line.

Tenth Embodiment

In the above-described eighth and ninth embodiments, an optical and electric signals transmission line is constituted by a laminate consisting of an optical waveguide holder holding an optical waveguide and a flexible substrate holding a copper pattern. However, in this embodiment, an optical and electric signals transmission line is constituted by a single-layer component. The same reference numerals are attached to the same components as those in the ninth embodiment to omit detailed description.

FIGS. 29(a) and 29(b) are perspective views of a plug 211 in this embodiment. FIG. 29(a) is a perspective view of the plug seen from the back, and FIG. 29(b) is a perspective view of the plug seen from the front bottom. The plug 211 is attached to the receptacle body 182 shown in FIG. 27(a) of the ninth embodiment or a receptacle body 196 shown in FIG. 27(b) of the ninth embodiment.

In FIGS. 29(a) and 29(b), an end portion of a flexible substrate 215 holding an optical waveguide for optical signal transmission 212, an optical waveguide for optical signal reception 213, and two copper patterns for electric signal transmission 214 is mounted on the bottom face of the plug body 187 by, for example, adhesion or the like. In this embodiment, the optical waveguides 212 and 213 are disposed inside the plug more than the copper patterns 214, but the copper patterns 214 may be disposed inside the plug more than the optical waveguides. Furthermore, the flexible substrate 215 is obtained by forming the optical waveguides 212 and 213 first when the resin portion is made of polyimide resin and then forming the copper patterns 214.

Furthermore, two bottom face electrode terminals 216 electrically connected to the bottom face electrode terminals 113 of the receptacle body 182, 196 are provided in locations corresponding to the contacts 114 of the bottom face electrode terminals 113 of the receptacle body 182, 196 of the ninth embodiment of the flexible substrate 215 mounted on the bottom face of the plug body 187. The two bottom face electrode terminals 216 are mechanically and electrically connected with the two copper patterns 214 inside the flexible substrate 215.

In addition, the flexible substrate 215 extends to an end of the plug body 187 and is located in such a manner that end faces of the optical waveguide 212, 213 face the lenses 193, 194 of the optical transmitting and receiving device 192 when the plug 211 is fitted in the recess 183 of the receptacle body 182 of the ninth embodiment, or in such a manner that end faces of the optical waveguides 212, 213 face the lens 87 of the optical signal transmitting device 85 and the lens 88 of the optical signal receiving device 86 when the plug 211 is fitted in the recess 183 of the receptacle body 196 of the ninth embodiment.

Other configuration and the method of fitting the plug 211 to the receptacle are same as those of the ninth embodiment.

As described above, in this embodiment, the optical and electric signals transmission line is constituted by a single layer component of the flexible substrate 215 holding the optical waveguides 212 and 213 for optical signal transmission and the copper patterns for electric signal transmission 214. Thus, the thickness of the plug 211 can be further reduced as compared with the case that the optical and electric signals transmission line is constituted by the laminated component of the optical waveguide holder holding the optical waveguides and the flexible substrate holding the copper patterns as in the case of the eighth embodiment or the ninth embodiment.

In this embodiment, the case that two-way optical communication is performed is described as an example. However, it is needless to say that this embodiment may be applied to the case that one-way optical communication is performed.

Eleventh Embodiment

This embodiment relates to a method of forming the plug 63 of the first embodiment. FIG. 30 shows a procedure for forming the plug 63. The same reference numerals are attached to the same components as those in the first embodiment to omit detailed description.

First, a flexible substrate 71 is formed which holds four copper wires 66 and has side face electrode terminals 73 on both sides of it. Next, as shown in FIG. 30, a plug body 64 which has an optical fiber supporting unit 67 with a through-hole 221 for penetration of an optical fiber cable 65 on one end of the plug body and a protrusion 69 on the other end of the plug body, and is equipped with the flexible substrate 71 provided from one side to the other side through the bottom face is insert-molded of resin. As described above, in this embodiment, the flexible substrate 71 is integrated with the plug body 64 by insert molding, so that the flexible substrate 71 and the side face electrode terminals 73 are accommodated in the plug body 64. Thus, the width of the plug 63 can be reduced as compared with the case that the flexible substrate 71 is directly stuck to both sides of the plug body 64 as shown in FIG. 2 in the first embodiment.

After that, an optical fiber cable 65 is inserted into the through-hole 221 of the plug body 64 to which the flexible substrate 71 is attached completing the plug 63.

As described above, in this embodiment, the plug 63 is made by attaching and fixing the flexible substrate 71 having the copper wires 66 and the side face electrode terminals 173 formed by insert-molding to the plug body 64 molded of resin and inserting the optical fiber cable 65 into the through-hole 221. Thus, the process of assembling the plug 63 can be simplified to increase the productivity.

In this embodiment, the plug 63 for one-way optical communication is described as an example, but this embodiment may be applied to a plug for two-way optical communication having two optical fiber cables. Furthermore, even if the electrode terminals are bottom face electrode terminals like those of the fourth embodiment, the flexible substrate 71 can be formed by insert-molding.

Twelfth Embodiment

This embodiment relates to a method of forming the plug 105 of the third embodiment. FIG. 31 shows a procedure for forming the plug 105. The same reference numerals are attached to the same components as those in the third embodiment to omit detailed description.

First, a component is formed in which four metal electrodes becoming the side face electrode terminals 107 are connected with a supporting bar 231 through connecting branches 233 having soldering portions. By insert-molding for the metal electrodes, the soldering portions 232, and the connecting branches 233, a plug body 64 is formed which has side face electrode terminals 107 on both sides of it, and an optical fiber supporting unit 67 equipped with a through-hole 234 for penetration of an optical fiber cable 65 at one end of the plug body, and a protrusion 69 at the other end of the plug body.

After that, the supporting bar 231 attached to the plug body 64 is cut off at the boundaries of the connecting branches 233. After that, the tips of four copper wires 66 of a coaxial cable 106 having a protective cover for protection of the copper wires 66 are soldered to the soldering portions 232 of the plug body 64.

After that, an optical fiber cable 65 is inserted into the through-hole 234 of the plug body 64 to which the coaxial cable 106 has been attached completing the plug 105.

As described above, in this embodiment, the plug 105 is made by soldering the copper wires 66 of the coaxial cable 106 to the plug body 64 having the side face electrode terminals 107 formed by insert-molding and inserting the optical fiber cable 65 into the through-hole 234. Thus, the plug 105 having an electric signal transmission line which is excellent in flexibility can be formed easily.

In FIG. 31, the plug for one-way optical communication 105 is depicted as an example. However, also in the case of a plug for two-way optical communication like that of the second embodiment, a plug body having side face electrode terminals can be formed by insert-molding.

Thirteenth Embodiment

This embodiment relates to a method of forming the plug 63 of the first embodiment different from that of the eleventh embodiment. FIG. 32 shows a procedure for forming the plug 63. The same reference numerals are attached to the same components as those in the first embodiment to omit detailed description.

A plug body 64 in which an optical fiber cable 65 is inserted having a protrusion 69 at one end of it is formed by insert-molding. Next, as shown in FIG. 32, a flexible substrate 71 which holds four copper wires 66 and has side face electrode terminals 73 connected with the copper wires 66 on both sides of it is stuck to the bottom face and both sides of the plug body 64 with adhesive resin to complete the plug 63.

As described above, in this embodiment, the plug 63 is made by mounting the flexible substrate 71 having the copper wires 66 and the side face electrode terminals 73 on the plug body 64 in which the optical fiber cable 65 formed by insert-molding is inserted. Thus, the process of assembling the plug 63 can be simplified to increase the productivity.

In this embodiment, the case that the electrode terminals are side face electrode terminals 73 is described as an example. However, the electrode terminals may be bottom face electrode terminals like those of the fourth embodiment. Furthermore, this embodiment can also be applied in the case that the electric signal transmission line is a coaxial cable. Furthermore, also for a plug for two-way optical communication having two optical fiber cables, a plug body in which an optical fiber cable is inserted can be formed by insert-molding.

In the eleventh to thirteenth embodiments, It is not described in detail but needless to say that not only the protrusion 69 but also the front hooks 68, the side hooks 72, and the like are formed at the same time when the plug body 64 is formed by insert-molding.

Fourteenth Embodiment

This embodiment relates to an optical and electric signals transmission system using an optical and electric signals transmission apparatus according to any of the first to tenth embodiments.

FIG. 33 is a circuit diagram of the optical and electric signals transmission system of this embodiment. The optical and electric signals transmission system 241 is constituted roughly by a transmitting first optical and electric signals transmission apparatus 242 and a receiving second optical and electric signals transmission apparatus 243 each having a one-way optical signal transmission line like that shown in any one of the first, third to fifth, seventh, and eighth embodiments.

The first optical and electric signals transmission apparatus 242 includes an optical transmitting device 244 having a light-emitting element and a drive control circuit 245 driving the light-emitting element and controlling the light-emitting operation. Furthermore, the second optical and electric signals transmission apparatus 243 includes an optical receiving device 246 including a light-receiving element 247 and a signal processing circuit 248 such as a trans-impedance amplifier processing a light-receiving signal received from the light-receiving element 247, a receiving circuit 249 amplifying the light-receiving signal obtained through the impedance conversion by the signal processing circuit 248 to extract a pulse signal as the receiving signal, and a receiving level detecting circuit 250 detecting a level of the voltage waveform of the pulse signal.

The receiving level detecting circuit 250 of the second optical and electric signals transmission apparatus 243 feeds an electric signal representing the level of light received by the light-receiving element 247 back to the drive control circuit 245 of the transmitting first optical and electric signals transmission apparatus 242 through an electric signal transmission line 251. The electric signal transmission line 251 may be constituted by a flexible substrate 71, 175 holding copper wires 66, 172 (see FIGS. 3, 24(a), and 24(b)), a coaxial cable 235 including copper wires 66 (see FIG. 31), or a flexible substrate 117, 215 holding copper patterns 116, 214 (see FIGS. 28(a), 28(b), 29(a), and 29(b)). By feeding back the electrical signal representing the amount of light received, the transmitting drive control circuit 245 is able to control a drive current for the light-emitting element in such a manner that the light-emitting element emits an optimum amount of light.

As described above, in this embodiment, the transmitting first optical and electric signals transmission apparatus 242 including the optical transmitting device 244 and the receiving second optical and electric signals transmission apparatus 243 including the optical receiving device 246 are each constituted by an optical and electric signals transmission apparatus shown in any one of the first, third, fourth, fifth, seventh, and eighth embodiments. Thus, the optical and electric signals transmission system allowing steady high-speed optical transmission by an optical signal of an optimum amount of light can be reduced in size and thickness.

FIG. 34 is a circuit diagram of an optical and electric signals transmission system different from that in FIG. 33 in this embodiment. The optical and electric signals transmission system 261 is constituted roughly by a first optical and electric signals transmission apparatus 262 and a second optical and electric signals transmission apparatus 263 each having a two-way optical signal transmission line like that according to any one of the second, sixth, ninth, and tenth embodiments.

The first optical and electric signals transmission apparatus 262 includes an optical transmitting and receiving device 264, a drive control circuit 268, a receiving circuit 269, and a receiving level detecting circuit 270. The optical transmitting and receiving device 264 includes a light-emitting element 265, a light-receiving element 266, and a signal processing circuit 267 such as a trans-impedance amplifier processing a light-receiving signal received from the light-receiving element 266. The drive control circuit 268 drives the light-emitting element 265 and controls the light-emitting operation. The receiving circuit 269 amplifies the light-receiving signal obtained through the impedance conversion by the signal processing circuit 267 of the optical transmitting and receiving device 264 to extract a pulse signal. The receiving level detecting circuit 270 detects the level of the pulse signal.

The second optical and electric signals transmission apparatus 263 has entirely the same configuration as that of the first optical and electric signals transmission apparatus 262. For this reason, reference numerals obtained by adding an inverted comma to the reference numerals of the components of the first optical and electric signals transmission apparatus 262 are attached to corresponding components of the second optical and electric signals transmission apparatus 263 to omit detailed description thereof.

Furthermore, the drive control circuit 268 of the first optical and electric signals transmission apparatus 262 is connected with the receiving level detecting circuit 270' of the second optical and electric signals transmission apparatus 263 by a first electric signal transmission line 271. Likewise, the receiving level detecting circuit 270 of the first optical and electric signals transmission apparatus 262 is connected with the drive control circuit 268' of the second optical and electric signals transmission apparatus 263 by a second electric signal transmission line 272. The first electric signal transmission line 271 and the second electric signal transmission line 272 are constituted as one electric signal transmission line unit by a flexible substrate 71 holding copper wires 66 (see FIGS. 7(a) and 7(b)) or a flexible substrate 117, 215 holding copper patterns 116, 214 (see FIGS. 28(a), 28(b), 29(a), and 29(b)).

In the above configuration, the light-emitting element 265 and drive control circuit 268 of the first optical and electric signals transmission apparatus 262, and the light-receiving element 266', signal processing circuit 267', receiving circuit 269', and receiving level detecting circuit 270' of the second optical and electric signals transmission apparatus 263 function like the optical and electric signals transmission system having a one-way optical signal transmission line shown in FIG. 33. Thus, an electric signal representing the level of light received by the light-receiving element 266' of the second optical and electric signals transmission apparatus 263 can be fed back from the receiving level detecting circuit 270' of the second optical and electric signals transmission apparatus 263 to the drive control circuit 268 of the first optical and electric signals transmission apparatus 262, and the optical transmitting drive control circuit 268 is able to control the drive current of the light-emitting element 265 in such a manner that the light-emitting element 265 emits an optimum amount of light.

In addition, the light-emitting element 265' and the drive control circuit 268' of the second optical and electric signals transmission apparatus 263, and the light-receiving element 266, the signal processing circuit 267, the receiving circuit 269, and the receiving level detecting circuit 270 of the first optical and electric signals transmission apparatus 262 function like the optical and electric signals transmission system having a one-way optical signal transmission line shown in FIG. 33. Thus, an electric signal representing the level of light received by the light-receiving element 266 of the first optical and electric signals transmission apparatus 262 is fed back from the receiving level detecting circuit 270 of the first optical and electric signals transmission apparatus 262 to the drive control circuit 268' of the second optical and electric signals transmission apparatus 263, and the optical transmitting drive control circuit 268' is able to control the drive current of the light-emitting element 265' in such a manner that the light-emitting element 265' emits an optimum amount of light.

As described above, in this embodiment, the first optical and electric signals transmission apparatus 262 including the optical transmitting and receiving device 264 and the second optical and electric signals transmission apparatus 263 including the optical transmitting and receiving device 264' are each constituted by an optical and electric signals transmission apparatus according to any one of the second, sixth, ninth, and tenth embodiments. Thus, it is possible to reduce the size and thickness of an optical and electric signals transmission system allowing steady two-way high-speed optical transmission by optical signals of an optimum amount of light.

Fifteenth Embodiment

This embodiment relates to an optical and electric signals transmission system in which the electric signal fed back in the optical and electric signals transmission system of the fourteenth embodiment is limited to an analog electric signal.

FIG. 35 is a circuit diagram of the optical and electric signals transmission system 281 performing one-way optical signal transmission of this embodiment. The same reference numerals as those in FIG. 33 are attached to components having the same functions as those of the optical and electric signals transmission system shown in FIG. 33 of the fourteenth embodiment to omit detailed description.

In the second optical and electric signals transmission apparatus 243, the receiving level detecting circuit 284 detecting the level of the voltage waveform of a pulse signal extracted from a light-receiving signal by the receiving circuit 249 has a peak hold circuit 285 which detecting a peak voltage from the voltage waveform of the pulse signal and holds the peak voltage. The receiving level detecting circuit 284 feeds back the peak voltage (an analog value) held by the peak hold circuit 285 to the drive control circuit 282 of the first optical and electric signals transmission apparatus 242 as an analog electric signal.

The drive control circuit 282 has an analog processing circuit 283 which processes the analog electric signal received through the electric signal transmission line 251 and sets a drive current for allowing the light-emitting element of the optical transmitting device to emit an optimum amount of light. The drive control circuit 282 drives the light-emitting element with the drive current set by the analog processing circuit 283 to allow it to emit an optimum amount of light.

As described above, in this embodiment, the receiving level detecting circuit 284 of the second optical and electric signals transmission apparatus 243 is configured to have the peak hold circuit 284 detecting a peak voltage from the voltage waveform of a pulse signal extracted from a light-receiving signal and holding the peak voltage, and the drive control circuit 282 of the first optical and electric signals transmission apparatus 242 is configured to have the analog processing circuit 283 processing a received analog electric signal and setting a drive current for allowing the light-emitting element to emit an optimum amount of light. Thus, it is not necessary to provide an A/D converter or the like in the receiving level detecting circuit 284 nor provide a D/A converter or the like in the drive control circuit 282 as in the case that a digital electric signal is fed back, so that the circuit configuration can be simplified.

In this embodiment, an optical and electric signals transmission system performing one-way optical signal transmission is described as an example. However, this embodiment can be similarly applied to an optical and electric signals transmission system performing two-way optical signal transmission. In that case, in the optical and electric signals transmission system shown in FIG. 34 of the fourteenth embodiment, a peak hold circuit holding the peak value of a pulse signal extracted from a light-receiving signal is provided in the receiving level detecting circuit 270 of the first optical and electric signals transmission apparatus 262 and in the receiving level detecting circuit 270' of the second optical and electric signals transmission apparatus 263. In addition, an analog processing circuit processing a received analog electric signal and setting a drive current for allowing a light-emitting element to emit an optimum amount of light is provided in the drive control circuit 268 of the first optical and electric signals transmission apparatus 262 and in the drive control circuit 268' of the second optical and electric signals transmission apparatus 263.

Sixteenth Embodiment

This embodiment relates to an optical and electric signals transmission system in which the electric signal fed back in the optical and electric signals transmission system of the fourteenth embodiment is limited to a digital electric signal.

FIG. 36 is a circuit diagram of the optical and electric signals transmission system 286 performing one-way optical signal transmission of this embodiment. The same reference numerals as those in FIG. 35 are attached to components having the same functions as those of the optical and electric signals transmission system shown in FIG. 35 of the fifteenth embodiment to omit detailed description.

In the second optical and electric signals transmission apparatus 288, the receiving level detecting circuit 290 converts a peak voltage (an analog value) held by the peak hold circuit 285 to a digital electric signal by an internal A/D converter (not shown) and feeds back the digital electric signal to the first optical and electric signals transmission apparatus 287.

The first optical and electric signals transmission apparatus 287 converts the digital electric signal received through the electric signal transmission line 251 to an analog electric signal and sends out the analog electric signal to the drive control circuit 282. The drive control circuit 282 sets, like that of the fifteenth embodiment, a drive current for allowing the light-emitting element of the optical transmitting device 244 to emit an optimum amount of light, and drives the light-emitting element with the drive current which has been set to allow it to emit an optimum amount of light.

As described above, in this embodiment, a digital electric signal representing a peak voltage is fed back from the second optical and electric signals transmission apparatus 288 to the first optical and electric signals transmission apparatus 287. Thus, the peak voltage of a pulse signal can be transmitted with a steady digital electric signal.

In this embodiment, an optical and electric signals transmission system performing one-way optical signal transmission is described as an example. However, this embodiment can be similarly applied to an optical and electric signals transmission system performing two-way optical signal transmission.

Seventeenth Embodiment

This embodiment relates to another optical and electric signals transmission system in which the electric signal fed back in the optical and electric signals transmission system of the fourteenth embodiment is limited to a digital electric signal.

FIG. 37 is a circuit diagram of the optical and electric signals transmission system 291 performing two-way optical signal transmission of this embodiment. The same reference numerals as those in FIG. 34 are attached to components having the same functions as those of the optical and electric signals transmission system shown in FIG. 34 of the fourteenth embodiment to omit detailed description. Also in this embodiment, the second optical and electric signals transmission apparatus 263 has entirely the same configuration as that of the first optical and electric signals transmission apparatus 262. For this reason, reference numerals obtained by adding an inverted comma to the reference numerals of components of the first optical and electric signals transmission apparatus 262 are attached to components of the second optical and electric signals transmission apparatus 263 corresponding to the components of the first optical and electric signals transmission apparatus 262.

On the first optical and electric signals transmission apparatus 262 and the second optical and electric signals transmission apparatus 263, a communication control integrated circuit (IC) 292, 292' is mounted in addition to the optical transmitting and receiving device 264, 264'. The communication control IC 292, 292' includes a peak hold circuit 293, 293' detecting a peak voltage from the waveform of a pulse signal extracted by a receiving circuit 269, 269' and holding the peak voltage, an A/D converter 294, 294' converting the peak voltage (an analog value) held by the peak hold circuit 293, 293' to a digital value, and a voltage detecting circuit 296, 296' having a D/A converter 295, 295' converting an inputted digital signal for light-emitting element control to an analog signals such as a voltage, in addition to a drive control circuit 268, 268' and a receiving circuit 269, 269'.

In addition, a first microprocessor 297 connected with the first optical and electric signals transmission apparatus 262 and a second microprocessor 298 connected with the second optical and electric signals transmission apparatus 263 are provided. When a peak voltage (a digital value) is input to the first/second microprocessor 297, 298 from the A/D converter 294, 294', the first/second microprocessor 297, 298 converts the peak voltage to an appropriate value (a digital value) of an emission level of the light-emitting element 265, 265' using an internal correlation table. The first/second microprocessor 297, 298 then transmits the appropriate value to the voltage detecting circuit 296', 296 of the second/first optical and electric signals transmission apparatus 263, 262 through the first/second electric signal transmission line 299, 300 constituted as an electric signal transmission line by a flexible substrate 71 holding copper wires 66 (see FIGS. 7(a) and 7(b)) or a flexible substrate 117, 215 holding copper patterns 116, 214 (see FIGS. 28(a), 28(b), 29(a), and 29(b)).

In addition, the first microprocessor 297 (second microprocessor 298) sends out digital information to be transmitted to the second microprocessor 298 (first microprocessor 297) to the drive control circuit 268 (268') of the first optical and electric signals transmission apparatus 262 (second optical and electric signals transmission apparatus 263), while receiving and deciphering a pulse signal extracted by the receiving circuit 269 (269') of the first optical and electric signals transmission apparatus 262 (second optical and electric signals transmission apparatus 263) to obtain digital information transmitted from the second microprocessor 298 (first microprocessor 263).

In the optical and electric signals transmission system having the above configuration, when the first microprocessor 297, for example, sends out digital information to the drive control circuit 268 of the first optical and electric signals transmission apparatus 262, the drive control circuit 268 sends out a control signal corresponding to the digital information to the light-emitting element 265. The light-emitting element 265 then emits light according to the control signal, and an optical signal is transmitted to the light-receiving element 266' of the second optical and electric signals transmission apparatus 263 through an optical signal transmission line constituted by an optical fiber cable 96 or 97 (see FIGS. 7(a) and 7(b)), an optical waveguide holder 202 (see FIGS. 28(a) and 28(b)) holding optical waveguides 200 and 201, or a flexible substrate 215 (see FIGS. 29(a) and 29(b)) holding optical waveguides 212 and 213 and two copper patterns for electrical signal transmission 214.

When the optical signal from the first optical and electric signals transmission apparatus 262 is received by the light-receiving element 266' of the second optical and electric signals transmission apparatus 263, processing such as impedance conversion of the optical signal is performed by the signal processing circuit 267', and a signal obtained by the processing is input to and amplified by the receiving circuit 269' to extract a pulse signal. A peak voltage is then detected from the waveform of the pulse signal and held by the peal hold circuit 284'. This analog peak voltage is converted to a digital signal by the A/D converter 294' and inputted to the second microprocessor 298. The second microprocessor 298 obtains an appropriate value of an emission level of the light-emitting element 265 of the first optical and electric signals transmission apparatus 262 using the internal correlation table on the basis of the peak voltage of the signal waveform, and transmits a digital signal representing the appropriate value to the voltage detecting circuit 296 of the first optical and electric signals transmission apparatus 262 through the second electric signal transmission line 300.

The D/A converter 295 of the voltage detecting circuit 296 of the first optical and electric signals transmission apparatus 262 which has received the digital signal converts the digital signal to an analog signal such as a voltage which is detected by the voltage detecting circuit 296. On the basis of the detected voltage and next digital information from the first microprocessor 297, the drive control circuit 268 sends out a drive signal for driving the light-emitting element 265 with an appropriate drive current to the light-emitting element 265 which emits light on the basis of this control signal.

The corrected optical signal from the light-emitting element 265 of the first optical and electric signals transmission apparatus 262 is checked again by the second optical and electric signals transmission apparatus 263 as described above. After that, the above operation is repeated until an optimum optical output is obtained, so that steadier optical transmission can be performed.

The above operation is described in the case that the first optical and electric signals transmission apparatus 262 emits light and the second optical and electric signals transmission apparatus 263 receives the light. However, also in the case that the second optical and electric signals transmission apparatus 263 emits light and the first optical and electric signals transmission apparatus 262 receives the light, steady optical transmission can be performed in absolutely the same fashion.

As described above, in this embodiment, a microprocessor connected with an optical and electric signals transmission apparatus which has received an optical signal sets a drive current for the light-emitting element of an optical and electric signals transmission apparatus which has transmitted the optical signal, on the basis of the peak value of the voltage waveform of a receiving signal. Thus, as compared with the case that a drive current for the light-emitting element is set in the optical and electric signals transmission apparatus, the circuit configuration of the optical and electric signals transmission apparatus can be simplified, and an optical and electric signals transmission system which is able to perform steady high-speed optical signal transmission with a simple circuit can be obtained.

In this embodiment, an optical and electric signals transmission system performing two-way optical signal transmission is described as an example. However, this embodiment can be similarly applied to an optical and electric signals transmission system performing one-way optical signal transmission.

Furthermore, in this embodiment, the A/D converter 294, 294' which digitizes a peak voltage detected and held by the peak hold circuit 293, 293' and inputs it to the first microprocessor 297/second microprocessor 298 is provided in the communication control IC 292, 292'. However, the present invention is not limited to this, and the A/D converter 294, 294' may be provided in the first microprocessor 297/second microprocessor 298.

Eighteenth Embodiment

This embodiment relates to an optical and electric signals transmission system in which the digital electric signal fed back in the optical and electric signals transmission system of the seventeenth embodiment is transmitted between two microprocessors of a first microprocessor and a second microprocessor.

FIG. 38 is a circuit diagram of the optical and electric signals transmission system 301 performing two-way optical signal transmission of this embodiment. The same reference numerals as those in FIG. 37 are attached to components having the same functions as those of the optical and electric signals transmission system shown in FIG. 37 of the seventeenth embodiment to omit detailed description. Also in this embodiment, the second optical and electric signals transmission apparatus 303 has entirely the same configuration as that of the first optical and electric signals transmission apparatus 302. For this reason, reference numerals obtained by adding an inverted comma to the reference numerals of components of the first optical and electric signals transmission apparatus 302 are attached to components of the second optical and electric signals transmission apparatus 303 corresponding to the components of the first optical and electric signals transmission apparatus 302.

The first optical and electric signals transmission apparatus 302 and the second optical and electric signals transmission apparatus 303 are provided with an optical transmitting and receiving device 264, 264' and a communication control IC 304, 304'. The communication control IC 304, 304' includes a voltage detecting circuit 305, 305' detecting a voltage for setting a drive current used when driving a light-emitting element 265, 265' on the basis of an inputted analog signal for light-emitting element control, in addition to a drive control circuit 268, 268', a receiving circuit 269, 269', a peak hold circuit 293, 293', and an A/D converter 294, 294'.

Furthermore, each of the first microprocessor 306 connected with the first optical and electric signals transmission apparatus 302 and the second microprocessor 307 connected with the second optical and electric signals transmission apparatus 303 converts, like that of the seventeenth embodiment, a digital value from the A/D converter 294, 294' to an appropriate value (a digital value) of an emission level of the light-emitting element 265, 265' using a correlation table, and transmits the appropriate value to the second/first microprocessor 307, 306 through the first/second electric signal transmission line 308, 309 constituted as one electric signal transmission line unit by a flexible substrate 71 holding copper wires 66 (see FIGS. 7(a) and 7(b)) or a flexible substrate 117 or 215 holding copper patterns 116 or 214 (see FIGS. 28(a), 28(b), 29(a), and 29(b)). In addition, the first/second microprocessor 306, 307 sends out digital information to be transmitted to the second/first microprocessor 307, 306 to the drive control circuit 268, 268' of the first/second optical and electric signals transmission apparatus 302, 303, while receiving and deciphering a pulse signal extracted by the receiving circuit 269, 269' of the first/second optical and electric signals transmission apparatus 302, 303 to obtain digital information transmitted from the second/first microprocessor 307, 306.

In addition, the first/second microprocessor 306, 307 in this embodiment receives a digital signal representing an appropriate value of an emission level transmitted from the second/first microprocessor 307, 306 through the second/first electric signal transmission line 309, 308. The first microprocessor 306/second microprocessor 307 then obtains a digital signal for light-emitting element control for obtaining an optimum optical output, using an internal translation table or the like, converts this digital signal to an analog signal by an internal D/A converter (not shown), and sends out the analog signal to the voltage detecting circuit 305, 305' of the first/second optical and electric signals transmission apparatus 302, 303.

As described above, in this embodiment, the first/second microprocessor 306, 307 directly receives a digital electric signal fed back from the second/first microprocessor 307, 306, converts the digital electric signal to an analog signal for light-emitting element control using a translation table or the like, and outputs the analog signal to the voltage detecting circuit 305, 305', so that it is not necessary to provide a D/A converter or the like in the first/second optical and electric signals transmission apparatus 305, 305' like the seventeenth embodiment, and the circuit configuration of the optical and electric signals transmission system can be simplified.

In this embodiment, an optical and electric signals transmission system performing two-way optical signal transmission is described as an example. However, this embodiment can be similarly applied to an optical and electric signals transmission system performing one-way optical signal transmission.

Furthermore, in this embodiment, the A/D converter 294, 294' which digitizes a peak voltage detected and held by the peak hold circuit 293, 293' and inputs it to the first/second microprocessor 306, 307 is provided in the communication control IC 304, 304'. However, the present invention is not limited to this, and the A/D converter 294, 294' may be provided in the first/second microprocessor 306, 307.

Nineteenth Embodiment

This embodiment relates to an optical and electric signals transmission system in which the digital electric signal fed back in the optical and electric signals transmission system of the seventeenth embodiment is a serial signal.

FIG. 39 is a circuit diagram of the optical and electric signals transmission system 311 performing two-way optical signal transmission of this embodiment. The same reference numerals as those in FIG. 37 are attached to components having the same functions as those of the optical and electric signals transmission system shown in FIG. 37 of the seventeenth embodiment to omit detailed description. Also in this embodiment, the second optical and electric signals transmission apparatus 313 has entirely the same configuration as that of the first optical and electric signals transmission apparatus 312. For this reason, reference numerals obtained by adding an inverted comma to the reference numerals of components of the first optical and electric signals transmission apparatus 312 are attached to components of the second optical and electric signals transmission apparatus 313 corresponding to the components of the first optical and electric signals transmission apparatus 312.

The first optical and electric signals transmission apparatus 312 and the second optical and electric signals transmission apparatus 313 are each mounted with an optical transmitting and receiving device 264, 264', a communication control IC 314, 314', and a serial interface (IF) control circuit 315, 315'. The serial IF control circuit 315, 315' has a controller 316, 316', converts a peak voltage (a digital value) from the A/C converter 294, 294' to a serial signal, and transmits the serial signal to the serial I/F control circuit 315', 315 of the second/first optical and electric signals transmission apparatus 313, 312 through the first/second electric signal transmission line 319, 320 by a defined protocol and through the first/second electric signal transmission line 319, 320 constituted as one electric signal transmission line unit by a flexible substrate 71 holding copper wires 66 (see FIGS. 7(a) and 7(b)) or a flexible substrate 117 or 215 holding copper patterns 116 or 214 (see FIGS. 28(a), 28(b), 29(a), and 29(b)).

On the other hand, the serial IF control circuit 315, 315' of the first/second optical and electric signals transmission apparatus 312, 313, which has received a serial digital signal transmitted from the serial IF control circuit 315', 315 of the second/first optical and electric signals transmission apparatus 313, 312, converts the serial digital signal to a parallel digital signal and sends out it to the D/A converter 317, 317' of the communication control IC 314, 314'.

The communication control IC 314, 314' includes a D/A converter 317, 317' converting an inputted parallel digital signal for light-emitting element control to a parallel analog signal, and a voltage detecting circuit 318, 318' detecting a voltage for setting a drive current used when driving a light-emitting element 265, 265' on the basis of the analog signal for light-emitting element control received from the D/A converter 317, 317', in addition to the drive control circuit 268, 268', the receiving circuit 269, 269', the peak hold circuit 293, 293', and the A/D converter 294, 294'.

Furthermore, the first/second microprocessor 321, 322 connected with the first/second optical and electric signals transmission apparatus 312, 313 sends out digital information to be transmitted to the second/first microprocessor 322, 321 to the drive control circuit 268, 268' of the first/second optical and electric signals transmission apparatus 312, 313, like that of the seventeenth embodiment, while deciphering a pulse signal extracted by the receiving circuit 269, 269' of the first/second optical and electric signals transmission apparatus 312, 313 to obtain digital information transmitted from the second/first microprocessor 307, 306.

As described above, in this embodiment, the serial IF control circuit 315, 315' is mounted on the first/second optical and electric signals transmission apparatus 312, 313, and converts a peak voltage (a digital value) received from the A/D converter 294, 294' to a serial signal and transmits the serial signal to the second/first optical and electric signals transmission apparatus 313, 312, while when the serial IF control circuit 315, 315' has received a serial digital signal, it converts the serial digital signal to a parallel digital signal and sends out the parallel digital signal to the D/A converter 317, 317'. Thus, in this embodiment, each of the first and second electric signal transmission lines 319 and 320 connecting the serial IF control circuit 315 of the first optical and electric signals transmission apparatus 312 with the serial IF control circuit 315' of the second optical and electric signals transmission apparatus 313 may be one copper wire or copper pattern, so that a smaller and simpler optical and electric signals transmission system can be obtained.

In addition, the serial IF control circuit 315, 315' has a controller 316, 316'. Thus, the serial IF control circuit 315, 315' is able to determine with the controller 316, 316' whether the emission level of the light-emitting element 265, 265' has become an optimum value, and finish the communication when the emission level of the light-emitting element 265, 265' has become an optimum value. Thus, the serial IF control circuit 315, 315' is able to set the emission level to an optimum value before regular optical communication and then stand by for regular optical communication.

In this connection, the serial communication may be in accordance with communication specifications such as I2C, for example.

Furthermore, in this embodiment, the first optical and electric signals transmission apparatus 312 and the second optical and electric signals transmission apparatus 313 are mounted with the serial I/F control circuit 315, 315' converting a peak voltage (a digital value) received from the A/D converter 294, 294' and an inputted analog signal used for light-emitting element control to serial signals. However, the present invention is not limited to this, and in the optical and electric signals transmission system of the eighteenth embodiment shown in FIG. 38, it is also possible to convert a peak voltage (a digital value) from the A/D converter 294, 294' and an inputted analog signal for light-emitting element control to serial signals in the first microprocessor 297 and second microprocessor 298.

In the above embodiments, the configuration of the light-emitting element 142, 265, or 265' is not particularly described, but it is desirable to use a vertical cavity surface emitting laser (VCSEL) for the light-emitting element 142, 265, or 265'. A VCSEL is more suitable for high-speed transmission than a light-emitting diode (LED), and is easier to be built in a device than a usual laser because of surface emission. However, the output fluctuation by temperature of a VCSEL is larger than that of a LED, so that temperature compensation must be done for a VCSEL in general. However, in the optical and electric signals transmission systems of the fourteenth to nineteenth embodiments, the receiving side has a function of evaluating an optical signal outputted from the transmitting side and feeds back the result of the evaluation to the transmitting side to control the output side emission level. Thus, any output fluctuation can be compensated.

Twentieth Embodiment

This embodiment relates to electronic equipment using an optical and electric signals transmission system of any one of the fourteenth to nineteenth embodiments. This electric equipment is folding electronic equipment such as a personal digital assistant (PDA), a notebook personal computer (PC), or a portable digital versatile disk (DVD) in which a housing having a display panel and a housing having an operation unit, a storage medium, and the like are separated.

FIGS. 40(a), 40(b), and 40(c) are schematic configuration diagrams of the folding electronic equipment of this embodiment. FIG. 40(a) is a front view showing the sate that the folded portions are developed. FIG. 40(b) shows the state that the outer shell in FIG. 40(a) has been removed. FIG. 40(c) is a cross-sectional view taken along a direction perpendicular to the folding axis.

The electronic equipment 331 is constituted roughly by a first housing 332, a second housing 333, and a bending hinge unit connecting the first housing 332 with the second housing 333 so as to rotate freely. The first housing 332 has a display unit 335 and a camera 336 is provided on the back of the display unit 335. Two or more display units 335 and cameras 336 may be provided, and the cameras 336 and the display units 335 may be provided on the same surface. Furthermore, the second housing 333 has an operation panel including button switches and the like.

Inside the first housing 332, a first main board 337 is provided. Inside the second housing 333, a second main board 338 is provided. Signal transmission between the first main board 337 and the second main board 338 is performed using an optical signal. In other words, a first receptacle 339 identical to any one of the receptacles 51, 81, 111, 121, 131, 181, 191, and 195 of the first to tenth embodiments, on which a package (not shown) in which a light-emitting element (not shown) and a light-receiving element (not shown) are sealed with resin is mounted, is provided on and electrically connected with the first main board 337. To the first receptacle 339, a first plug 341 is attached which is provided on one end of an optical and electric signals transmission line 340 identical to any one of the optical and electric signals transmission lines of the first to tenth embodiments and is identical to any one of the plugs 63, 95, 105, 115, 125, 171, 186, 199, and 211 of the first to tenth embodiments.

Likewise, a second receptacle 342 identical to any one of the receptacles 51, 81, 111, 121, 131, 181, 191, and 195 of the first to tenth embodiments is provided on and electrically connected with the second main board 338. To the second receptacle 342, a second plug 343 is attached which is provided on the other end of the optical and electric signals transmission line 340 and is identical to any one of the plugs 63, 95, 105, 115, 125, 171, 186, 199, and 211 of the first to tenth embodiments. Thus, an optical signal is transmitted through the optical and electric signals transmission line 340.

In other words, in this embodiment, the first receptacle 339, the optical and electric signals transmission line 340, the first plug 341, the second receptacle 342, and the second plug 343 constitutes a photoelectric signal transmitting section 344.

As described above, according to the electronic equipment of this embodiment, a small and thin optical and electric signals transmission apparatus of any one of the above embodiments is used, so that small and thin electronic equipment can be realized. In other words, it is not necessary to keep a region for extraction and insertion of the first/second plug 341, 343 near the bending hinge unit 334 side of the first/second receptacle 339, 342 on the first/second main board 337, 338. Thus, the photoelectric signal transmitting section 344 can be disposed near the bending hinge unit 334, so that this electronic equipment can be reduced in size.

Furthermore, optical and electric signals transmission is performed by the first receptacle 339, the optical and electric signals transmission line 340, the first plug 341, the second receptacle 342, and the plug 343, so that electronic equipment which generates little electromagnetic noise and is compact and capable of higher-speed signal transmission can be proposed.

In recent years, the image quality of electronic equipment having a display unit has been improved, and the speed of communication of moving image data has been increased particularly in electronic equipment which is able to be folded because the housing having a display panel and the housing having an operation unit are separated, so that increase in electromagnetic noise associated therewith has become a problem. In particular, in a mobile phone, image quality has been increased every alternation of its generations, so that it has become a problem how electromagnetic noise is suppressed when the size of it is limited. Portable electronic equipment having a display panel such as a notebook PC, a PDA, and a portable DVD also has a similar problem.

According to this embodiment, the electromagnetic noise problem of electronic equipment can be solved and low-cost and compact electronic equipment can be manufactured.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical and electric signals transmission apparatus comprising:
   a receptacle for optical and electric signals transmission which accommodates and holds at least any one of an optical transmitting device including a light-emitting element and an optical receiving device including a light-receiving element and a signal processing circuit processing a signal from the light-receiving element, and has an electrical connecting terminal;
   a plug for optical and electric signals transmission which has an electrical connecting terminal to be connected to the electrical connecting terminal of the receptacle and is adapted to be inserted in the receptacle to establish electrical coupling with the receptacle and/or optical coupling with at least any one of the light-emitting element and the light-receiving element and perform optical and electric signals transmission with the receptacle;
   an electric signal transmission line, an end of which is connected with the electrical connecting terminal of the plug; and
   an optical signal transmission line, an end portion of which is mounted to the plug,
   wherein the receptacle has a fitting recess in which the plug is to be fitted when inserted in the receptacle from a direction substantially perpendicular to an optical axis of the light-emitting element or the light-receiving element;
   wherein when the plug is fitted in the fitting recess of the receptacle, the optical coupling, the electrical coupling, and engagement of the receptacle with the plug are established at a location where the fitting recess and the plug are adjacent to each other; and
   wherein one-way or two-way optical communication and one-way or two-way electrical communication are performed between the receptacle and the plug fitted in the fitting recess.

2. An optical and electric signals transmission apparatus as claimed in claim 1, wherein:
   the receptacle accommodates and holds the optical transmitting device or the optical receiving device;
   the plug establishes optical coupling with the light-emitting element or the light-receiving element; and
   one-way optical communication and one-way or two-way electrical communication are performed between the receptacle and the plug.

3. An optical and electric signals transmission apparatus as claimed in claim 2, wherein:
   the optical signal transmission line is an optical fiber cable; and
   when the plug is fitted in the fitting recess of the receptacle, the optical coupling is established between an end face of the optical fiber cable and the light-emitting element or the light-receiving element.

4. An optical and electric signals transmission apparatus as claimed in claim 3, wherein the plug to which an end portion of the optical fiber cable is attached is formed in one piece by insert-molding the optical fiber cable and a resin plug body together.

5. An optical and electric signals transmission apparatus as claimed in claim 2, wherein:
   the optical signal transmission line is an optical waveguide; and
   when the plug is fitted in the fitting recess of the receptacle, the optical coupling is established between an end face of the optical waveguide and the light-emitting element or the light-receiving element.

6. An optical and electric signals transmission apparatus as claimed in claim 5, wherein:
   the electric signal transmission line is a flexible substrate including a metal pattern;
   the optical waveguide which is the optical signal transmission line is formed in and held by the flexible substrate; and
   the flexible substrate constitutes an optical and electric signals transmission line.

7. An optical and electric signals transmission apparatus as claimed in claim 1, wherein:
   the receptacle accommodates and holds the optical transmitting device and the optical receiving device;

the plug establishes optical coupling with the light-emitting element and the light-receiving element; and two-way optical communication and two-way or one-way electrical communication are performed between the receptacle and the plug.

8. An optical and electric signals transmission apparatus as claimed in claim 7, wherein:

the optical signal transmission line comprises a pair of optical fiber cables, one for transmission and the other for reception; and when the plug is fitted in the fitting recess of the receptacle, the optical coupling is established between an end face of the optical fiber cable for transmission and the light-emitting element, while the optical coupling is established between an end face of the optical fiber cable for reception and the light-receiving element.

9. An optical and electric signals transmission apparatus as claimed in claim 8, wherein the plug to which an end portion of each optical fiber cable is mounted is formed in one piece by insert-molding the optical fiber cables and a resin plug body together.

10. An optical and electric signals transmission apparatus as claimed in claim 7, wherein the optical transmitting device and the optical receiving device are separated from each other.

11. An optical and electric signals transmission apparatus as claimed in claim 7, wherein:

the optical transmitting device and the optical receiving device are formed in one piece to constitute an optical transmitting and receiving device; and a groove for separating the light-emitting element and the light-receiving element from each other is provided between the optical receiving device and the optical transmitting device of the optical transmitting and receiving device.

12. An optical and electric signals transmission apparatus as claimed in claim 11, wherein:

the plug having the electrical connecting terminal on its surface is formed in one piece by insert-molding the electrical connecting terminal and the resin plug body together; and the copper wire of the coaxial cable is soldered to the electrical connecting terminal which is integrally formed with the plug body.

13. An optical and electric signals transmission apparatus as claimed in claim 7, wherein:

the optical signal transmission line comprises a pair of optical waveguides, one for transmission and the other for reception; and when the plug is fitted in the fitting recess of the receptacle, the optical coupling is established between an end face of the optical waveguide for transmission and the light-emitting element, while the optical coupling is established between an end face of the optical waveguide for reception and the light-receiving element.

14. An optical and electric signals transmission apparatus as claimed in claim 13, wherein:

the electric signal transmission line is a flexible substrate including a metal pattern;

the optical waveguide which is the optical signal transmission line is formed in and held by the flexible substrate; and the flexible substrate constitutes an optical and electric signals transmission line.

15. An optical and electric signals transmission apparatus as claimed in claim 1, wherein:

the electric signal transmission line is a flexible substrate including a metal wire;

an end portion of the flexible substrate is mounted on a periphery of the plug; and the electrical connecting terminal of the plug to be connected to the electrical connecting terminal of the receptacle is formed on a surface of the flexible substrate mounted on the periphery of the plug and is connected with the metal wire in the flexible substrate.

16. An optical and electric signals transmission apparatus as claimed in claim 15, wherein:

the electrical connecting terminal of the receptacle is provided on an inner side surface of the fitting recess; and the electrical connecting terminal formed on the surface of the flexible substrate is disposed on a side surface of the plug.

17. An optical and electric signals transmission apparatus as claimed in claim 15, wherein:

the electrical connecting terminal of the receptacle is provided on an inner bottom face of the fitting recess; and the electrical connecting terminal formed on the surface of the flexible substrate is disposed on a bottom face of the plug.

18. An optical and electric signals transmission apparatus as claimed in claim 15, wherein:

the electrical connecting terminal of the receptacle includes electrical connecting terminals provided on an inner side surface and an inner bottom face of the fitting recess;

the flexible substrate of which the end portion is mounted on the periphery of the plug is constituted by two flexible substrates on which the electrical connecting terminals are formed; and the electrical connecting terminal of one of the two flexible substrates is disposed on a side surface of the plug, while the electrical connecting terminal of the other flexible substrate is disposed on a bottom face of the plug.

19. An optical and electric signals transmission apparatus as claimed in claim 15, wherein:

the electrical connecting terminal of the receptacle includes electrical connecting terminals provided on an inner side surface and an inner bottom face of the fitting recess;

the electrical connecting terminal formed on the surface of the flexible substrate includes electrical connecting terminals disposed on a side surface and a bottom face of the plug.

20. An optical and electric signals transmission apparatus as claimed in claim 15, wherein the plug mounted, on its periphery, with the end portion of the flexible substrate having the electrical connecting terminal on its surface is formed in one piece by insert-molding the flexible substrate having the electrical connecting terminal on its surface and a resin plug body together.

21. An optical and electric signals transmission apparatus as claimed in claim 1, wherein:

the electric signal transmission line is a coaxial cable including a copper wire; and the electrical connecting terminal of the plug connected to the electrical connecting terminal of the receptacle is provided on the periphery of the plug and soldered to the copper wire.

22. An optical and electric signals transmission apparatus as claimed in claim 1, wherein the light-emitting element of the optical transmitting device and the light-receiving element and signal processing circuit of the optical receiving device are mounted on a lead frame and sealed with resin.

23. An optical and electric signals transmission apparatus as claimed in claim 1, wherein the light-emitting element of the optical transmitting device and the light-receiving element and signal processing circuit of the optical receiving device are mounted on a rigid printed circuit board and sealed with resin.

24. An optical and electric signals transmission apparatus as claimed in claim 1, wherein:
   of regions of the bottom face of the receptacle, which is a surface opposite to a surface in which the fitting recess is formed, an outer region outside of a region opposite to the fitting recess is lower than the region opposite to the fitting recess by a predetermined height such that the region opposite to the fitting recess is made a protrusion and that the outer region serves as a mounting surface for a substrate; and
   the substrate on which the receptacle is mounted has a fitting portion which has a shape corresponding to the shape of the protrusion of the receptacle so that the protrusion is fitted in the fitting portion in order that the mounting surface of the receptacle comes into contact with a surface of the substrate when the protrusion of the receptacle is fitted in the fitting portion,
   whereby a mounting height of the receptacle to the substrate is made low and a mounting position of the receptacle to the substrate is fixed.

25. An optical and electric signals transmission apparatus as claimed in claim 1, wherein the light-emitting element is a surface emitting laser.

26. An optical and electric signals transmission system comprising a first optical and electric signals transmission apparatus and a second optical and electric signals transmission apparatus, each of the first optical and electric signals transmission apparatus and the second optical and electric signals transmission apparatus consisting of the optical and electric signals transmission apparatus as claimed in claim 1, wherein:
   the electric signal transmission line of the first optical and electric signals transmission apparatus and the electric signal transmission line of the second optical and electric signals transmission apparatus are electrically coupled with each other, while the optical signal transmission line of the first optical and electric signals transmission apparatus and the optical signal transmission line of the second optical and electric signals transmission apparatus are optically coupled with each other;
   the first optical and electric signals transmission apparatus includes at least the optical transmitting device and a drive control circuit driving and controlling the light-emitting element of the optical transmitting device;
   the second optical and electric signals transmission apparatus includes at least the optical receiving device, a receiving circuit extracting a receiving signal from a light-receiving signal obtained by the signal processing circuit of the optical receiving device, and a receiving level detecting circuit detecting the level of the receiving signal;
   the second optical and electric signals transmission apparatus is configured to receive an optical signal transmitted from the first optical and electric signals transmission apparatus through the optical signal transmission line and transmit to the first optical and electric signals transmission apparatus through the electric signal transmission line an electric signal representing the level of the receiving signal extracted from the light-receiving signal, which is obtained by receiving the optical signal; and
   the drive control circuit of the first optical and electric signals transmission apparatus controls the light-emitting element in such a manner that an amount of light emitted by the light-emitting element becomes optimum, on the basis of the level of the receiving signal represented by the electric signal transmitted from the second optical and electric signals transmission apparatus.

27. An optical and electric signals transmission system as claimed in claim 26, wherein:
   each of the first optical and electric signals transmission apparatus and the second optical and electric signals transmission apparatus includes the optical transmitting device, the optical receiving device, the drive control circuit driving and controlling the light-emitting element of the optical transmitting device, the receiving circuit extracting a receiving signal from a light-receiving signal obtained by the signal processing circuit of the optical receiving device, and the receiving level detecting circuit detecting the level of the receiving signal;
   one of the first optical and electric signals transmission apparatus or the second optical and electric signals transmission apparatus that has received an optical signal transmitted through the optical signal transmission line transmits an electric signal representing the level of the receiving signal based on the obtained light-receiving signal to the other optical and electric signals transmission apparatus through the electric signal transmission line;
   one of the first optical and electric signals transmission apparatus or the second optical and electric signals transmission apparatus that has received the electric signal representing the level of the receiving signal transmitted through the electric signal transmission line controls the light-emitting element by the drive control circuit in such a manner that an amount of light emitted by the light-emitting element becomes optimum, on the basis of the level of the receiving signal represented by the electric signal.

28. An optical and electric signals transmission system as claimed in claim 26, wherein the electric signal transmitted from the second optical and electric signals transmission apparatus to the first optical and electric signals transmission apparatus through the electric signal transmission line is an analog electric signal.

29. An optical and electric signals transmission system as claimed in claim 28, wherein the drive control circuit of the first optical and electric signals transmission apparatus includes an analog processing circuit setting a drive current for the light-emitting element on the basis of the analog electric signal transmitted from the second optical and electric signals transmission apparatus.

30. An optical and electric signals transmission system as claimed in claim 26, wherein the electric signal transmitted from the second optical and electric signals transmission apparatus to the first optical and electric signals transmission apparatus through the electric signal transmission line is a digital electric signal.

31. An optical and electric signals transmission system as claimed in claim 30, wherein:
   the first optical and electric signals transmission apparatus includes a D/A converter converting the digital electric signal transmitted from the second optical and electric signals transmission apparatus to an analog electric signal; and
   the drive control circuit of the first optical and electric signals transmission apparatus sets a drive current for the light-emitting element on the basis of the analog electric signal obtained by the D/A converter.

32. An optical and electric signals transmission system as claimed in claim 30, further comprising a microcomputer which receives the digital electric signal transmitted from the second optical and electric signals transmission apparatus, obtains using an internal correlation table a digital electric signal representing such a drive current for the light-emitting element that allows the amount of light emitted by the light-emitting element to be optimum, converts the digital electric signal to an analog electric signal by an internal D/A converter, and sends out the analog electric signal to the drive control circuit of the first optical and electric signals transmission apparatus, wherein the drive control circuit of the first optical and electric signals transmission apparatus sets the drive current for the light-emitting element on the basis of the analog electric signal sent out from the microcomputer.

33. An optical and electric signals transmission system as claimed in claim 30, wherein the digital electric signal transmitted from the second optical and electric signals transmission apparatus to the first optical and electric signals transmission apparatus is a serial signal.

34. An electronic equipment comprising:

a first housing having a display unit; and a second housing connected with the first housing so as to rotate freely and having an operation unit, wherein the first housing is mounted with one of the first optical and electric signals transmission apparatus or the second optical and electric signals transmission apparatus of the optical and electric signals transmission system as claimed in claim 26, wherein the second housing is mounted with the other optical and electric signals transmission apparatus of the optical and electric signals transmission system, and wherein transmission of optical and electric signals is performed between the first housing and the second housing by the optical and electric signals transmission system.

\* \* \* \* \*